(12) United States Patent
Kimoto et al.

(10) Patent No.: US 7,236,797 B2
(45) Date of Patent: *Jun. 26, 2007

(54) MOBILE COMMUNICATING SYSTEM, AND A MOBILE TERMINAL, AN INFORMATION CENTER AND A STORAGE MEDIUM USED THEREIN

(75) Inventors: Takashi Kimoto, Kawasaki (JP); Tamio Saito, Kawasaki (JP); Masanaga Tokuyo, Kawasaki (JP); Satoru Chikuma, Kawasaki (JP); Takashi Nishigaya, Kawasaki (JP); Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

This patent is subject to a terminal disclaimer.

(21) Appl. No.: 10/830,762

(22) Filed: Apr. 23, 2004

(65) Prior Publication Data

US 2004/0198395 A1 Oct. 7, 2004

Related U.S. Application Data

(62) Division of application No. 09/564,052, filed on May 3, 2000, now Pat. No. 6,829,484, which is a division of application No. 08/847,473, filed on Apr. 24, 1997, now Pat. No. 6,115,611.

(30) Foreign Application Priority Data

| Apr. 24, 1996 | (JP) | ................................. 8-102996 |
| Nov. 1, 1996 | (JP) | ................................. 8-292156 |

(51) Int. Cl.
H04Q 7/20 (2006.01)

(52) U.S. Cl. ............................ 455/456.1; 455/456.3; 455/457

(58) Field of Classification Search ............. 455/456.1, 455/422, 457, 517, 68, 54.1; 342/357.1, 342/357.07, 451, 456.5; 701/208, 456.3; 340/573.1

See application file for complete search history.

(56) References Cited

U.S. PATENT DOCUMENTS

| 5,223,844 | A | * | 6/1993 | Mansell et al. ......... 342/357.07 |
| 5,235,633 | A | | 8/1993 | Dennison et al. |
| 5,548,822 | A | * | 8/1996 | Yogo ........................... 455/68 |
| 5,625,668 | A | | 4/1997 | Loomis et al. |
| 5,652,707 | A | * | 7/1997 | Wortham .................. 455/456.3 |
| 5,931,888 | A | * | 8/1999 | Hiyokawa ................... 701/208 |
| 6,108,554 | A | * | 8/2000 | Kawamoto ............... 455/456.5 |
| 6,362,783 | B1 | * | 3/2002 | Sugiura et al. ............. 342/457 |
| 6,452,498 | B2 | * | 9/2002 | Stewart .................... 340/573.1 |
| 6,829,484 | B1 | * | 12/2004 | Kimoto et al. ........... 455/456.1 |

FOREIGN PATENT DOCUMENTS

| JP | 57-1437000 A | 9/1982 |
| JP | 1 142899 | 6/1989 |
| JP | 1-142899 | 6/1989 |
| JP | 4 152724 | 5/1992 |
| JP | 5-37462 | 2/1993 |
| JP | 5-327603 | 12/1993 |
| JP | 06120875 | 4/1994 |
| JP | 6-276127 | 9/1994 |
| JP | 6-295397 | 10/1994 |
| JP | 06289118 | 10/1994 |
| JP | 7-225895 | 8/1995 |
| JP | 7-225897 | 8/1995 |
| JP | 7-261661 | 10/1995 |
| JP | 7-334786 | 12/1995 |
| JP | 7-336436 | 12/1995 |
| JP | 07320196 | 12/1995 |
| JP | 8-9450 | 1/1996 |
| JP | 8-18501 | 1/1996 |
| JP | 8-29186 | 2/1996 |
| JP | 8-87234 | 4/1996 |
| JP | 9-114851 | 5/1997 |

OTHER PUBLICATIONS

Sugiyama. Standardization of New Generation Message Communication in Digital Portable Telephone, Nikkei Communications, Apr. 15, 1996, pp. 70-72.

Notice of Ground Rejection dated Aug. 30, 2005 with translation.
Japanese Office Action dated Jan. 10, 2006 with translation.
Notification of Reason(s) for Refusal dated Jul. 31, 2006.

* cited by examiner

*Primary Examiner*—Matthew D. Anderson
*Assistant Examiner*—Tan Trinh
(74) *Attorney, Agent, or Firm*—Katten Muchin Rosenman LLP

(57) ABSTRACT

In a mobile communicating system, a mobile terminal has a position information detecting unit detecting position information, a position information transmitting unit transmitting position information to an information center, an up-load data transmitting unit transmitting up-load data to the information center and an information/service utilizing unit utilizing information/service from the information center. The information center has an accumulating unit accumulating information/services, a retrieving unit receiving the position information from the mobile terminal to retrieve the information/services in the accumulating unit, an accumulation controlling unit accumulating the up-load data in the accumulating unit, and an information/service transmitting unit taking out the information/service retrieved by the retrieving unit from the accumulating unit and transmitting it to the mobile terminal, thereby providing not only map information showing the current position of the mobile terminal but also information of facilities on the map to the mobile terminal.

8 Claims, 70 Drawing Sheets

FIG. 9

53a-2:CSID- POSITION INFORMATION CONVERSION TABLE

| RADIO BASE STATION IDENTIFICATION INFORMATION | POSITION INFORMATION |
|---|---|
| BASE STATION ID-1 | LATITUDE-LONGITUDE 1 |
| BASE STATION ID-2 | LATITUDE-LONGITUDE 2 |
| BASE STATION ID-3 | LATITUDE-LONGITUDE 3 |
| '' | '' |
| '' | '' |
| '' | '' |

HOGE HOGE CHINESE NOODEL                47-1 : LCD

OPEN : AM7:00 — PM9:00
CLOSE : EVERY MONDAY

FEATURE : HOGE HOGE CHINESE NOODLE    ¥600

DELICIOUS! ← REALLY? ( ̄_ ̄)Y~~

MAP

FIG.15

```
<HEAD>
<TITLE> HOGE HOGE CHINESE NOODLE </TITLE>
</HEAD>

<H2> HOGE HOGE CHINESE NOODLE </H2>

<PRE>
  OPEN: AM7:00-PM9:00
  CLOSE: EVERY MONDAY
   FEATURE: HOGE HOGE CHINESE NOODLE   ¥600
</PRE>

<IMG SRC> =<"SHOP. GIF">

<P>
<PRE>
<BLINK> DELICIOUS!</BLINK>←REALLY?(¯_¯)Y~~
</PRE>

<P>
<A HREF="20CC. HTM"> MAP <BR></A>
```

FIG.16

```
<HEAD>
<TITLE> HOGE HOGE CHINESE NOODLE </TITLE>
</HEAD>

<H2> HOGE HOGE CHINESE NOODLE </H2>

<PRE>
  OPEN: AM7:00-PM9:00
  CLOSE: EVERY MONDAY
  FEATURE: HOGE HOGE CHINESE NOODLE   ¥600
</PRE>

<IMG SRC> =<"SHOP.GIF">

<P>
<PRE>
<BLINK> DELICIOUS!</BLINK>←REALLY?(¯_¯)Y~~
</PRE>

<P>
<A HREF="20CC.HTM"> MAP <BR></A>
<APPLET CODE="SERVICE.CLASS" WIDTH
          =150 HEIGHT=30 >

</APPLET>
```

FIG.24

47-1 : TERMINAL SCREEN (LCD)

KIND : RESTAURANT

TELEPHONE NUMBER : 03-3543-XXXX

RECOMMENDATION : PAELLA IS DELICIOUS

F I G. 47
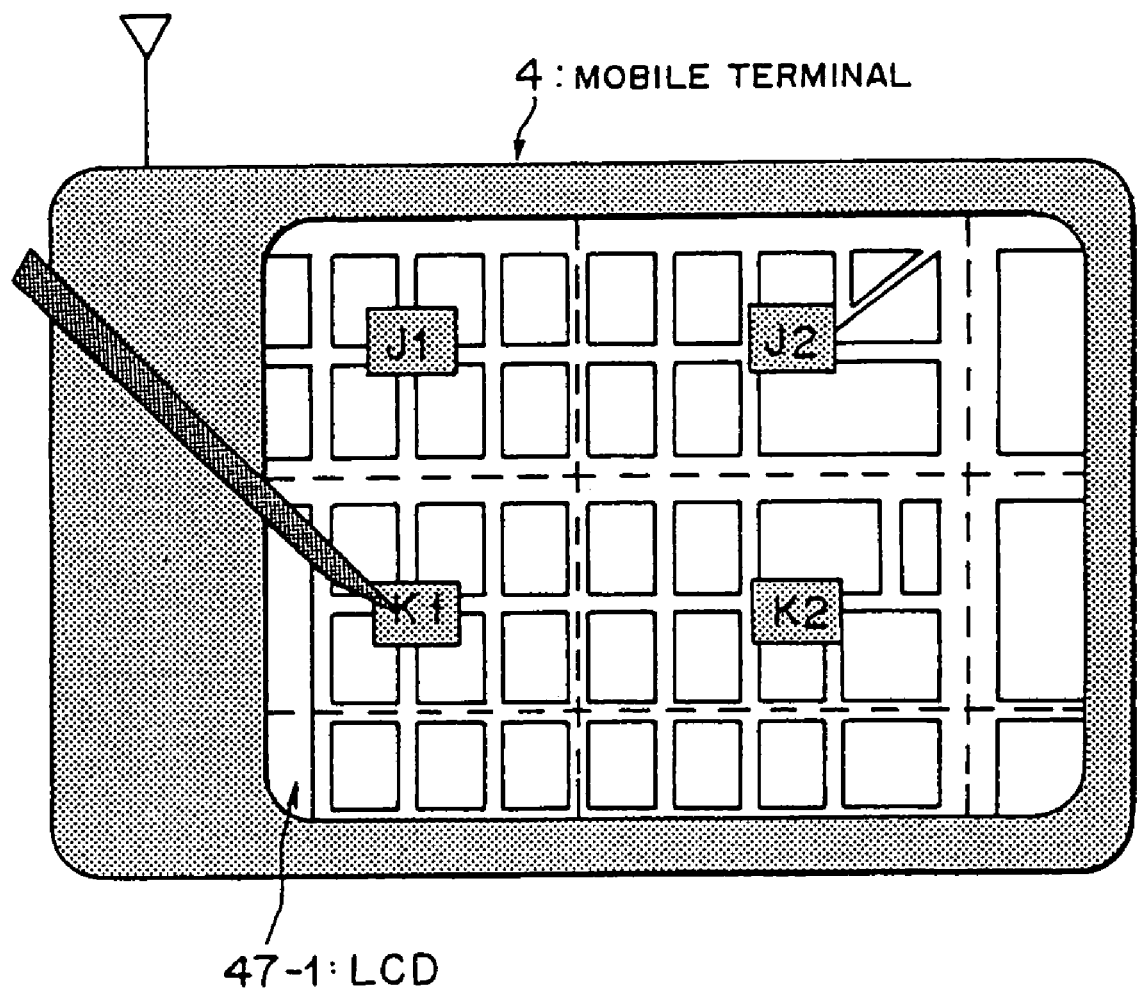

522: GROUP CORRESPONDENCE TABLE

| GROUP CODE | LINK INFORMATION |
|---|---|
| $1000 | user1000.map |
| $1001 | |
| | |
| | |
| | |

F I G. 62

79: REFERENCE FILE LIST

| URL | FILE NAME |
|---|---|
| http://host/file1.html | file1.html |
| http://host/file2.html | file2.html |
| http://host/file3.html | file3.html |
| ⋮ | ⋮ |

FIG. 67

| ② Map2.gif | ③ Map3.gif | ④ |
|---|---|---|
| ⑨ Map4.gif | ① Map1.gif | ⑤ |
| ⑧ | ⑦ | ⑥ |

INITIAL DISPLAY MAP

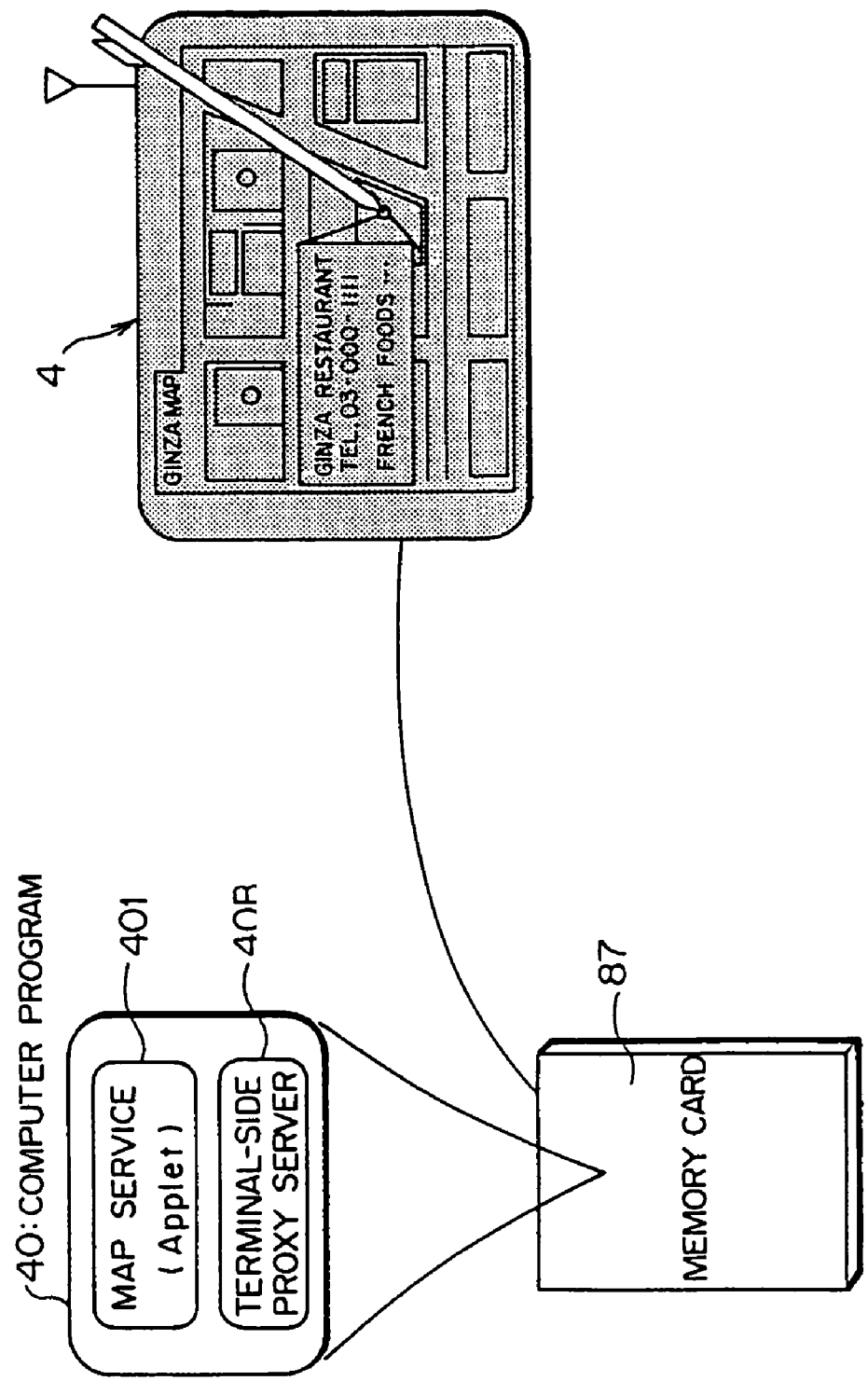

MOBILE COMMUNICATING SYSTEM, AND A MOBILE TERMINAL, AN INFORMATION CENTER AND A STORAGE MEDIUM USED THEREIN

CROSS REFERENCE TO RELATED APPLICATION

The present application is a divisional of U.S. patent application Ser. No. 09/564,052 filed May 3, 2000, now U.S. Pat. No. 6,829,484, which is a divisional of U.S. patent application Ser. No. 08/847,473 filed Apr. 24, 1997, now U.S. Pat. No. 6,115,611.

BACKGROUND OF THE INVENTION (1) Field of the Invention

The present invention relates to a mobile communicating system which can provide map information deduced from position information of a mobile terminal, and the mobile terminal, an information center and a storage medium used in the mobile communicating system.

(2) Description of the Related Art

A car navigation system has been well known as a mobile communicating system providing map information to a mobile object deduced from position information of the mobile object. The car navigation system utilizes, in general, GPS (Global Positioning System) as well known, in which current position information (coordinates; a latitude and a longitude) of its own (a motor vehicle, in this case) is detected and map information corresponding to the position information is taken out from a map database equipped in the motor vehicle, whereby the corresponding map information may be displayed on a display along with the current position.

In such the general car navigation system, it is necessary to equip a map database (which is generally provided by a CD-ROM or the like) in each of the motor vehicle utilizing a service and manage it on the user side. For this, the general car navigation system has a drawback such that if an area including the current position changes, the user needs to change the map database (the CD-ROM). This is very inconvenient to the user.

Japanese Patent Laid-Open Publication No. HEI 1-142899 discloses a navigation system in which a map database is provided in a mobile radio base station (hereinafter, simply called "a radio base station), a mobile object (a motor vehicle) transmits the current position of its own detected using GPS or the like to the radio base station, map information corresponding to the position information is retrieved on the radio base station side, and the obtained position information is transmitted to the mobile object that is a source of the transmitted position information.

According to the above car navigation system, the user does not need to manage the map database. Moreover, if the current position of its own (the mobile object) deviates from the map displayed on a display, for example, the mobile object can automatically obtain map information corresponding to the current position information of its own from the radio base station so as to always display a map corresponding to the current position of its own on the display.

All the above car navigation systems have been developed for a high-speed mobile object such as a motor vehicle or the like. There has been also proposed a system for a mobile terminal such as PDA or the like.

For instance, a technique disclosed in Japanese Patent Laid-Open Publication No. HEI 5-37462 can provide map information to a mobile terminal (an electronic pocketbook or the like) following European CT-2 (Second generation Cordless Telephone) standard (corresponding to PHS: Personal Handy-phone System in Japan). In concrete, in this system, when a mobile terminal accesses to a radio base station, map information of an area corresponding to identification information of the radio base station is provided from the radio base station or a service center (an information center) accommodating the radio base station to the mobile terminal.

Each of the above general systems has, however, a drawback that although it is possible to obtain map information indicating the current position of the user (a motor vehicle, a mobile terminal or the like), it is impossible to obtain detailed information relating to the position information such as stores or facilities on the map (telephone number, business hours and the like of facilities on the map) or a service (a service program: a program or the like showing a route to a destination on the map).

The user of the system can obtain map information from the radio base station or the service center, but cannot provide information or a service program relating to position information to the radio base station or the service center to arbitrarily add or update information in the map database. It is therefore very difficult for the radio base station or the service center to always prepare the latest information meeting needs of the users and provide it to the users.

Meanwhile, in such the mobile communicating system which can provide map information from position information of a radio mobile terminal, corresponding map information is retrieved in the map database on the basis of identification information of the radio base station (or a fixed terminal such as a public telephone) as above. For this, database in which information of an actual position (an installation position) of the radio base station or the fixed terminal is corresponded is very important.

The public radio mobile terminal can generally know identification information of a radio base station (or a fixed terminal) to which own terminal is connected, but only the communication company knows actual position information of the radio base station (or the fixed terminal) deduced from the identification information. Accordingly, it is very difficult to independently configure a database in which actual position information of a radio base station or a fixed terminal is corresponded, as above.

Further, in the system handling information having a large data quantity such as map (or image) data as above, a time required from when the user demands information to when the information is transferred from the service center is extremely long, which causes noticeable degradation in operability for the user. The system using a radio line or a public network such as a general telephone line has a disadvantage such that while the user is referring to information on the mobile terminal, no data flows in the communication line although it occupies the line so that a cost of communication becomes extremely expensive.

SUMMARY OF THE INVENTION

In the light of the above drawbacks, an object of this invention is to provide not only map information indicating the current position of the mobile terminal but also information or a service relating to a position of the mobile terminal such as facilities on the map or a service program.

Another object of this invention is to independently configure a database in which identification information of a radio base station (or a fixed terminal) is corresponded to actual position information of the radio base station (or the fixed terminal), not through the communication company or the like.

Still another object of this invention is that the user can use desired information or a service relating to position information without establishing a communication with the information center at all times by automatically accumulating information or services necessary (expected to be necessary) to the user in the mobile terminal to a certain degree according to an action of the user.

Still another object of this invention is that the user can easily use information or services by even an existing mobile terminal by programming a function which can make the mobile terminal automatically hold information or services necessary (expected to be necessary) to the user to a certain degree according to an action of the user and providing the computer program to the mobile terminal.

The present invention therefore provides a mobile communicating system having at least one information center and plural mobile terminals each connected to the information center with a predetermined communicating method comprising each of the mobile terminals comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, the information center comprising an accumulating unit for accumulating information or a service relating to information of a position according to a movement of the mobile terminal, a retrieving unit for receiving the position information transmitted from the mobile terminal and retrieving information or a service relating to the position information accumulated in the accumulating unit, an accumulation controlling unit for accumulating the information or the service relating to position information as the up-load data transmitted through the up-load data transmitting unit in the accumulating unit, and an information/service transmitting unit for taking out information or a service relating to the position information retrieved by the retrieving unit to transmit the information or the service relating to the position information to the mobile terminal having transmitted the position information.

According to the mobile communicating system of this invention, each of the mobile terminals can utilize information or a service relating to position information accumulated in the information center. In addition, each of the mobile terminal provides information or a service relating to position information as up-load data to the information center, thereby accumulating and updating on occasion information or services in the information center to retain information or services required by the mobile terminals in a learning fashion in the information center. It is therefore possible to meet needs for various information or services of the user if the system is more conducted.

The present invention also provides a mobile communicating system having at least one information center and plural mobile terminals each connected to the information center with a predetermined communicating method comprising the plural mobile terminals being classified into a first- to fifth-type mobile terminals, the first-type mobile terminal comprising a position information detecting unit for detecting position information of the first-type mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to position information transmitted from the information center, the second-type mobile terminal comprising a position information detecting unit for detecting position information of the second-type mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, a transmitting unit for transmitting the information or the service relating to the position information transmitted from the information center to at least any one of the third- to fifth-type mobile terminals with a radio communicating method, the third-type mobile terminal comprising a position information detecting unit for detecting position information of the third-type mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, a transmitting unit for transmitting the information or the service relating to the position information from the information center to at least any one of another third-type mobile terminal, the fourth-type mobile terminal and the fifth-type mobile terminal with a radio communicating method, a receiving unit for receiving information or a service relating to position information transmitted to the second-type mobile terminal or the third-type mobile terminal from the information center from that second-type mobile terminal or that third-type mobile terminal with the radio communicating method, a secondary information/service utilizing unit for utilizing the information or the service relating to the position information received by the receiving unit, the fourth-type mobile terminal comprising a position information detecting unit for detecting position information of the fourth-type mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, a receiving unit for receiving information or a service relating to position information transmitted to the second-type mobile terminal or the third-type mobile terminal from the information center from that second-type mobile terminal or that third-type mobile terminal with the radio communicating method, a secondary information/service utilizing unit for utilizing the information or the service relating to the position information received by the receiving unit, the fifth-type mobile terminal comprising a receiving unit for receiving information or a service relating to position information transmitted to the second-type mobile terminal or the third-type mobile terminal from the information center from that second-type mobile terminal or that third-type mobile terminal with the radio communicating method, a secondary information/service utilizing unit for utilizing the information or the service relating to the position information received by the receiving unit, the information center comprising an accumulating unit for accumulating information or services relating to information of positions according to a movement of at least the first- to fourth-type mobile terminals, a retrieving unit for receiving the position information transmitted from the first- to fourth-type mobile terminals to retrieve information or services relating to the position information accumulated in the accumulating unit, an accumulation controlling unit for accumulating the information or the service relating to position information transmitted as the up-load data through the up-load data transmitting unit in the accumulating unit, and an information/service transmitting unit for taking out information or a service relating to the position information retrieved by the retrieving unit from the accumulating unit and transmitting the information or service relating to the position information to any one of the first- to fourth-type mobile terminals having transmitted the position information.

According to the mobile communicating system of this invention, at least the third- to fifth-type mobile terminals do not need to directly obtain information or a service relating to position information for each mobile terminal. It is therefore possible to minimize a scale of the source (the accumulating unit) in the information center.

The present invention also provides a mobile communicating system having at least one information center and plural mobile terminals each connected to the information center via a radio base station over a radio line comprising each of the mobile terminals comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, a map/facility information/service utilizing unit for utilizing information of a map, information of facilities on the map or a service as to the map or the facilities transmitted from the information center, the information center comprising an accumulating unit for accumulating information of a map, information of facilities on the map or a service as to the map or the facilities as information relating to information of a position according to a movement of the mobile terminal, a retrieving unit for receiving the position information transmitted from the mobile terminal to retrieve the information of a map, the information of facilities on the map or the service as to the map or the facilities accumulated in the accumulating unit, an accumulation controlling unit for accumulating the information or the service relating to position information transmitted as the up-load data through the up-load data transmitting unit in the accumulating unit, and a map/facility information/service transmitting unit for taking out the information of a map, information of facilities on the map or the service as to the map or the facilities retrieved by the retrieving unit form the accumulating unit to transmit the information of a map, the information of facilities on the map or the service as to the map or the facilities to the mobile terminal having transmitted the position information.

According to the mobile communicating system of this invention, the information center can provide not only information of a map but also information of facilities on the map or a service as to the map or the facilities to the mobile terminal. It is therefore possible to always carefully meet demands of the users. This feature largely contributes to improvement of the service. Each of the mobile terminals transmits information or a service relating to position information as up-load data to the information center, whereby the information center accumulates and updates the information or the service relating to position information of the mobile terminal on occasion so as to always retain information or services required by the mobile terminal. It is therefore possible to certainly meet needs for various information or services of the users if the system is more conducted.

The present invention also provides a mobile communicating system having at least one information center and plural mobile terminals each connected to the information center via a radio base station over a radio line comprising each of the mobile terminals comprising a position information detecting unit for detecting position information of the mobile terminal as position identification information of the radio base station, a position information inputting unit for inputting the position information of the mobile terminal, a position identification information transmitting unit for transmitting the position identification information of the radio base station detected by the position information detecting unit to the information center, a position information transmitting unit for transmitting the position information of the mobile terminal fed from the position information inputting unit to the information center, an information/service utilizing unit for utilizing information or a service relating to the position information transmitted from the information center, the information center comprising a position identification information and position information storing unit for corresponding the position identification information of the radio base station transmitted from the position identification information transmitting unit of the mobile terminal to the position information of the mobile terminal transmitted from the position information transmitting unit of the mobile terminal and storing said position identification information and said position information, an accumulating unit for accumulating information or a service relating to information of a position according to a movement of the mobile terminal, a retrieving unit for retrieving in the accumulating unit information or a service relating to position information of the mobile terminal corresponding to position identification information of the radio base station stored in the position identification information and position information storing unit if received information relating to a position transmitted from the mobile terminal is the position identification information of the radio base station, while retrieving in the accumulating unit information or a service relating to position information of the mobile terminal if the received information is the position information of the mobile terminal, and an information/service transmitting unit for taking out the information or service relating to the position information retrieved by the retrieving unit from the accumulating unit to transmit the information or the service relating to the position information to the mobile terminal having transmitted the position information.

According to the mobile communicating system of this invention, the mobile terminal separately transmits position identification information of the radio base station and position information of the mobile terminal to the information center (the position identification information and position information storing unit), whereby the information center can independently configure the database in which the position identification information of the radio base station is corresponded to the position information of the mobile terminal even if the information center does not grasp the position identification information of the radio base station. It is therefore possible to realize a system not relying on the communication network. This feature largely contributes to flexibility of the system configuration.

The present invention also provides a mobile communicating system having at least one information center and plural mobile terminals each connected to the information center via a radio base station over a radio line comprising each of the terminals comprising a position information detecting unit for detecting position information of the mobile terminal as position identification information of the radio base station, a position information inputting unit for inputting the position information of the mobile terminal, a position identification information transmitting unit for transmitting the position identification information of the radio base station detected by the position information detecting unit to the information center, a position information transmitting unit for transmitting the position information of the mobile terminal fed from the position information inputting unit to the information center, a map/facility information/service utilizing unit for utilizing information of a map, information of facilities on the map or a service as to the map or the facilities transmitted from the information center, the information center comprising a position identification information and position information storing unit for corresponding the position identification information of the radio base station transmitted from the position identification information transmitting unit of the mobile terminal to the position information of the mobile terminal transmitted from the position information transmitting unit of the mobile terminal and storing them, an accumulating unit for accumulating information of a map, information of facilities on the map and a service as to the map and the facilities as information relating to information of a position according to a movement of the mobile terminal, a retrieving unit for retrieving in the accumulating unit information or a service relating to position information of the mobile terminal corresponding to position identification information of the radio base station stored in the position identification information and position information storing unit if it is found as a result that information relating to a position transmitted from the mobile terminal is the position identification information of the radio base station, while retrieving in the accumulating unit information or a service relating to position information of the mobile terminal if the received information is the position information of the mobile terminal, and a map/facility information/service transmitting unit for taking out the information of a map, the information of facilities on the map and the service as to the map and the facilities as information or a service relating to the position information retrieved by the retrieving unit from the accumulating unit to transmit the information of a map, the information of facilities on the map or the service as to the map or the facilities to the mobile terminal having transmitted the position information.

According to the mobile communicating system of this invention, the terminal can receive not only information of a map but also information of facilities on the map or a service as to the map or the facilities from the information center to utilize them. It is therefore possible to always carefully meet demands of the users. This feature largely contribute to improvement of the service. In this case, it is possible to independently configure the database in which position identification information of the radio base station is corresponded to position information of the mobile terminal in the information center, whereby a system not relying on the communication network may be realized. This feature largely contributes to flexibility of the system configuration.

The present invention further provides a mobile terminal used in a mobile communicating system having at least one information center and a plurality of the mobile terminals each connected to the information center with a predetermined communicating method comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, and an information/service utilizing unit for utilizing information or a service relating to the position information transmitted from the information center.

The present invention also provides a mobile terminal used in a mobile communicating system having at least one information center and a plurality of the mobile terminals each connected to the information center with a predetermined communicating method comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, and a transmitting unit for transmitting the information or service relating to the position information transmitted from the information center to another mobile terminal with a radio communicating method.

The present invention also provides a mobile terminal used in a mobile communicating system having at least one information center and a plurality of the mobile terminals each connected to the information center with a predetermined communicating method comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, a transmitting unit for transmitting the information or service relating to the position information transmitted from the information center to another mobile terminal with a radio communicating method, a receiving unit for receiving information or a service relating to position information transmitted to another mobile terminal from the information center from that another mobile terminal with the radio communicating method, and a secondary information/service utilizing unit for utilizing the information or service relating to the position information received by the receiving unit.

The present invention also provides a mobile terminal used in a mobile communicating system having at least one information center and a plurality of the mobile terminals each connected to the information center with a predetermined communicating method comprising a position information detecting unit for detecting position information of the mobile terminal, a position information transmitting unit for transmitting the position information detected by the position information detecting unit to the information center, an up-load data transmitting unit for transmitting information or a service relating to the position information as up-load data to the information center, an information/service utilizing unit for utilizing information or a service relating to the position information transmitted from the information center, a receiving unit for receiving information or a service relating to position information transmitted to another mobile terminal from the information center from that another mobile terminal with a radio communicating method, and a secondary information/service utilizing unit for utilizing the information or the service relating to the position information received by the receiving unit.

The present invention also provides a mobile terminal used in a mobile communicating system having at least one information center and a plurality of the mobile terminals each connected to the information center with a predetermined communicating method comprising a receiving unit for receiving information or a service relating to position information transmitted to another mobile terminal from the information center from that another mobile terminal with a radio communicating method, and a secondary information/service utilizing unit for utilizing the information or service relating to the position information received by the receiving unit.

According to the mobile terminal used in the mobile communicating system of this invention, the mobile terminal does not need to directly obtain information of a service relating to position information of the mobile terminal from the information center. It is therefore possible to minimize a scale of the source (the accumulating unit) in the information center.

The present invention still further provides a mobile terminal used in a mobile communicating system having at least one information center and a plurality of the mobile terminals each connected to the information center via a radio base station over a radio line comprising a position information detecting unit for detecting position information of the mobile terminal as position identification information of the radio base station, a position information inputting unit for inputting the position information of the mobile terminal, a position identification information transmitting unit for transmitting the position identification information of the radio base station detected by the position information detecting unit to the information center, a position information transmitting unit for transmitting the position information of the mobile terminal fed from the position information inputting unit to the information center, and an information/service utilizing unit for utilizing information or a service relating to the position information transmitted from the information center.

According to the mobile terminal used in the mobile communicating system according to this invention, the mobile terminal separately transmits position identification information of the radio base station and position information of the mobile terminal to the information center (the position identification information and position information storing unit), whereby the information center can independently configure the database in which the position identification information of the radio base station is corresponded to the position information of the mobile terminal even if not grasping in advance the position identification information of the radio base station. It is therefore possible to realize a system not relying on the communication network. This feature largely contributes to flexibility of the system configuration.

The present invention still further provides an information center used in a mobile communicating system which is formed by being connected to a plurality of mobile terminals with a predetermined communicating method comprising an accumulating unit for accumulating information or a service relating to information of a position according to a movement of the mobile terminal, a retrieving unit for receiving position information transmitted from the mobile terminal and retrieving information or a service relating to the position information accumulated in the accumulating unit, an accumulation controlling unit for accumulating information or a service relating to position information transmitted as up-load data from the mobile terminal in the accumulating unit, and an information/service transmitting unit for taking out information or a service relating to the position information retrieved by the retrieving unit from the accumulating unit to transmit the information or the service relating to the position information to the mobile terminal having transmitted the position information.

According to the information center used in the radio communicating system of this invention, the information center can provide information or a service relating to position information accumulated therein to each of the mobile terminals. In addition, the information center receives information or a service relating to position information as up-load data from the mobile terminal so as to accumulate and update on occasion information or services therein, thereby retaining information or services required by the mobile terminals therein in a learning fashion. It is therefore possible to meet needs for various information or services of the users if the system is more conducted.

The present invention also provides an information center used in a mobile communicating system which is formed by being connected to a plurality of mobile terminals via a radio base station over a radio line comprising a position identification information and position information storing unit for corresponding position identification information of the radio base station transmitted from the mobile terminal to position information of the mobile terminal transmitted from the mobile terminal and storing said position identification information and said position information, an accumulating unit for accumulating information or a service relating to information of a position according to a movement of the mobile terminal, a retrieving unit for retrieving in the accumulating unit information or a service relating to position information of the mobile terminal corresponding to position identification information of the radio base station stored in the position identification information and position information storing unit if received information relating to a position transmitted from the mobile terminal is the position identification information of the radio base station, while retrieving in said accumulating unit information or a service relating to position information of said mobile terminal if the received information is the position information of the mobile terminal, and an information/service transmitting unit for taking out the information or the service relating to the position information retrieved by the retrieving unit from the accumulating unit, and transmitting the information or the service relating to the position information to the mobile terminal having transmitted the position information.

According to the information center used in the mobile communicating system of this invention, the information center separately receives position identification information of the radio base station and position information of the mobile terminal, thereby independently configuring the database in which the position identification information of the radio base station is corresponded to the position information of the mobile terminal even if not grasping in advance the position identification information of the radio base station. It is therefore possible to realize a system not relying on the communication network. This feature largely contributes to flexibility of the system configuration.

The present invention also provide a mobile communicating system having at least one information center and at least one mobile terminal connected to the information center with a predetermined communicating method comprising the information center comprising a center-side accumulating unit for accumulating information or a service relating to position information according to a movement of the mobile terminal, a retrieving unit for retrieving the information or the service relating to the position information accumulated in the center-side accumulating unit on the basis of a request for the information or the service from the mobile terminal, an information/service transmitting unit for taking out the information or the service relating to the position information retrieved by the retrieving unit and transmitting the information or the service relating to the position information to the mobile terminal, the mobile terminal comprising a terminal-side accumulating unit for accumulating the information or the service relating to the position information sent from the information center, an information/service utilizing unit for utilizing the information or the service relating to the position information, an action detecting unit for detecting an action of a user of the mobile terminal, an information requesting unit for requesting information or a service relating to position information on the basis of a result of action detection by the action detecting unit, and accumulating the information or the service relating to the position information sent from the information center in response to the request in the terminal-side accumulating unit, and a prefetching unit for requesting information or a service relating to position information which is expected to be necessary from the information center on the basis of the result of the action detection by the action detecting unit, and accumulating the information or the service relating to the position information sent from the information center in response to the request in the terminal-side accumulating unit.

The present invention also provides a mobile terminal used in a mobile communicating system having at least one information center and connected to the information center with a predetermined communicating method comprising an accumulating unit for accumulating information or a service relating to position information according to a movement of the mobile terminal send from the information center, an information/service utilizing unit for utilizing the information or the service relating to the position information, an action detecting unit for detecting an action of a user of the mobile terminal, an information requesting unit for requesting information or a service relating to position information from the information center on the basis of a result of action detection by the action detecting unit, and accumulating the information or the service relating to the position information sent from the information center in response to the request in the accumulating unit, and a prefetching unit for requesting information or a service relating to position information which is expected to be necessary from the information center on the basis of the result of the action detection by the action detecting unit, and accumulating the information or the service relating to the position information sent from the information center in response to the request in the accumulating unit.

According to this invention, the mobile communicating system and the mobile terminal used in the mobile communicating system can automatically accumulate information or services necessary (expected to be necessary) to the user in the (terminal-side) accumulating unit to a certain degree according to an action of the user so that the user can utilize desired information or a service relating to position information (hereinafter, referred simply as "position relating information/service" on occasion) without establishing at all times a communication with the information center. This feature provides the following advantages:

(1) a time of communication with the information center is decreased so as to largely decrease a cost of communication;

(2) a delay time generated until necessary position relating information/service is provided is largely decreased so that operability and utility for the user are largely improved; and (3) the user can certainly use desired position relating information/service even if a communication with the information center is impossible or unstable so that reliability of the system is largely improved.

The present invention also provides a storage medium used in a mobile communicating system having at least one information center and a mobile terminal connected to the information center with a predetermined communicating method and having a computer for controlling at least a communication with the information center, the storage medium being able to provide a desired computer program to the computer of the mobile terminal by being connected to the mobile terminal, characterized by that the storage medium stores a computer program for functioning the computer as an accumulating unit for accumulating information or a service relating to position information according to a movement of the mobile terminal, an information/service utilizing unit for utilizing the information or the service relating to the position information, an action detecting unit for detecting an action of a user of the mobile terminal, an information requesting unit for requesting the information or the service relating to the position information from the information center on the basis of a result of action detection by the action detecting unit and accumulating the information or the service relating to the position information sent from the information center in response to the request in the accumulating unit and a prefetching unit for demanding information or a service relating to position information which is expected to be necessary on the basis of the result of the action detection by the action detecting unit form the information center and accumulating the information or the service relating to the position information sent from the information center in response to the request in the accumulating unit.

According to this invention, the storage medium used in the mobile communicating system stores computer programs which functions the computer of the mobile terminal as the accumulating unit, the information/service utilizing unit, the action detecting unit, the information demanding unit and the prefetching unit. The above computer program is provided to the mobile terminal, whereby the mobile terminal can operate as a terminal having the above units even if the mobile terminal is an existing one. In consequence, this feature largely contributes to flexibility in configuring the system and versatility of the system.

BRIEF DESCRIPTION OF THE DRAWINGS

FIG. 9 is a diagram showing an example of a CSID-position information conversion table according to the first embodiment;

FIG. 15 is a diagram showing an example of an HTML document used in the mobile communicating system according to the first embodiment;

FIG. 16 is a diagram showing another example of the HTML document used in the mobile communicating system according to the first embodiment;

FIG. 24 is a diagram for illustrating a method of inputting town information in the up-loading operation according to the first embodiment;

FIG. 47 is a diagram for illustrating another method of configuring the correspondence database in the mobile communicating system according to the first embodiment;

FIG. 62 is a diagram showing an example of a reference file list used in the caching unit according to the second embodiment;

FIG. 67 is a diagram for illustrating a prefetching procedure according to the second embodiment;

FIG. 73 is a block diagram showing an example of a memory card used in the mobile communicating system according to the second embodiment.

Figure 1:
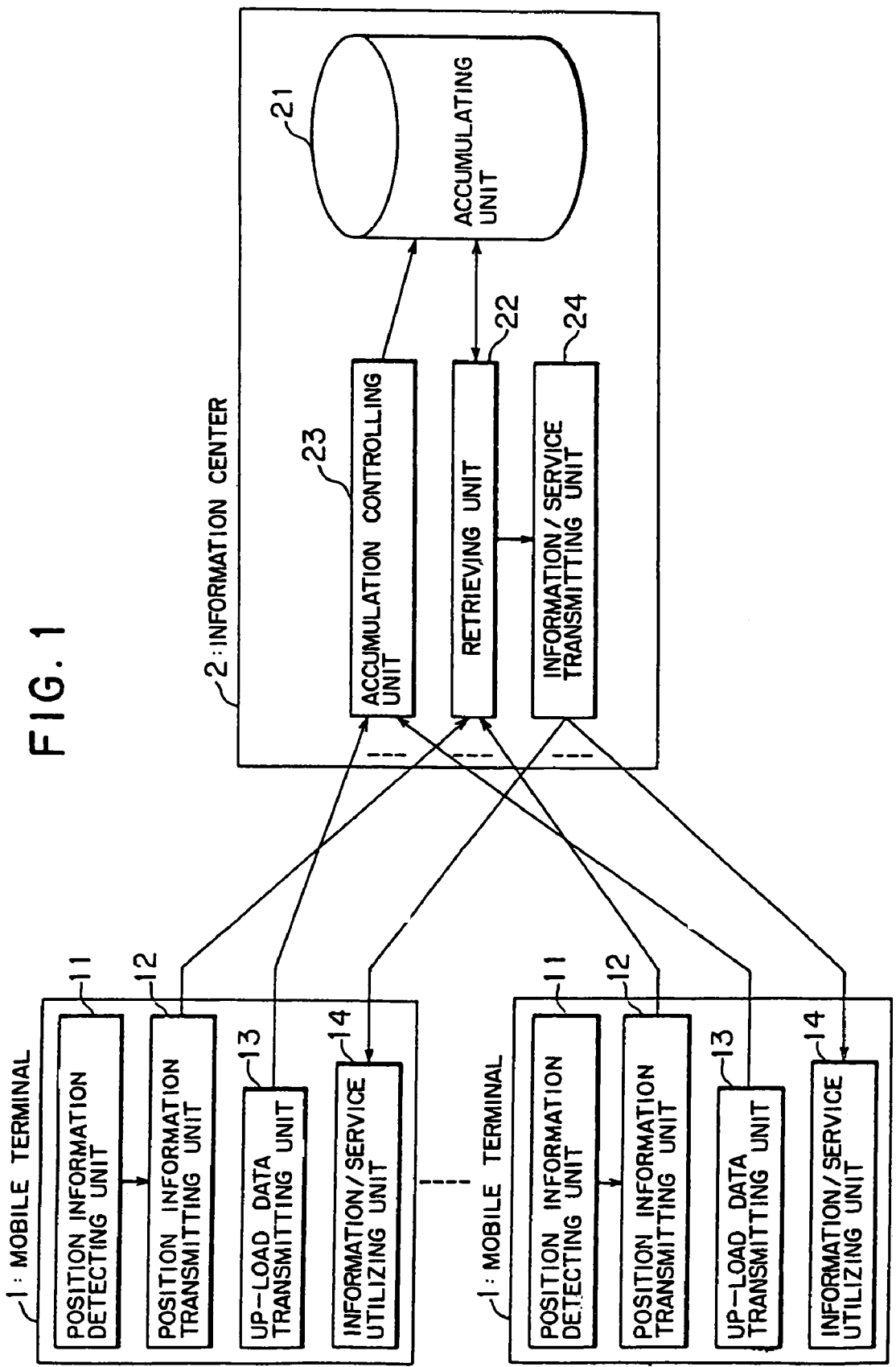
FIGS. 1 through 5 are block diagrams showing aspects of this invention.

DESCRIPTION OF THE PREFERRED EMBODIMENTS (a) Description of Aspects of the Invention Now, description will be made of aspects of this invention referring to the drawings.

FIG. 1 is a block diagram showing an aspect of this invention. In FIG. 1, reference numeral 1 denotes a plurality of mobile terminals and 2 denotes an information center. Each of the mobile terminals 1 is connected to the information center 2 with a predetermined communicating method to configure a mobile communicating system. Incidentally, it is sufficient that there is at least one information center 2.

As shown in FIG. 1, each of the mobile terminals 1 has a position information detecting unit 11, a position information transmitting unit 12, an up-load data transmitting unit 13 and an information/service utilizing unit 14. The information center 2 has an accumulating unit 21, a retrieving unit 22, an accumulation controlling unit 23 and an information/service transmitting unit 24.

In each of the mobile terminals 1, the position information detecting unit 11 detects position information of the mobile terminal 1. The position information transmitting unit 12 transmits the position information detected by the position information detecting unit 11 to the information center 2. The up-load data transmitting unit 13 transmits information or a service relating to the above position information as up-load data to the information center 2. The information/service utilizing unit 14 utilizes information or a service relating to the position information transmitted from the information center 2.

In the information center 2, the accumulating unit 21 accumulates information or a service relating to information of a position according to a movement of the mobile terminal 1. The retrieving unit 22 receives position information transmitted from the mobile terminal 1, and retrieves information or a service relating to the position information accumulated in the accumulating unit 21. The accumulation controlling unit 23 accumulates in the accumulating unit 21 the information or the service relating to position information as up-load data transmitted through the up-load data transmitting unit 13 in the mobile terminal 1. The information/service transmitting unit 24 takes out information or a service relating to the position information retrieved by the retrieving unit 22 from the accumulating unit 21, and transmits the information or the service relating to the position information to the mobile terminal 1 having transmitted the position information.

In the mobile communicating system (the mobile terminal 1 and the information center 2) with the above structure according to this invention, the mobile terminal 1 transmits position information of its own to the information center 2 so as to utilize information or a service relating to the position information accumulated in the accumulating unit 21 in the information center 2. In this system, each of the mobile terminals 1 transmits information or a service relating to the position information as up-load data to the information center 2 through the up-load data transmitting unit 13, thereby accumulating and updating on occasion information or services in the information center 2 (the accumulating unit 21) to always retain information or services required by the mobile terminals 1 in the information center 2.

According to the above mobile communicating system, each of the mobile terminals 1 can utilize information or services relating to position information accumulated in the information center 2. In addition, each of the mobile terminals 1 provides information or a service relating to position information as up-load data to the information center 2, thereby accumulating and updating on occasion information or services in the information center 2 to retain information or services required by the mobile terminal 1 in a learning fashion in the information center 2. It is therefore possible to meet more certainly needs for various information or services of the users if the system is operated more frequently.

The above information center 2 and each of the mobile terminals 1 may be connected with a communicating method utlizing a radio base station or a communicating unit through a fixed terminal. Therefore, each of the mobile terminals 1 may arbitrarily select a method of connecting to the information center 2 depending on a situation at that time. This feature largely contributes to improvement of the flexibility or the service in operating the system.

If the above position information detecting unit 11 of the mobile terminal 1 is configured as a unit for detecting position information of the mobile terminal 1 utilizing a satellite, the mobile terminal 1 may accurately detect position information of its own. It is therefore possible to omit a procedure or the like to input position information by the user, whereby a burden of the information inputting operation on the user may be largely reduced.

If the information center 2 and each of the mobile terminals 1 are connected with a communicating method utlizing the radio base station, the position information detecting unit 11 of each of the mobile terminals 1 is configured as a unit for detecting position identification information of the radio base station to which the mobile terminal 1 is connected. It is therefore possible to specify a position of the mobile terminal 1 from the position identification information (a communication area) of the radio base station. In consequence, the information center 2 may certainly provide necessary information or a service relating to the position to the mobile terminal 1.

In which case, a position information converting unit for converting the position identification information of the radio base station detected by the position information detecting unit 11 of the mobile terminal 1 into mobile terminal position information is provided in the information center 2 or the mobile terminal 1, whereby the information center 2 may independently provide information or a service relating to position information to the corresponding mobile terminal 1 on the basis of the received position information of the mobile terminal 1 without being conscious of the position identification information of the radio base station. This feature may largely improve flexibility in configuring the system.

If the above information center 2 and each of the mobile terminals 1 are connected with a communicating method utlizing a fixed terminal, the position information detecting unit 11 of each of the mobile terminals 1 is configured as a unit for detecting position identification information of the fixed terminal to which the mobile terminal 1 is connected. It is therefore possible to specify a position of the mobile terminal 1 from position identification information (an installation area) of the fixed terminal. The information center 2 may therefore certainly provide necessary information or a service relating to position to the mobile terminal 1.

In the above case, a position information converting unit for converting the position identification information of the fixed terminal detected by the position information detecting unit 11 of the mobile terminal 1 into mobile terminal position information is provided in the information center 2 or the mobile terminal 1, whereby the information center 2 may independently provide information or a service relating to position information to the mobile terminal 1 on the basis of the received position information of the mobile terminal 1 without being conscious of the position identification information of the fixed terminal. It is therefore possible to largely improve flexibility in configuring the system.

Information relating to the above position information is information including information of a map including the current position of the mobile terminal 1 and information of facilities on the map. For this, the mobile terminal 1 may obtain not only the map information but also the detailed information of facilities on the map from the information center 2. This feature may further improve the service of this system.

In concrete, in the above information center 2, the accumulating unit 21 has an accumulating unit for specified mobile terminals and an accumulating unit for unspecified mobile terminals, the retrieving unit 22 has a retrieving unit for specified mobile terminals and a retrieving unit for unspecified mobile terminals, the accumulation controlling unit 23 has an accumulation controlling unit for specified mobile terminals and an accumulation controlling unit for unspecified mobile terminals, and the information/service transmitting unit has an information/service transmitting unit for specified mobile terminals and an information/service transmitting unit for unspecified mobile terminals.

In the accumulating unit 21, the accumulating unit for specified mobile terminals accumulates information or services relating to position information of specified mobile terminals 1, whereas the accumulating unit for unspecified mobile terminals accumulates information or services relating to position information of all mobile terminals 1.

In the retrieving unit 22, the retrieving unit for specified mobile terminals receives position information transmitted from a specified mobile terminal 1 and retrieves information or a service relating to the position information accumulated in the accumulating unit for specified mobile terminals in the accumulating unit 21, whereas the retrieving unit for unspecified mobile terminals receives position information transmitted from any one of the plurality of mobile terminals 1 and retrieves information or a service relating to the position information accumulated in the accumulating unit for unspecified mobile terminals in the accumulating unit 21.

In the accumulation controlling unit 23, the accumulation controlling unit for specified mobile terminals accumulates information or a service relating to the position information transmitted as up-load data through the up-load data transmitting unit 13 of a specified mobile terminal 1 in the accumulating unit for specified mobile terminals in the accumulating unit 21, whereas the accumulation controlling unit for unspecified mobile terminals accumulates information or a service relating to position information transmitted as up-load data through the up-load data transmitting unit 13 in any one of the plurality of mobile terminals 1 in the accumulating unit for unspecified mobile terminals in the accumulating unit 21.

In the information/service transmitting unit 24, the information/service transmitting unit for specified mobile terminals takes out information or a service relating to the position information retrieved by the retrieving unit for specified mobile terminals in the above retrieving unit 22 from the accumulating unit for specified mobile terminals in the accumulating unit 21, and transmits the above information or the service relating to the position information to the specified mobile terminal 1 having transmitted the position information, whereas the information/service transmitting unit for unspecified mobile terminals takes out information or a service relating to the position information retrieved by the retrieving unit for unspecified mobile terminals in the above retrieving unit 22 from the accumulating unit for unspecified mobile terminals in the accumulating unit 21, and transmits the above information or service relating to the position information to the mobile terminal 1 having transmitted the position information.

Namely, the accumulating unit 21, the retrieving unit 22, the accumulation controlling unit 23 and the information/service transmitting unit 24 in the information center 2 each has units in two sorts, that is, for specified mobile terminals and for unspecified mobile terminals. The information center 2 may clearly divide (hierarchize) information or services relating to the position information of the mobile terminals 1 into for specified mobile terminals and for unspecified mobile terminals to manage it. It is therefore possible to largely reduce a burden of maintenance and management of information or services in the information center 2.

The mobile terminal 1 may have a receiving unit for receiving information or a service relating to position information transmitted from the information center 2 to another mobile terminal 1 from that mobile terminal (the another mobile terminal) 1 with a radio communicating method, and a secondary information/service utilizing unit for utilizing the information or the service relating to the position information received by the receiving unit, thereby exchanging information or a service relating to position information with another mobile terminal 1 without directly accessing to the information center 2 to secondarily utilize it.

In particular, if a plurality of mobile terminals 1 commonly possess the same information or services, each of the mobile terminals 1 does not need to obtain information or a service relating to position information of its own from the information center 2. It is therefore possible to minimize a scale of the source (the accumulating unit) in the information center 2.

Figure 2:
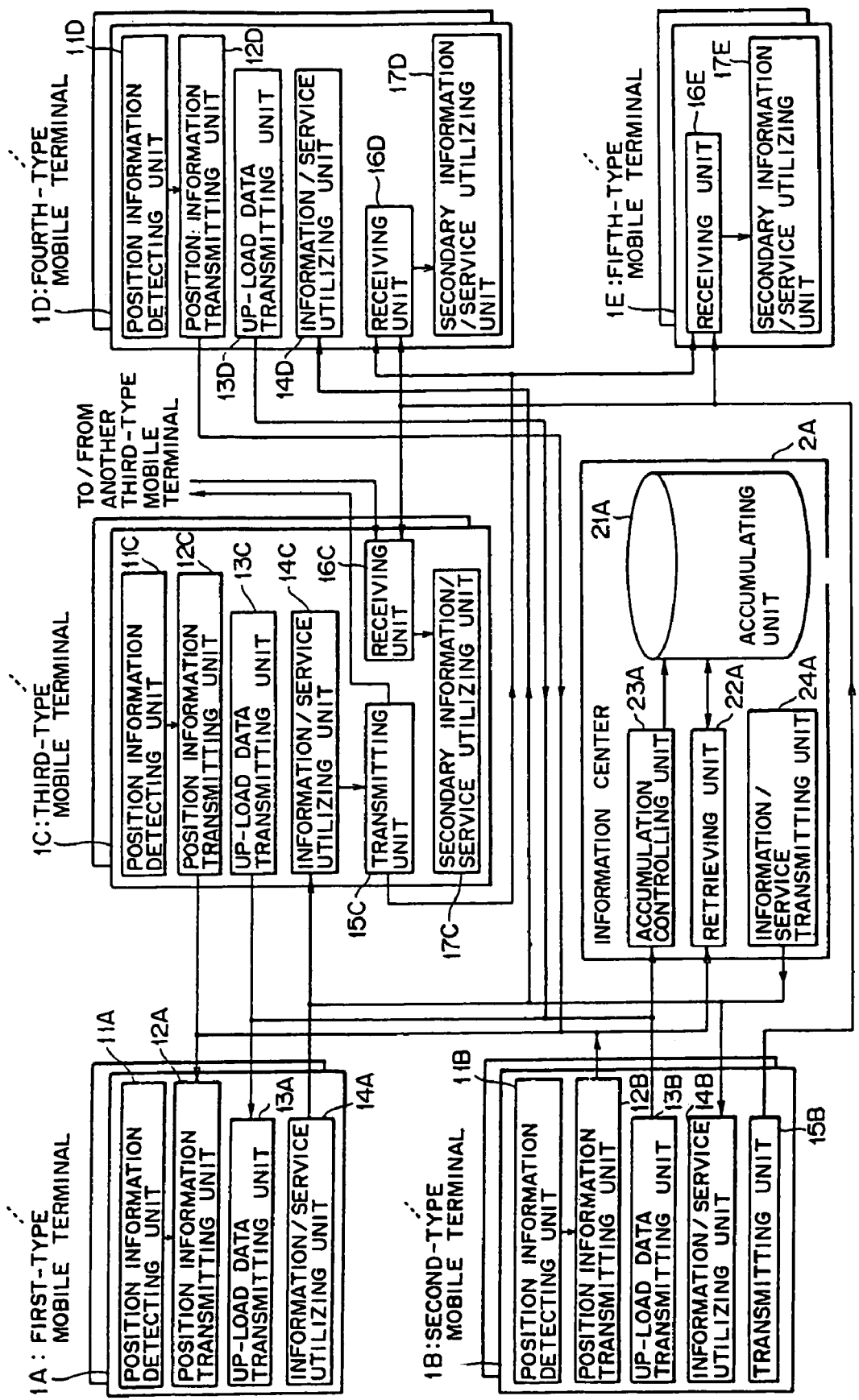

FIG. 2 is a block diagram showing another aspect of this invention. In FIG. 2, reference numerals 1A through 1E denote a plurality of mobile terminals, and 2A denotes an information center. In a mobile communicating system shown in FIG. 2, the mobile terminals 1A through 1E are classified into a first- to fifth-type mobile terminals, each of which is connected to the information center 2A with a predetermined communicating method. Incidentally, it is sufficient that there is at least one information center 2A as same as the above.

The first-type mobile terminal 1A is of the same type as the mobile terminal 1 shown in FIG. 1, which has a position information detecting unit 11A, a position information transmitting unit 12A, an up-load data transmitting unit 13A and an information/service utilizing unit 14A.

The position information detecting unit 11A detects position information of the mobile terminal 1A. The position information transmitting unit 12A transmits the position information detected by the position information detecting unit 11A to the information center 2A. The up-load data transmitting unit 13A transmits information or a service relating to the position information as up-load data to the information center 2A. The information/service utilizing unit 14A utilizes information or a service relating to the position information transmitted from the information center 2A.

The above first-type mobile terminal 1A may directly receive information or a service relating to position information of the terminal from the information center 2A to utilize it. In addition, the first-type mobile terminal 1A may transmit up-load data to the information center 2A to update on occasion information or services in the information center 2A.

The second-type mobile terminal 1B has a transmitting unit 15B for transmitting information or a service relating to position information transmitted from the information center 2A to another mobile terminal (at least any one of the third- to fifth-type mobile terminals 1C through 1E) with a radio communicating method, in addition to a position information detecting unit 11B, a position information transmitting unit 12B, an up-load data transmitting unit 13B and an information/service utilizing unit 14B similar to the above unit 11A through 14A.

The second-type mobile terminal 1B may directly access to the information center 2A to utilize and update information or a service relating to position information of the terminal 1B, besides updating on occasion information or services in the information center 2A by transmitting up-load data similarly to the above first-type mobile terminal 1A. Moreover, the second-type mobile terminal 1B may transmit information or a service relating to position information transmitted from the information center 2A to another mobile terminal (at least any one of the third- to fifth-type mobile terminals 1C through 1E).

The third-type mobile terminal 1C has a transmitting unit 15C, a receiving unit 16C and a secondary information/service utilizing unit 17C, in addition to a position information detecting unit 11C, a position information transmitting unit 12C, an up-load data transmitting unit 13C and an information/service utilizing unit 14C similar to the above units 11A through 14A.

The transmitting unit 15C transmits information or a service relating to position information received from the information center 2A to at least any one of another third-type mobile terminal 1C, fourth-type mobile terminal 1D and fifth-type mobile terminal 1E with a radio communicating method. The receiving unit 16C receives information or a service relating to position information transmitted from the information center 2A to the second-type mobile terminal 1B or another third-type mobile terminal 1C from that second-type mobile terminal 1B or that another third-type mobile terminal 1C with a radio communicating method. The secondary information/service utilizing unit 17C utilizes the information or the service relating to the position information received by the receiving unit 16C.

The third-type mobile terminal 1C may directly access to the information center 2A to utilize and update information or a service relating to position information of the terminal 1C similarly to the first-type mobile terminal 1A. In addition, the third-type mobile terminal 1C may transmit information or a service relating to position information transmitted from the information center 2A to another mobile terminals 1C through 1E, besides indirectly receiving information or a service relating to position information transmitted from the information center 2A to the second-type mobile terminal 1B or another third-type mobile terminal 1C from that second-type mobile terminal 1B or that another mobile terminal 1C to secondarily utilize it.

As shown in FIG. 2, the fourth-type mobile terminal 1D has a receiving unit 16D and a secondary information/service utilizing unit 17D in addition to a position information detecting unit 11D, a position information transmitting unit 12D, an up-load data transmitting unit 13D and an information/service utilizing unit 14D similar to the units 11A through 14A in the first-type mobile terminal 1A.

The receiving unit 16D receives information or a service relating to position information transmitted from the information center 2A to the second-type mobile terminal 1B or the third-type mobile terminal 1C from that second-type mobile terminal 1B or that third-type mobile terminal 1C with a radio communicating method. The secondary information/service utilizing unit 17D utilizes the information or the service relating to the position information received by the receiving unit 16D.

The fourth-type mobile terminal 1D may directly access to the information center 2A to utilize and update information or a service relating to position information of the terminal 1D similarly to the first-type mobile terminal 1A. Moreover, the fourth-type mobile terminal 1D may indirectly receive information or a service relating to position information transmitted from the information center 2A to the second-type mobile terminal 1B or the third-type mobile terminal 1C from that second-type mobile terminal 1B or that third-type mobile terminal 1C to secondarily utilize it.

The fifth-type mobile terminal 1E has a receiving unit 16E and a secondary information/service utilizing unit 17E similar to the receiving unit 16D and the secondary information/service utilizing unit 17D of the above fourth-type mobile terminal 1D. The receiving unit 16E receives information or a service relating to position information transmitted from the information center 2A to the second-type mobile terminal 1B or the third-type mobile terminal 1C from that second-type mobile terminal 1B or that third-type mobile terminal 1C with a radio communicating method. The secondary information/service utilizing unit 17E utilizes the information or the service relating to the position information received by the receiving unit 16E.

If the fifth-type mobile terminal 1E cannot directly receive information or a service relating to position information of the terminal 1E from the information center 2A as the above first- to fourth-type mobile terminals 1A through 1D, the fifth-type mobile terminal 1E can indirectly receive information or a service relating to position information transmitted from the information center 2A to the second-type mobile terminal 1B or the third-type mobile terminal 1C from that second-type mobile terminal 1B or that third-type mobile terminal 1C to utilize it.

On the other hand, the information center 2A has an accumulating unit 21A, a retrieving unit 22A, an accumulation controlling unit 23a and an information/service transmitting unit 24A. The accumulating unit 21A accumulates information or services relating to information of positions according to a movement of at least the first- to fourth-type mobile terminals 1A through 1D. The retrieving unit 22A receives position information transmitted from the first- to fourth-type mobile terminals 1A through 1D, and retrieves information or services relating to position information accumulated in the accumulating unit 21A.

The accumulation controlling unit 23a accumulates information or services transmitted as up-load data through the up-load data transmitting units 13A through 13D of the first- to fourth-type mobile terminals 1A through 1D in the accumulating unit 21A. The information/service transmitting unit 24A takes out the information or service relating to the position information retrieved by the retrieving unit 22A from the accumulating unit 21A, and transmits the information or service relating to the position information to the any one of the first- to fourth-type mobile terminals 1A through 1D having transmitted the position information.

The information center 2A can retrieve and take out information or a services relating to position information accumulated in the accumulating unit 21A on the basis of the position information received form any one of the first- to fourth-type mobile terminals 1A through 1D to provide it to that first-, second-, third- or fourth-type mobile terminal 1A, 1B, 1C or 1D having transmitted the position information. Moreover, the information center 2A may always retain information or services required by the first- to fourth-type mobile terminals 1A through 1D by accumulating on occasion up-load data from the first to fourth-type mobile terminals 1A through 1D in the accumulating unit 21A.

According to the above system, the plurality of mobile terminal 1A through 1E are classified into the first- to fifth-type mobile terminals 1A through 1E. The second-type mobile terminal 1B and the third-type mobile terminal 1C have the respective transmitting unit 15B and 15C for transmitting information or services relating to position information transmitted from the information center 2A to another mobile terminals (the third- to fifth-type mobile terminals 1C through 1E). The third- to fifth-type mobile terminals 1C through 1E have the respective receiving unit 16C through 16E for receiving information or services relating to position information transmitted from the information center 2A to another mobile terminals (the second- and third-type mobile terminals 1B and 1C) from these another mobile terminals. In consequence, at least the third- to fifth-type mobile terminals 1C through 1E each does not need to directly obtain information or a service relating to position information from the information center 2A so that a scale of the source (the accumulating unit) in the information center 2A can be minimized.

Figure 3:
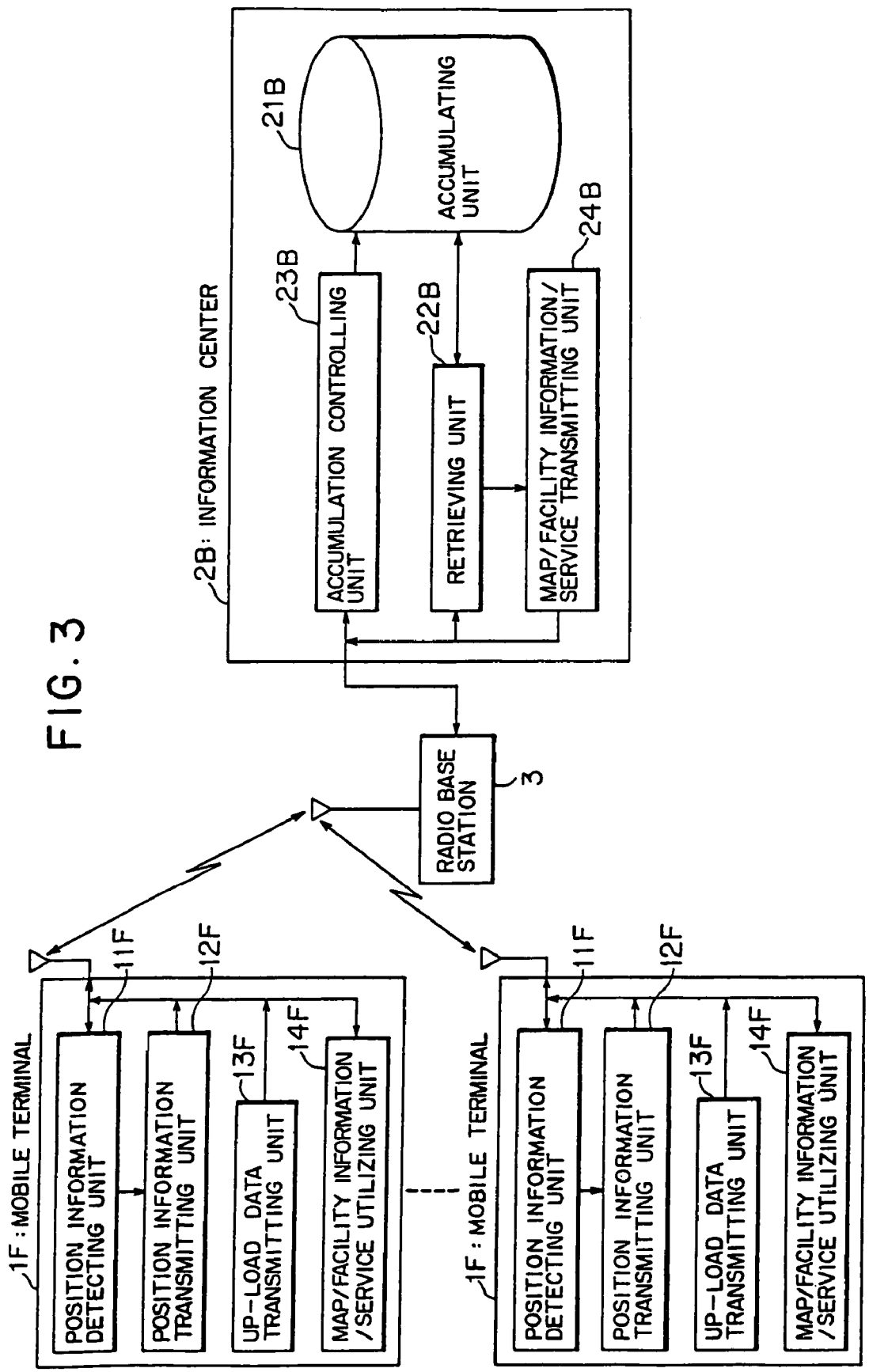

FIG. 3 is a block diagram showing still another aspect of the invention. In FIG. 3, reference numeral 1F denotes a plurality of mobile terminals, 2B denotes an information center, and 3 denotes a radio base station. Each of the mobile terminals 1F is connected to the information center 2B via the radio base station 3 over a radio line to configure a mobile communicating system. Incidentally, it is sufficient that there is at least one information center 2B as same as the above.

As shown in FIG. 3, each of the mobile terminals IF has a position information detecting unit 11F, a position information transmitting unit 12F, an up-load data transmitting unit 13F and a map/facility information/service utilizing unit 14F. The information center 2B has an accumulating unit 21B, a retrieving unit 22B, an accumulation controlling unit 23B and a map/facility information/service transmitting unit 24B.

In each of the mobile terminals 1F, the position information detecting unit 11F detects position information of the mobile terminal 1F. The position information transmitting unit 12F transmits the position information detected by the position information detecting unit 11F to the information center 2B. The up-load data transmitting unit 13F transmits information or a service relating to the above position information as up-load data to the information center 2B. The map/facility information/service utilizing unit 14F utilizes information of a map, information of facilities on the map or a service as to the map or the facilities transmitted from the information center 2B.

On the other hand, in the information center 2B, the accumulating unit 21B accumulates information of a map, information of facilities on the map, or a service as to the map or the facilities as information relating to information of a position according to a movement of the mobile terminal 1F. The retrieving unit 22B receives position information transmitted from the mobile terminal 1F, and retrieves information of a map, information of facilities on the map or a service as to the map or the facilities accumulated in the accumulating unit 21B.

The accumulation controlling unit 23B accumulates the information or the service relating to position information transmitted as up-load data through the up-load data transmitting unit 13F of the mobile terminal 1F in the accumulating unit 21B. The map/facility information/service transmitting unit 24B takes out the above information of a map, the information of facilities on the map or the service as to the map or the facilities retrieved by the retrieving unit 22B, and transmits the information of the map, the information of the facilities on the map or the service as to the map or the facilities to the mobile terminal 1F having transmitted the position information.

In the mobile communicating system with the above structure of this invention, not only information of a map accumulated in the accumulating unit 21B in the information center 2B but also information of facilities on the map or a service as to the map or the facilities may be used at the mobile terminal 1F. Further, each of the mobile terminals 1F transmits information or a service relating to position information as up-load data through the up-load data transmitting unit 13 to the information center 2, thereby updating on occasion information or services in the information center 2B (the accumulating unit 21B) so that the information center 2B may always retain information or services required by the mobile terminals 1F therein.

It is therefore possible to carefully meet demands of the users. This feature largely contributes to improvement of the service. In addition, it is possible to more certainly meet needs for various information or services of the user if the system is operated more frequently.

Figure 4:
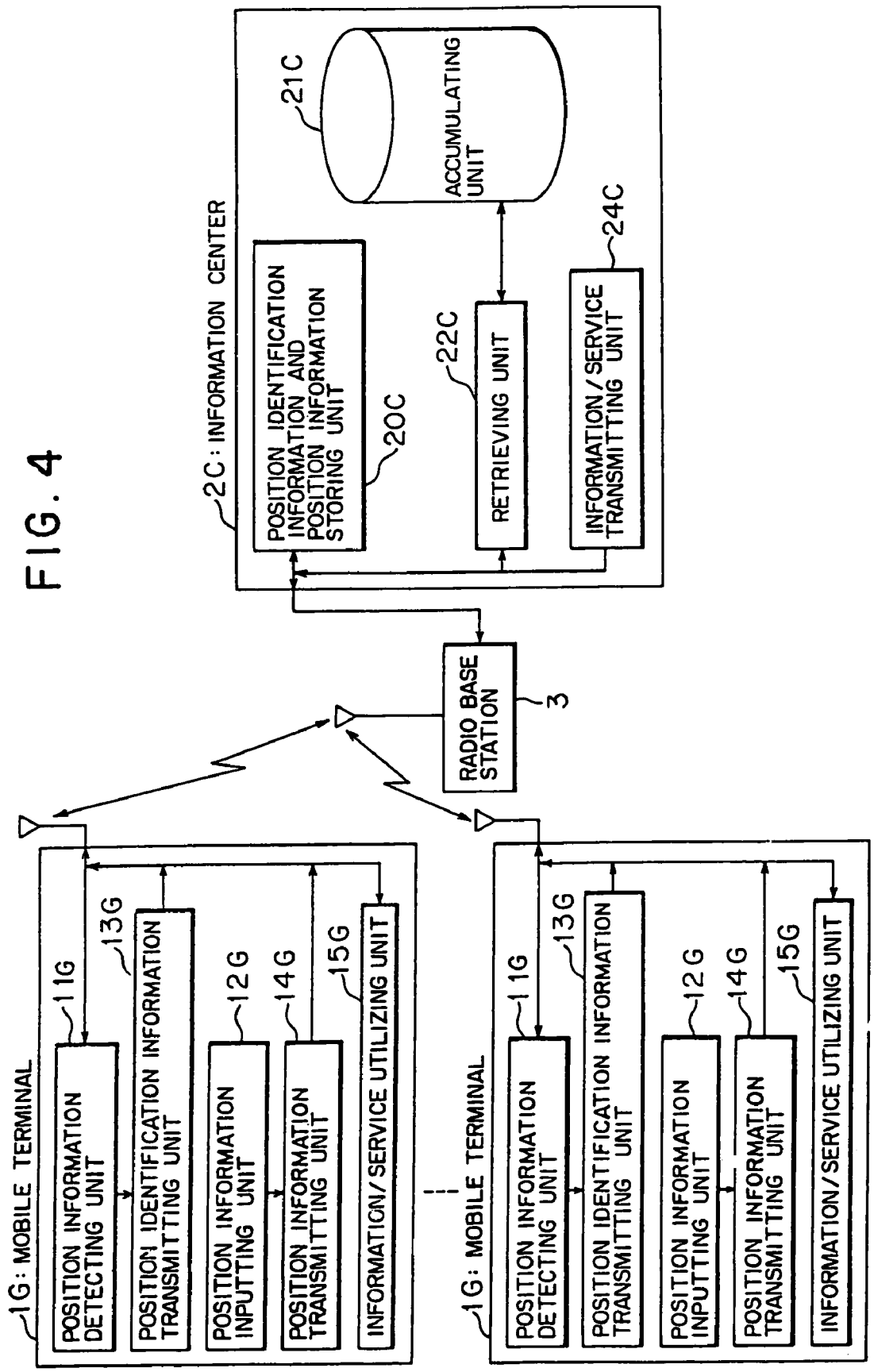

FIG. 4 is a block diagram showing still another aspect of this invention. In FIG. 4, reference numeral 1G denotes a plurality of mobile terminals, 2C denotes an information center and 3 denotes a radio base station. Each of the mobile terminals 1G is connected to the information center 2C via the radio base station 3 over a radio line to configure a mobile communicating system. Incidentally, it is sufficient that there is at least one information center 2C as same as the above.

As shown in FIG. 4, each of the mobile terminal 1G has a position information detecting unit 11G, a position information inputting unit 12G, a position identification information transmitting unit 13G, a position information transmitting unit 14G, and an information and service utilizing unit 15G. The information center 2C has a position identification information and position information storing unit 20C, an accumulating unit 21C, a retrieving unit 22C and an information/service transmitting unit 24C.

In each of the mobile terminals 1G, the position information detecting unit 11G detects position information of the mobile terminal 1G as position identification information of the radio base station 3. The position information inputting unit 12G inputs position information of the mobile terminal 1G. The position identification information transmitting unit 13G transmits the position identification information of the radio base station 3 detected by the above position information detecting unit 11G to the information center 2C. The position information transmitting unit 14G transmits the position information of the mobile terminal 1G fed from the above position information inputting unit 12G to the information center 2C. The information/service utilizing unit 15G utilizes information or a service relating to the position information transmitted from the information center 2C.

On the other hand, in the information center 2C, the position identification information and position information storing unit 20C corresponds position identification information of the radio base station 3 transmitted from the position identification information transmitting unit 13G of the mobile terminal 1G to position information of the mobile terminal 1G transmitted from the position information transmitting unit 14G of the mobile terminal 1G and stores them. The accumulating unit 21C accumulates information or a service relating to information of a position according to a movement of the mobile terminal 1G.

If the information center 2C receives information relating to a position transmitted from the mobile terminal 1G and the received information is position identification information of the radio base station 3, the retrieving unit 22C retrieves in the accumulating unit 21C information or a service relating to position information of the mobile terminal 1G corresponding to the position identification information of the radio base station 3 stored in the above position identification information and position information storing unit 20C. If the received information is position information of the mobile terminal 1G, the retrieving unit 22C retrieves information or a service relating to the position information of the mobile terminal 1G in the accumulating unit 21C.

The information/service transmitting unit 24C takes out the information or the service relating to the position information retrieved by the retrieving unit 22C from the accumulating unit 21C, and transmits the information or the service relating to the position information to the mobile terminal 1G having transmitted the position information.

In the mobile communicating system (the mobile terminal 1G and the information center 2C) with the above structure of this invention, the mobile terminal 1G may receive information or a service relating to position information from the information center 2C to utilize it. In this system, each of the mobile terminals 1G separately transmits position identification information of the radio base station 3 and position information of the mobile terminal 1G to the position identification information and position information storing unit 20C of the information center 2C, whereby the information center 2C may independently configure data of the position identification information of the radio base station 3 and the position information of the mobile terminal 1G corresponded to each other even if not grasping in advance the position identification information of the radio base station 3.

It is therefore possible to realize a system not relying on the communication network. This feature largely contributes to flexibility in configuring the system.

Incidentally, the above position identification information and position information storing unit 20C in the information center 2C may be configured with storing units in two sorts, that is, for specified mobile terminals and for unspecified mobile terminals. It is thereby possible to clearly divide (hierarchize) position identification information of the radio base station 3 and position information of the mobile terminals 1G into for specified mobile terminals and for unspecified mobile terminals to manage them.

In consequence, it is possible to largely reduce a burden of maintenance and management of information in the position identification information and position information storing unit 20C.

Figure 5:
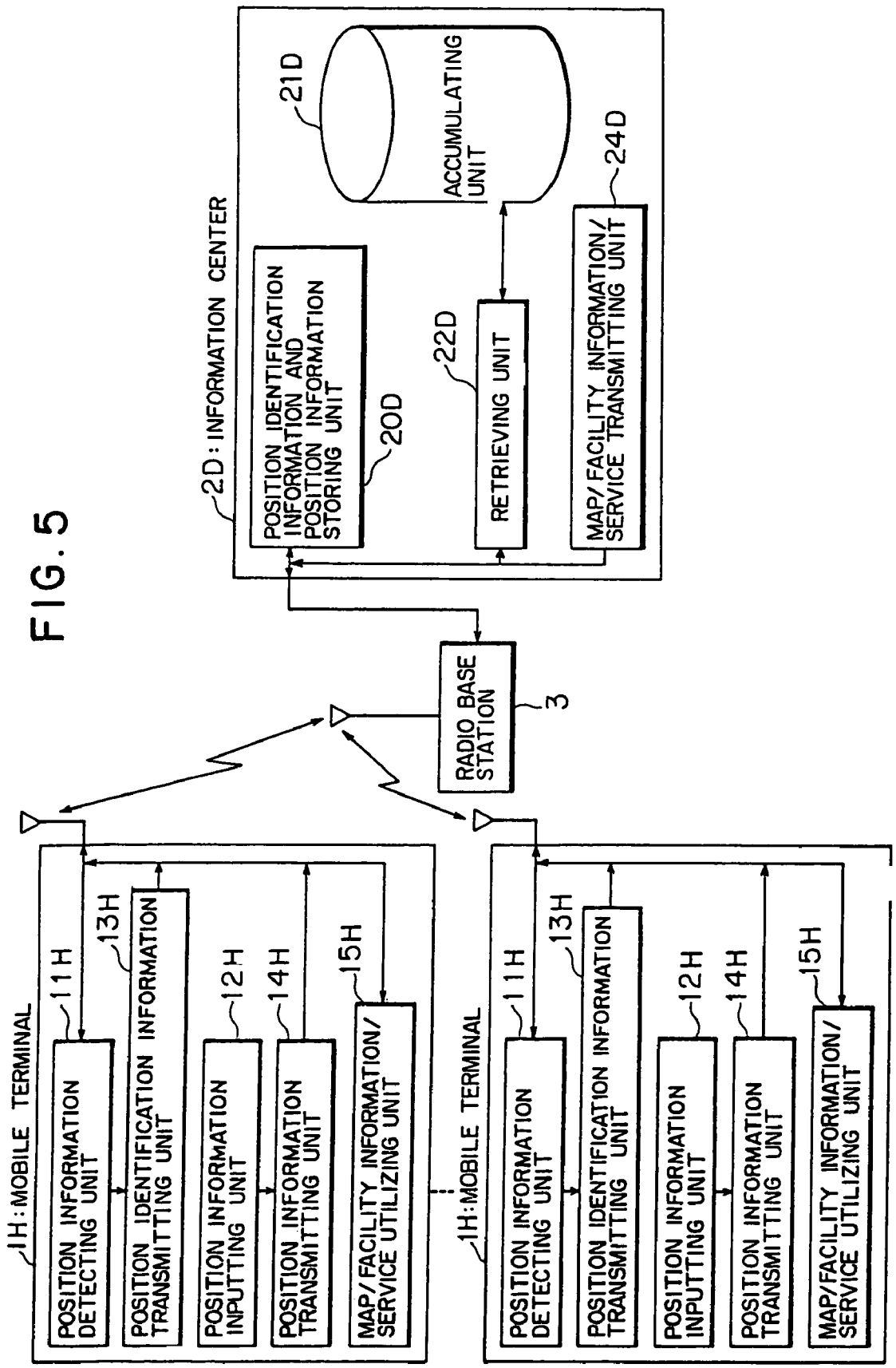

FIG. 5 is a block diagram showing still another aspect of the invention. In FIG. 5, reference numeral 1H denotes a plurality of mobile terminals, 2D denotes an information center and 3 denotes a radio base station. Each of the mobile terminals 1H is connected to the information center 2D via the radio base station 3 over a radio line to configure a mobile communicating system. Incidentally, it is sufficient that there is at least one information center 2D as same as the above.

As shown in FIG. 5, each of the mobile terminals 1H has a position information detecting unit 11H, a position information inputting unit 12H, a position identification information transmitting unit 13H, a position information transmitting unit 14H and a map/facility information/service utilizing unit 15H. The information center 2D has a position identification information and position information storing unit 20D, an accumulating unit 21D, a retrieving unit 22D and a map/facility information/service transmitting unit 24D.

In each of the mobile terminals 1H, the position information detecting unit 11H detects position information of the mobile terminal 1H as position identification information of the radio base station 3. The position information inputting unit 12H inputs position information of the mobile terminal 1H. The position identification information transmitting unit 13H transmits the position identification information of the radio base station 3 detected by the above position information detecting unit 11H to the information center 2D.

The position information transmitting unit 14H transmits the position information of the mobile terminal 1H fed from the above position information inputting unit 12H to the information center 2D. The map/facility information/service utilizing unit 15H utilizes information of a map, information of facilities on the map or a service as to the map or the facilities transmitted from the information center 2D.

On the other hand, in the information center 2D, the position identification information and position information storing unit 20D corresponds the position identification information of the radio base station 3 transmitted from the position identification information transmitting unit 13H of the mobile terminal 1H to the position information of the mobile terminal 1H transmitted from the position information transmitting unit 14H of the mobile terminal 1H and stores them. The accumulating unit 21D accumulates information of a map, information of facilities on the map or a service as to the map or the facilities as information relating to information of a position according to a movement of the mobile terminal 1H.

If the information center 2D receives information relating to a position transmitted from the mobile terminal 1H and the received information is position identification information of the radio base station 3, the retrieving unit 22D retrieves in the accumulating unit 21D information or a service relating to position information of the mobile terminal 1H corresponding to the position identification information of the radio base station 3 stored in the position identification information and position information storing unit 20D. If the received information is position information of the mobile terminal 1H, the retrieving unit 22D retrieves information or a service relating to the position information of the mobile terminal 1H in the accumulating unit 21D.

The map/facility information/service transmitting unit 24D takes out the information of the map, the information of the facilities on the map, or the service as to the map or the facilities as information or a service relating to the position information retrieved by the retrieving unit 22D from the accumulating unit 21D, and transmits the information of the map, the information of the facilities on the map, or the service as to the map or the facilities to the mobile terminal 1H having transmitted the position information.

In the mobile communicating system with the above structure of this invention, the mobile terminal 1H may receive not only information of a map but also information of facilities on the map or a service as to the map or the facilities from the information center 2D to utilize them. In addition, each of the mobile terminals 1H separately transmits position identification information of the radio base station 3 and position information of the mobile terminal 1H to the position identification information and position information storing unit 20D of the information center 2D, whereby the information center 2D may independently configure data of the position identification information of the radio base station 3 and the position information of the mobile terminal 1H corresponded to each other even if not grasping in advance the position identification information of the radio base station 3.

It is therefore possible to carefully meet demands of the users. This feature largely contributes to improvement of the service. In addition, it is possible to realize a system not relying on the communication network, which contributes to flexibility in configuring the system.

In concrete, the above position information inputting unit 12H of the mobile terminal 1H is so configured as to input position information of the mobile terminal 1H in a displayed map. Accordingly, the user of the mobile terminal 1H can input the current position of his/her own (the mobile terminal 1H) according to the displayed map. This feature may largely reduce a burden of an operation to input position information on the user.

Figure 53:
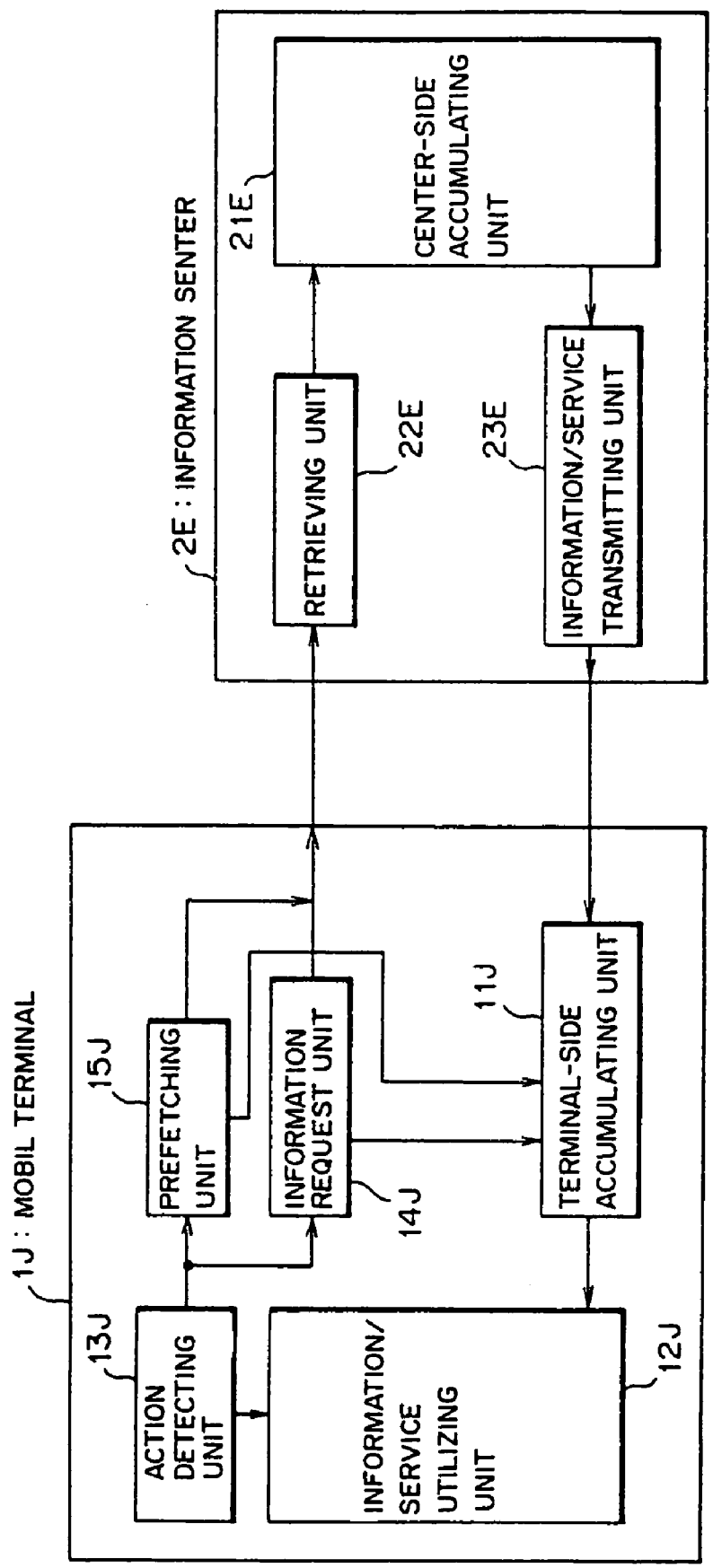
FIGS. 53 and 54 are block diagrams showing still another aspects of this invention.

FIG. 53 is a block diagram showing still another aspect of this invention. In FIG. 53, reference numeral 1J denotes a mobile terminal and reference numeral 2E denotes an information center. The mobile terminal 1J is connected to the information center 2E with a predetermined communicating method to configure a mobile communicating system. Incidentally, it is sufficient that at least one mobile terminal 1J and at least one information center 2E are included in the mobile communicating system.

As shown in FIG. 53, the information center 2E has an (center-side) accumulating unit 21E, a retrieving unit 22E, and an information/service transmitting unit 23E. The mobile terminal 1J has a (terminal-side) accumulating unit 11J, an information/service utilizing unit 12J, an action detecting unit 13J, an information demanding unit 14J and a prefetching unit 15J.

In the information center 2E, the accumulating unit 21E accumulates information or a service relating to information of a position according to a movement of the mobile terminal 1J. The retrieving unit 22E retrieves the information or the service relating to the position information accumulated in the accumulating unit 21E on the basis of a request for the information or the service from the mobile terminal. The information/service transmitting unit 23E takes out the information or the service relating to the position information retrieved by the above retrieving unit 22E from the accumulating unit 21E, and transmits the information or service relating to the position information to the mobile terminal 1J.

In the mobile terminal 1J, the accumulating unit 11J accumulates the information or the service relating to the position information sent from the information center 2E. The information/service utilizing unit 12J utilizes the information or the service relating to the position information. The action detecting unit 13J detects an action of a user.

The information requesting unit 14J requests information or a service relating to position information from the information center 2E on the basis of a result of action detection by the action detecting unit 13J, and accumulates the information or the service relating to the position information sent from the information center 2E in response to the request in the accumulating unit 11J. The prefetching unit 15J requests information or a service relating to position information which is expected to be necessary from the information center 2E on the basis of a result of action detection by the action detecting unit 13J, and accumulates the information or the service relating to the position information sent from the information center 2E in response to the request in the accumulating unit 11J.

In the mobile communicating system with the above structure according to this invention, the mobile terminal 1J requests information or a service from the information center 2E through the information requesting unit 14J on the basis of a request of the user (a result of action detection by the action detecting unit 13J). At this time, the prefetching unit 15J automatically requests information or a service which is expected to be necessary for the user from the information center 2E on the basis of the result of the action detection by the action detecting unit 13J.

In the information center 2E, the retrieving unit 22E retrieves corresponding information or service in the accumulating unit 21E on the basis of the request from the mobile terminal 1J, and the information/service transmitting unit 23E, takes out the retrieved information or service from the accumulating unit 21E, and sends the information or service to the mobile terminal 1J. The mobile terminal 1J accumulates the received information or service in the accumulating unit 11J.

In the mobile terminal 1J, information or services necessary for the user is automatically accumulated in a certain degree in the accumulating unit 11J, whereby the user can use desired information or service relating to position information (hereinafter, referred as "position relating information/service" occasionally) through the information/service utilizing unit 12J without establishing at any time a communication with the information center 2E.

Therefore, the above mobile communicating system (the mobile terminal 1J) has the following advantages:

(1) a time of communication with the information center 2E is decreased so that a cost of communication can be largely reduced.

(2) a delay time generated until necessary position relating information/service is provided is largely decreased so that operability and utility for the user are largely improved; and (3) even if a communication with the information center 2E is impossible or unstable, the user can certainly use desired position relating information/service so that reliability of the system is largely improved.

If the action detecting unit 13J of the mobile terminal 1J is configured such as to detect a provided information/service changing operation by the user, for example, the mobile terminal 1J can automatically obtain position relating information/service according to an action of the user at any time. Accordingly, operability and utility for the user are largely improved.

If an operation to a display screen of the mobile terminal 1J is detected as the above provided information/service changing operation, the user can easily use necessary information or a service relating to a position while referring to the display screen without conducting any special operation to request information/service relating to position information, and irrespectively of the current position of the user (the mobile terminal 1J). In consequence, operability and utility for the user can be improved.

If movement information of the mobile terminal 11J is detected as the above provided information/service changing operation, necessary information or services are automatically accumulated in the accumulating unit 11J with movement of the user so that it becomes unnecessary for the user to access to the information center 2E in order to obtain lacking information or service each time the current position changes. This can improve utility for the user, besides further decreasing a cost of communication.

The information demanding unit 14J of the mobile terminal 1J has, for example, a caching unit for retrieving the accumulating unit 11J when the mobile terminal 1J requests information or a service relating to position information from the information center 2E, taking out the position relating information/service from the accumulating unit 11J without transmitting the request to the information center 2E if the above position relating information/service has been accumulated in the accumulating unit 11J, and supplying it to the information/service utilizing unit 12J.

If the mobile terminal 1J has position relating information/service necessary for the user in the accumulating unit 11J, the mobile terminal 1J can provide the position relating information/service to the user without accessing to the information center 2E so that a time of communication and a quantity of communication with the information center 2E is decreased. The above caching unit may be provided in the prefetching unit 15J. If position relating information/service which is expected to be necessary for the user has been accumulated in the accumulating unit 11J, the user (the mobile terminal 1J) can use the position relating information/service without accessing to the information center 2E. Therefore, a cost of communication can be further decreased.

The above caching unit requests position relating information/service from the information center 2E only when the position relating information/service is not accumulated in the accumulating unit 11J. For this, the mobile terminal 1J accesses to the information center 2E only when necessary so that the mobile terminal 1J can hold necessary (expected to be necessary) position relating information/service while always suppressing a time of communication and a quantity of communication with the information center 2E. In consequence, this feature contributes to a reduction of a cost of communication and reliability of the system.

The above prefetching unit 15J may change an order of requesting position relating information/service which is expected to be necessary according to a result of action detection by the action detecting unit 13J. The prefetching unit 15J changes an order of requesting position relating information/service so as to request position relating information/service which is expected to be promptly necessary in prior to the others. As a result, the user can use necessary position relating information/service without any noticeable delay. This feature can largely improve operability and utility for the user.

The above mobile terminal 1J may have a synchronizing unit for synchronizing position relating information/service accumulated in the terminal-side accumulating unit 11J with the position relating information/service accumulated (held by the information center 2E) in the center-side accumulating unit 21E of the information center 2E. Whereby, the mobile terminal 1J can always hold the same position relating information/service as the information center 2E so as to flexibly react to update of the position relating information/service on the side of the information center 2E, for example. This feature can largely contributes to flexibility in operating the system.

The above synchronizing unit has an information/service list sending unit for sending a list of position relating information/service accumulated in the terminal-side accumulating unit 11J to the information center 2E so as to update the position relating information/service accumulated in the terminal-side accumulating unit 11J on the basis of position relating information/service sent from the information center 2E in response to the sending of the list by the information/service list sending unit.

The mobile terminal 1J reports information as to which position relating information/service the mobile terminal 1J holds to the information center 2E by sending the above list through the information/service list sending unit, and updates the position relating information/service possessed by itself on the basis of position relating information/service sent from the information center 2E in response thereto to automatically supply missing position relating information/service.

Therefore, the mobile terminal 1J can always hold the latest position relating information/service while suppressing a quantity of communication with the information center 2E.

If the above information demanding unit 14J is configured such as to request a part of position relating information/service according to a size of a display region of the mobile terminal 1J, necessary position relating information/service is not sent from the information center 2E at a time so that a time of communication and a quantity of communication with the information center 2E can be further decreased. If the above prefetching unit 15J is configured such as to request a part of position relating information/service according to a size of the display region of the mobile terminal 1J as well, position relating information/service which is expected to be necessary is not sent from the information center 2E at a time so that a time of communication and a quantity of communication with the information center 2E can be further decreased.

In consequence, the mobile terminal 1J can display initial position relating information/service at a high speed, besides being able to decrease a time of communication with the information center 2E. As a result, it is possible to further decrease a cost of communication.

The accumulating unit 11J, the information/service utilizing unit 12J, the action detecting unit 13J, the information demanding unit 14J and the prefetching unit 15J of the mobile terminal 1J may be programmed to be computer programs, and these computer programs may be provided from the information center 2E. The mobile terminal 1J can thereby operate as a terminal having the above units 11J through 15J so long as receiving the above programs from the information center 2E even if the mobile terminal 1J is an existing one. This feature largely contributes to flexibility in configuring the system and versatility of the system.

Incidentally, the above programs may be provided from a predetermined storage medium to the mobile terminal 1J. The mobile terminal 1J can thereby operate as a terminal having the above units 11J through 15J so long as receiving the above programs from the above storage medium even if the mobile terminal 1J is an existing one, or a communication with the information center 2E is impossible. This also largely contributes to flexibility in configuring the system and versatility of the system.

If the above-mentioned synchronizing unit of the mobile terminal 1J is also programmed to be a computer program, and the program is provided from the information center 2E, the mobile terminal 1J can operate as a terminal having the above synchronizing unit even if the mobile terminal 1J is an existing one. Further, if the program is provided from a predetermined storage medium, the mobile terminal 1J can operate as a terminal having the above synchronizing unit even if the mobile terminal 1J is an existing one, or a communication with the information center 2E is impossible. Accordingly, this feature also largely contributes to flexibility in configuring the system and versatility of the system.

Figure 54:
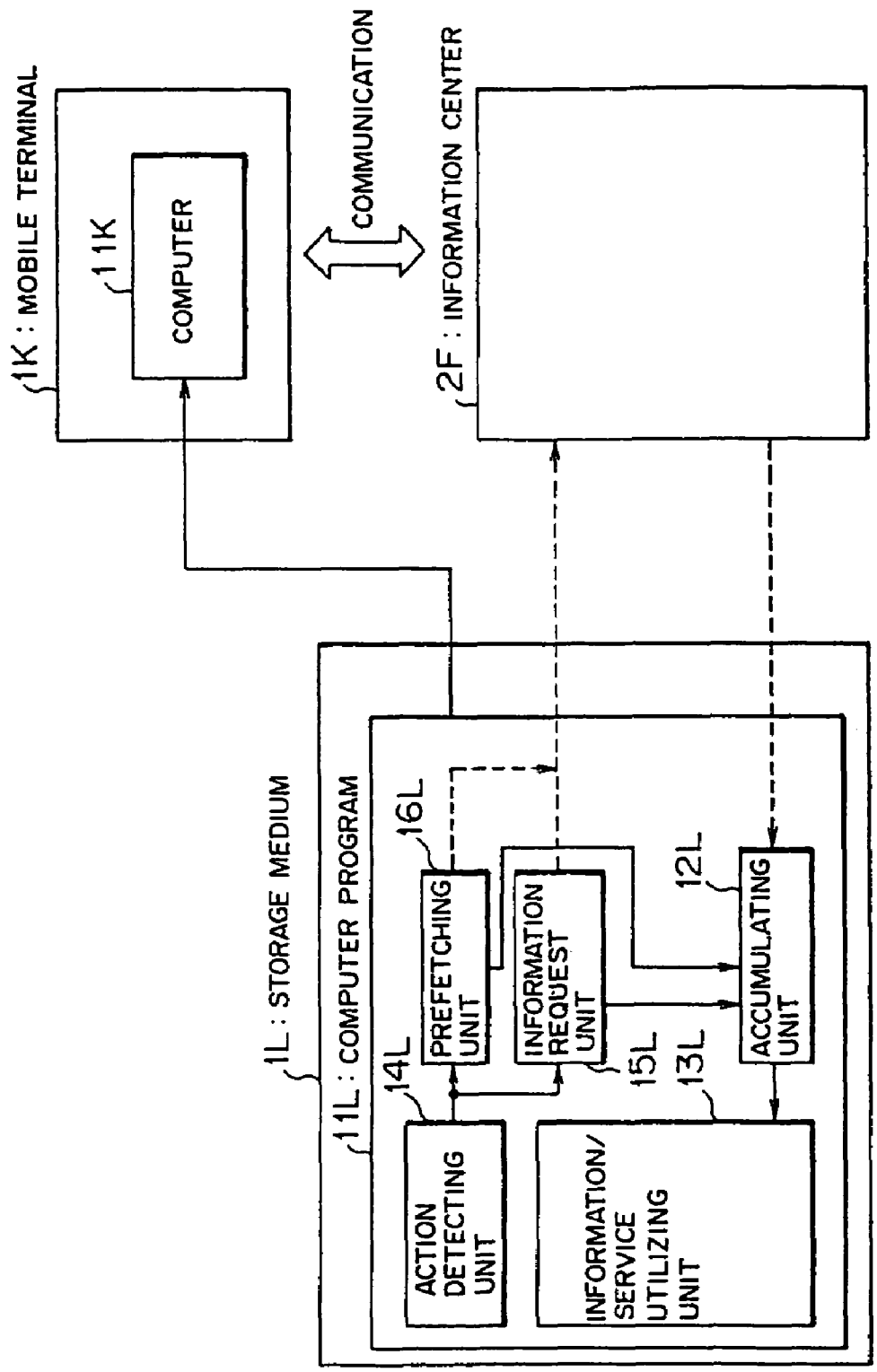

FIG. 54 is a block diagram showing still another aspect of this invention. In FIG. 54, reference numeral 2F denotes an information center, and reference numeral 1K denotes a mobile terminal connected to the information center 2F with a predetermined communicating method and having a computer 11K for at least controlling a communication with the information center 2F. The mobile terminal 1K and the information center 2F configure a mobile communicating system. Incidentally, it is sufficient that at least one mobile terminal 1K and one information center 2F are included in the system.

In FIG. 54, reference numeral 1L denotes a storage medium used in the above mobile communicating system to be able to provide a desired computer program to the computer 11K of the mobile terminal 1K by being connected to the mobile terminal 1K. The storage medium 1L stores a computer program 11L which make the computer 11K function as an accumulating unit 12L, an information/service utilizing unit 13L, an action detecting unit 14L, an information requesting unit 15L and a prefetching unit 16L.

The above accumulating unit 12L accumulates information or a service relating to information of a position according to a movement of the mobile terminal 1K. The information/service utilizing unit 13L utilizes the above position relating information/service. The action detecting unit 14L detects an action of a user.

The information requesting unit 15L requests position relating information/service from the information center 2F on the basis of a result of action detection by the action detecting unit 14L, and accumulates position relating information/service sent from the information center 2F in response to the request in the accumulating unit 12L. The prefetching unit 16L requests position relating information/service which is expected to be necessary on the basis of the result of the action detection by the action detecting unit 14L from the information center 2F, and accumulates position relating information/service sent from the information center 2F in response to the request in the accumulating unit 12L.

The above storage medium 1L provides the above computer programs 11L to the mobile terminal 1K, whereby the mobile terminal 1K (the computer 11K) can operate as a terminal having the accumulating unit 12L, the information/service utilizing unit 13L, the action detecting unit 14L, the information requesting unit 15L and the prefetching unit 16L even if the mobile terminal 1K is an existing one.

Namely, the mobile terminal 1K can thereby automatically accumulate position relating information/service necessary for the user to a certain degree in the accumulating unit 11J so that the user can use desired position relating information/service without establishing a communication with the information center 2F at all times. This feature largely contributes to flexibility in configuring the mobile communicating system and versatility of the system.

The storage medium 1L shown in FIG. 54 may store a computer program which makes the computer 11K function as a synchronizing unit for synchronizing the position relating information/service accumulated in the accumulating unit 12L with position relation information/service held by the information center 2F, in addition to the computer program 11L which makes the computer 11K function as the above accumulating unit 12L, the information/service utilizing unit 13L, the action detecting unit 14L, the information requesting unit 15L and the prefetching unit 16L.

The storage medium 1L provides the computer program to the mobile terminal 1K, whereby the mobile terminal 1K can operate as a terminal which can synchronize the position relating information/service accumulated in the accumulating unit 12L with the position relating information/service held by the information center 2F even if the mobile terminal 1K is an existing one.

This feature also largely contributes to flexibility in configuring the mobile communicating system and versatility of the system.

(b) Description of a First Embodiment of the Invention

Next, description will be made of a first embodiment of this invention.

Figure 6:
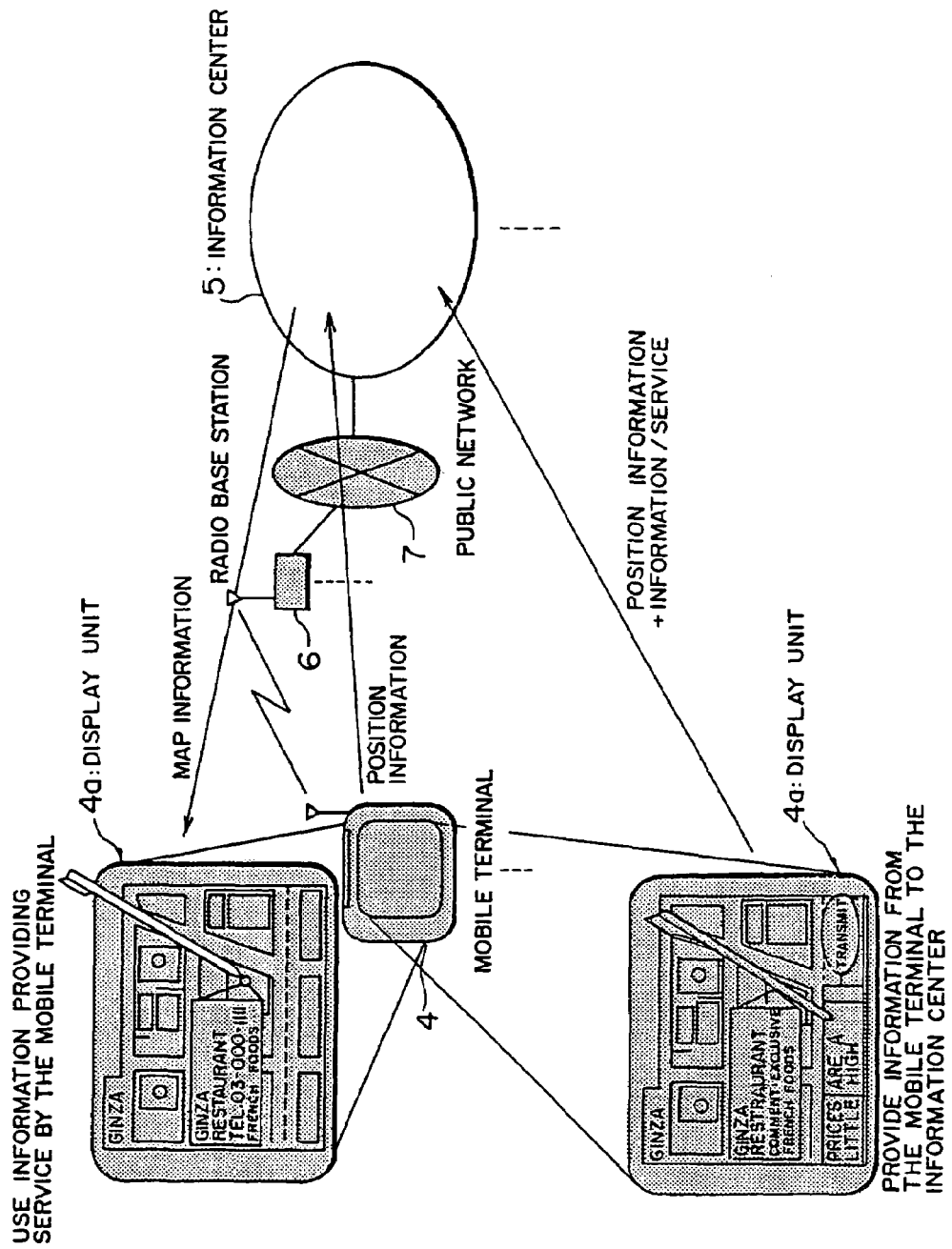
FIG. 6 is a block diagram showing a mobile communicating system according to a first embodiment of this invention.

FIG. 6 is a block diagram showing a mobile communicating system as a first embodiment of this invention. In FIG. 6, reference numeral 4 denotes PHS mobile terminals, 5 denotes an information center, 6 denotes a PHS radio base station (CS), and 7 denotes a public network. The PHS mobile terminal 4 is a PHS of an electronic pocketbook type, which is a so-called electronic pocketbook in which a PHS is incorporated. The user conducts an operation to request/provide information or a service (information of a map, information of facilities on the map, a service program relating to the map, and the like) relating to a position of the mobile terminal 4 through a display unit 4a (a position information inputting unit) using an exclusive pen or the like, whereby the PHS (built-in type) mobile terminal 4 can exchange desired information or the service program with the information center 5 via the radio base station 6 over the public network 7.

For instance, when the PHS mobile terminal (hereinafter referred simply "a mobile terminal") 4 enters a communication area of the radio base station 6 under a communicable state (a state in which a power source is ON), the mobile terminal 4 is connected to the radio base station 6 by detecting identification information (a CSID) of the radio base station 6 contained in radio waves from the radio base station 6. If the user makes a demand for information of a map, information of facilities on the map or a service program through the display unit 4a under this state, the mobile terminal 4 transmits the detected CSID as its own position information to the information center 5 via the radio base station 6 over the public network 7. The information center 5 retrieves corresponding map information on the basis of the received position information, and provides the corresponding map information to the mobile terminal 4 having transmitted the position information.

Figure 7:
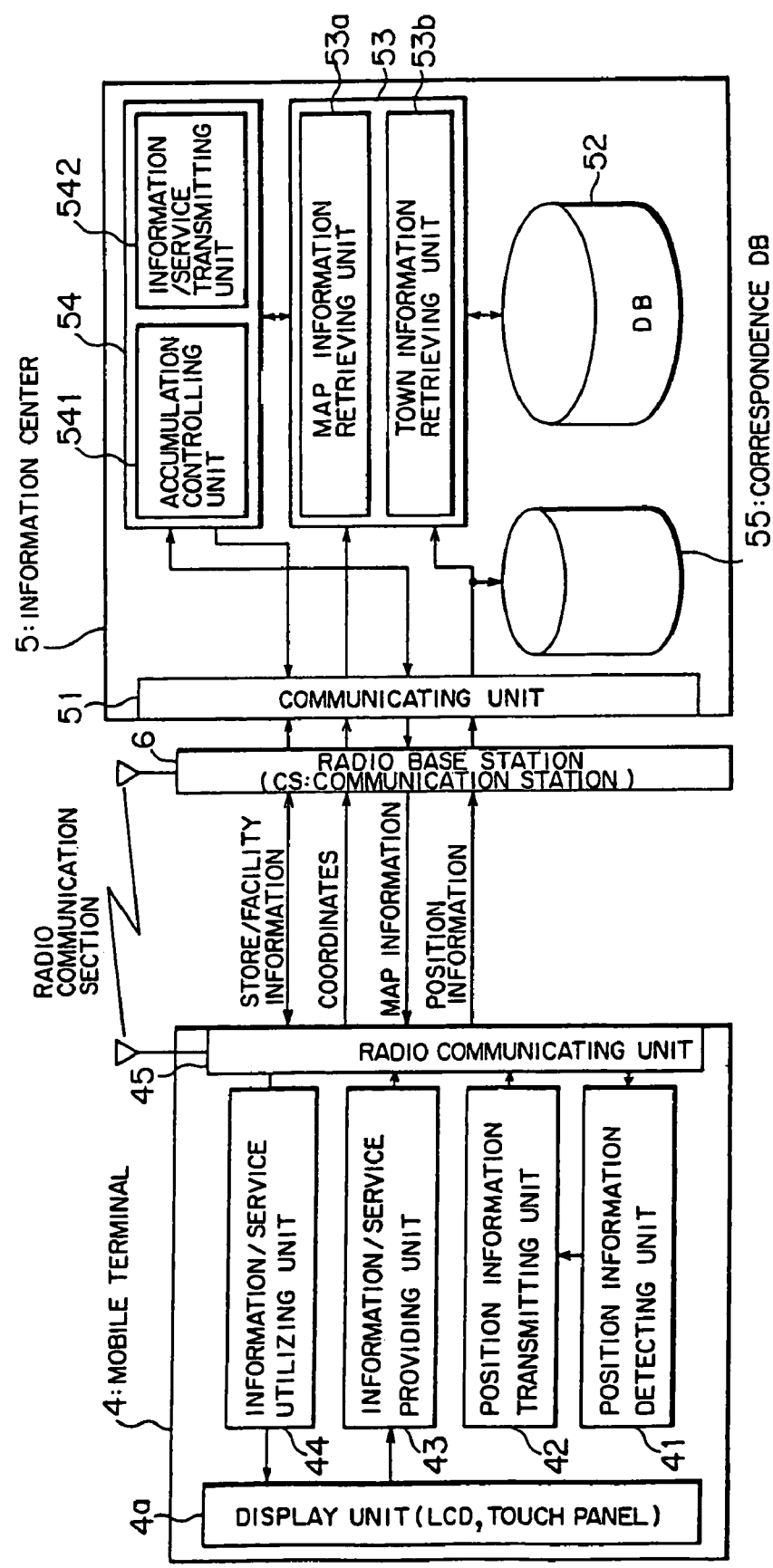
FIG. 7 is a block diagram showing a detailed structure of the mobile communicating system according to the first embodiment.

To this end, the above mobile terminal 4 has, as shown in FIG. 7, for example, a position information detecting unit 41, a position information transmitting unit 42, an information/service providing unit 43, an information/service utilizing unit 44 and a radio communicating unit 45, in addition to the above display unit 4a. The information center 5 has a communicating unit 51, a database (DB) 52, a retrieving unit 53, an information/service providing unit 54 and a correspondence database 55.

In the mobile terminal 4, the position information detecting unit 41 detects position information of its own (the mobile terminal 4) by detecting the CSID of the connected radio base station 6, and the position information transmitting unit 42 transmits the position information detected by the position information detecting unit 41 to the information center 5 through the radio communicating unit 45.

The information/service providing unit (an up-load data transmitting unit) 43 transmits information relating to the position information of the mobile terminal 4 inputted through the display unit 4a, that is, information of a map, information of stores or facilities on the map (hereinafter referred town information) or their map information, a service program as to the town information (hereinafter simply referred a service, occasionally), as up-load data for the database 52 of the information center 5.

If the mobile terminal 4 receives the above town information from the information center 5, the user designates a certain store or facility on the map by, for example, clicking it on the display unit 4a, whereby corresponding screen coordinates are transmitted from the information/service providing unit 43 to the information center 5, then information as to the corresponding facility is retrieved on the basis of the screen coordinates in the database 52 in the information center 5.

The information/service utilizing unit 44 displays the map information or town information sent from the information center 5 on the display unit 4a, or executes a service sent from the information center 5 to utilize it. The radio communicating unit 45 exchanges the above position information (CSID), the map information, the town information, the screen coordinates, the up-load data and the like with the radio base station 6.

In the information center 5, the communicating unit 51 is connected by a wire to the radio base station 6 to receive the above CSID, the screen coordinates, the up-load data sent from the mobile terminal 4 via the radio base station 6, while transmitting the map information, town information and the like taken out from the database 52 to the mobile terminal 4 having transmitted the CSID via the radio base station 6.

The database (an accumulating unit) 52 accumulates map information, town information or a service relating to information of a position according to a movement of the mobile terminal 4. The retrieving unit 53 receives position information sent from the mobile terminal 4, and retrieves map information, the town information or a service accumulated in the database 52 on the basis of the received position information. According to this embodiment, the retrieving unit 53 has a map information retrieving unit 53a and a town information retrieving unit 53b.

The map information retrieving unit 53a converts a CSID received from the mobile terminal 4 into map coordinates (position information such as a latitude and a longitude or the like) using a conversion table, which will be described later, to retrieve map information corresponding to the coordinates in the database 52. The town information retrieving unit 53b converts screen coordinates of the display unit 4a received from the mobile terminal 4 into map coordinates using the conversion table similarly to the map information retrieving unit 53a to retrieve town information corresponding to the coordinates in the database 52.

If the information center 5 receives information as to a position sent from the mobile terminal 4 and it is found as a result that the received information is a CSID, the retrieving unit 53 retrieves in the database 52 map information, town information or a service of the mobile terminal 4 corresponding to the CSID stored in the correspondence database 55, as will be described later. If the received information is position information of the mobile terminal 4, the retrieving unit 53 retrieves information or a service relating to the position information of the mobile terminal 4 in the database 52.

The above-mentioned information/service providing unit (an information/service transmitting unit) 54 accumulates up-load data from the mobile terminal 4 in the database 52, while taking out map information, town information or a service that should be transmitted to the mobile terminal 4 from the database 52 and transmitting it to the corresponding mobile terminal 4. As shown in FIG. 7, the information/service providing unit 54 has an accumulation controlling unit 541 for accumulating up-load data sent through the information/service providing unit 43 of the mobile terminal 4 in the database 52, and an information/service transmitting unit 542 for taking out, map information, town information or a service retrieved by the retrieving unit 53 from the database 52 and transmitting the map information, the town information or the service to the mobile terminal 4 having transmitted the position information (CSID).

The correspondence database (a position identification information/position information storing unit) 55 corresponds a CSID transmitted from the position information transmitting unit 42 of the mobile terminal 4 to the position information of the mobile terminal 4 and stores them.

Figure 8:
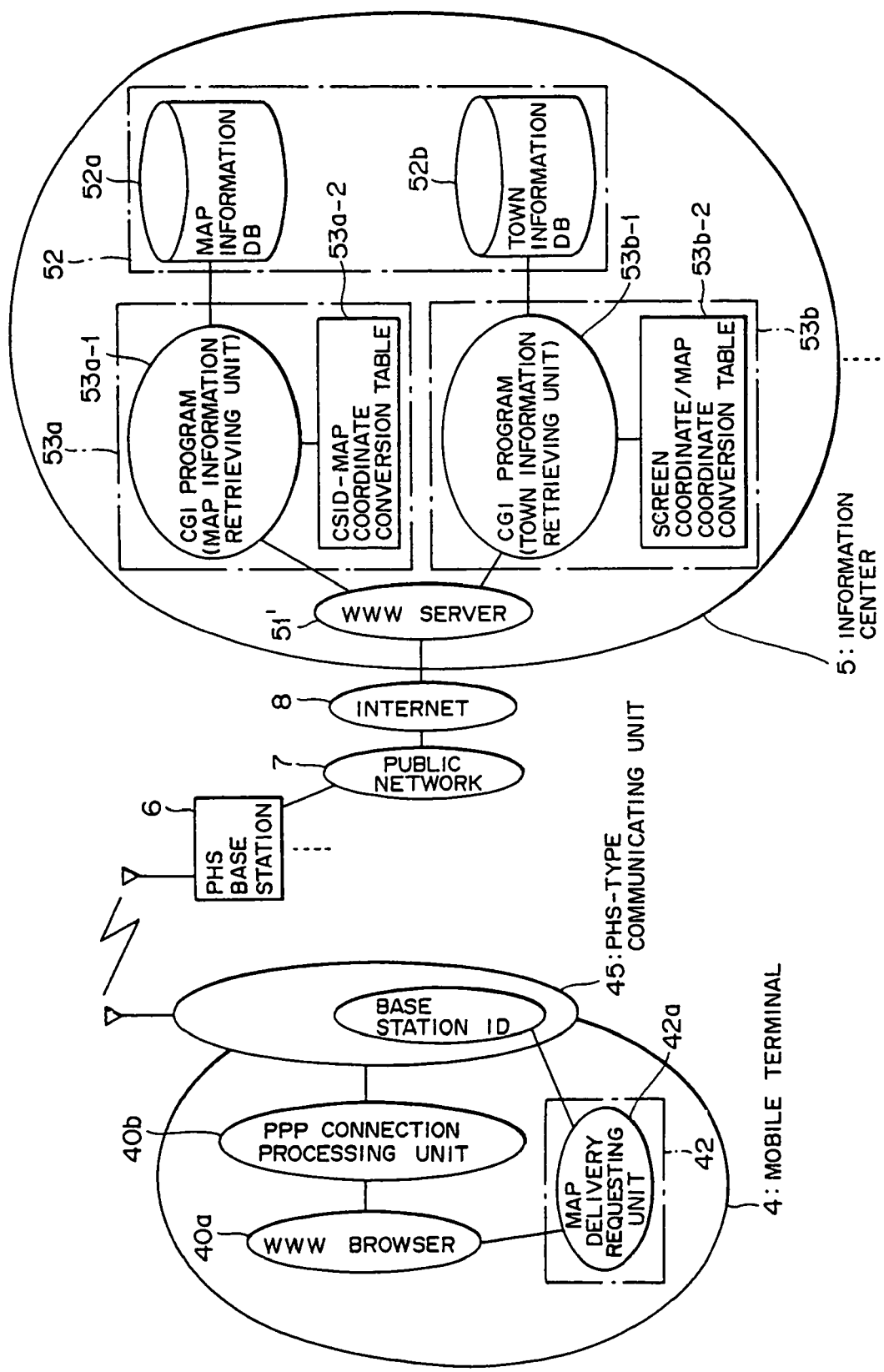
FIG. 8 is a block diagram schematically showing a structure of the mobile communicating system if the mobile communicating system is realized using Internet according to the first embodiment.

Next, FIG. 8 is a block diagram schematically showing a configuration of the above system realized by utilizing Internet 8. As shown in FIG. 8, the mobile terminal 4 can be connected to Internet 8 according to PPP (Point to Point Protocol) via a commercial provider, a dial-up router (connected to the public network) installed in a company, a collage or the like using a WWW (Word Wide Web) browser 40a, a PPP connection processing unit 40b and the like. Incidentally, the position information transmitting unit 42 has a map delivery demanding unit 42a for demanding that information center 5 should deliver map information.

In the information center 5, the above communicating unit 51, the database 52, the retrieving unit 53, the information/service providing unit 54 and the like are realized utilizing a WWW server 51' and the like. As shown in FIG. 8, the database 52 has a map information database 52a and a town information database 52b. The map information retrieving unit 53a is realized with a CGI (Common Gateway Interface) program 53a-1 for retrieving the map information database 52a and a CSID-map coordinates (latitude-longitude) conversion table 53a-2, whereas the town information retrieving unit 53b is realized with a CGI program 53b-1 for retrieving the town information and a screen coordinates-map coordinates conversion table 53b-2. Incidentally, as the above CSID-map coordinates conversion table 53a-2, a table as shown in FIG. 9 is used, for example.

Figure 10:
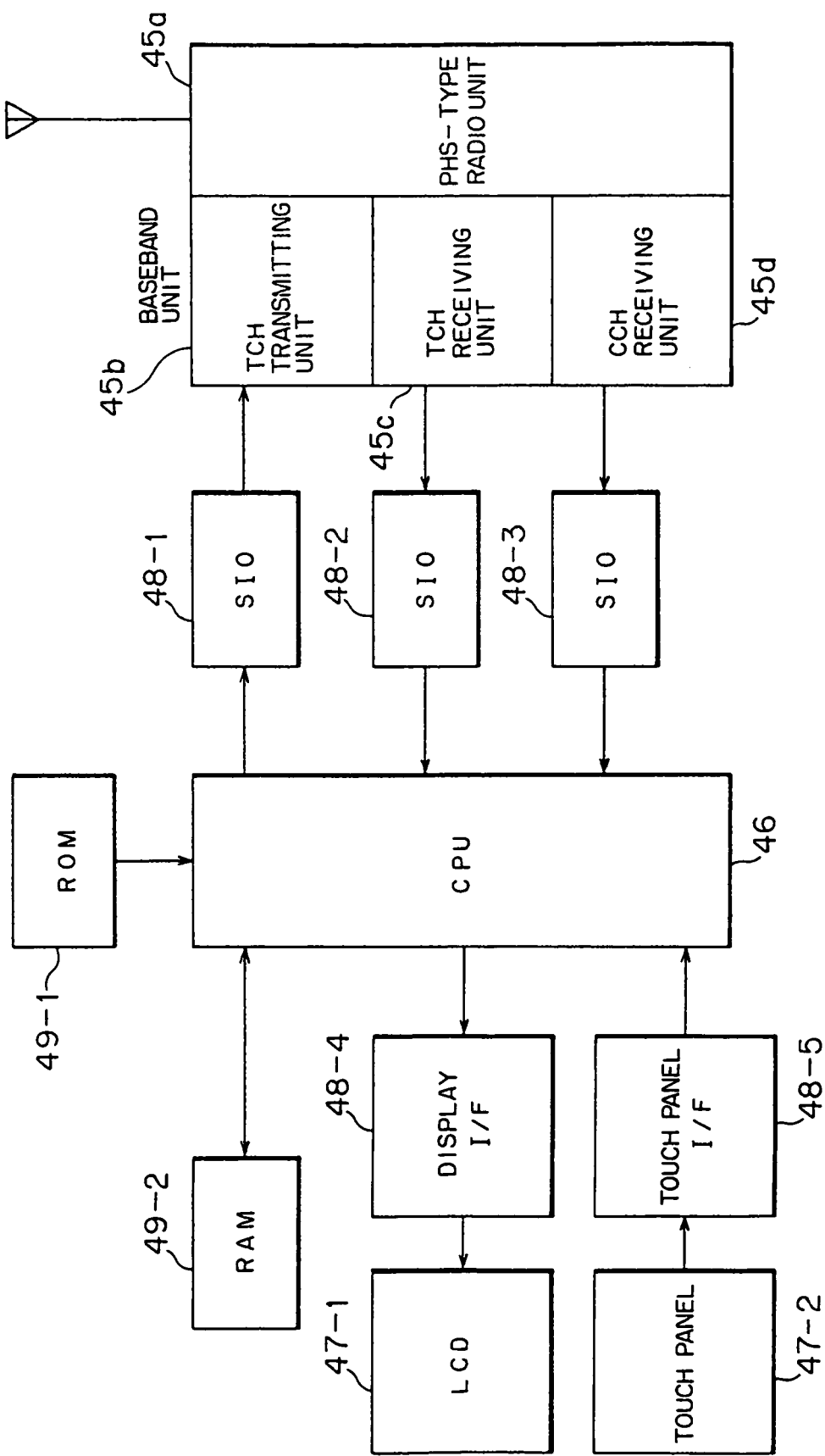
FIG. 10 is a block diagram showing a hardware structure of a PHS mobile terminal according to the first embodiment.

FIG. 10 is a block diagram showing an example of a hardware structure of the above mobile terminal 4. As shown in FIG. 10, the mobile terminal 4 has, according to the embodiment, a PHS radio unit 45a, a TCH (transmission channel) baseband transmitting unit 45b, a TCH baseband receiving unit 45c and a CCH (control channel) baseband receiving unit 45d as the above radio communicating unit 45 since the mobile terminal 4 uses a high-speed bearer transmission of 32 kbps. The mobile terminal 4 has, as the display unit 4a, a liquid crystal display (LCD) 47-1 and a touch panel 47-2. In addition, the mobile terminal 4 has a CPU 46, a serial input/output units (SIOs) 48-1 through 48-3, a display interface (a display I/F) 48-4, a touch panel interface (a touch panel I/F) 48-5, a ROM 49-1 and a RAM 49-2.

In the hardware structure, the position identification detecting unit 41 shown in FIG. 7 corresponds to the CCH baseband receiving unit 45d, the serial input-output unit 48-1 and the CPU 46, the position identification information transmitting unit 42 and the information/service providing unit 43 correspond to the CPU 46, and the information/service utilizing unit 44 corresponds to the CPU 46, the LCD 47-1 and the touch panel 47-2. The touch panel 47-2 is mounted on the LCD 47-1 constituting the display unit 4a. Screen coordinates on the panel 47-2 to which a pressure is applied are inputted to the CPU 46 via the touch panel I/F 48-5.

Namely, in the mobile terminal 4 according to this embodiment, the display unit 4a as a position information inputting unit inputs position information of the mobile terminal 4 in a displayed map.

In the mobile terminal 4 with the above structure, transmit data (detected CSID, screen coordinates, up-load data or the like) from the CPU 46 is inputted to the TCH baseband transmitting unit 45b through the serial input/output unit 48-1 and transmitted from the PHS radio unit 45a, whereas received data (CSID, map information, town information, a service or the like) received by the PHS radio unit 45a excepting the CSID which is a base of the position information is inputted to the CPU 46 through the serial input/output unit 48-2 from the TCH baseband receiving unit 45c, whereas the CSID is inputted to the CPU 46 from the CCH baseband receiving unit 45d through the serial input/output unit 48-3.

The CPU 46 reads out a program for the CPU 46 stored in the ROM 49-1 and executes it. For instance, if receiving a CSID through the CCH baseband receiving unit 45d, the mobile terminal 4 transmits the CSID as it is to the information center 5 through the TCH baseband transmitting unit 45b. If receiving an image such as the map information or character information through the TCH receiving unit 45c, the mobile terminal 4 displays the information on the LCD 47-1 connected through the display I/F 48-4.

Figure 11:
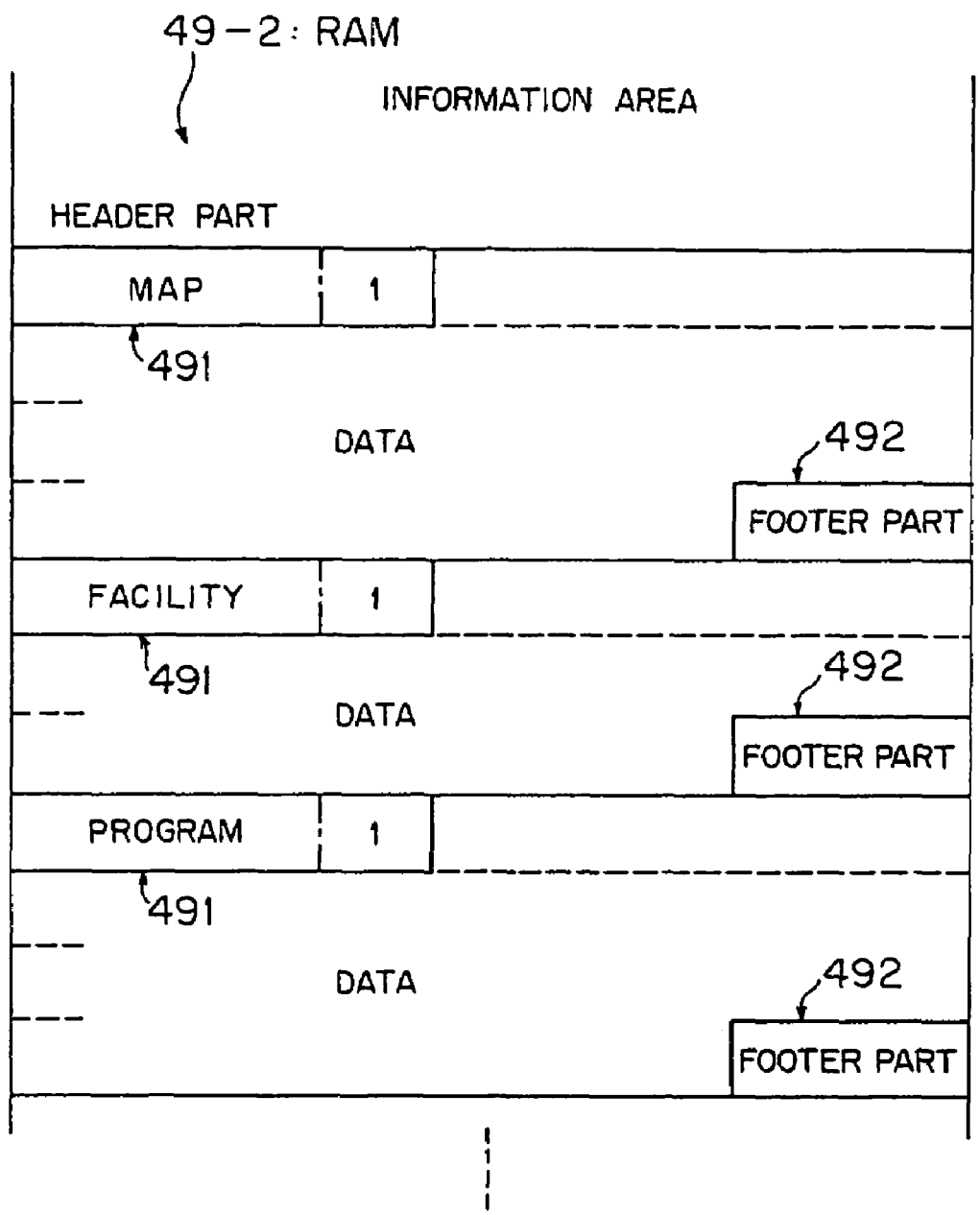
FIG. 11 is a diagram for illustrating an example of storing information in a RAM used in the PHS mobile terminal according to the first embodiment.

The RAM 49-2 stores data which is temporarily stored (map information, town information and the like), a reloadable program (a service) and the like. As shown in FIG. 11, for example, a header 491 is attached to a leading portion of each type [map information, town (facility) information, a service program or the like] of data to be stored, whereas a footer 492 is attached to the end of the data so that each data is stored.

As will be described later, if the position information converting unit whose function is shared by the retrieving unit 53 of the information center 5 is realized on the CPU 46, the CSID-position information conversion table 53a-2 as shown in FIG. 9 is stored in the above ROM 49-1 or the RAM 49-2, whereby the CPU 46 converts a CSID into position information.

An operation of the mobile communicating system with the above structure according to this embodiment will be next described in each item.

(1) Down-loading of Map Information, Town Information and Service

Figure 12:
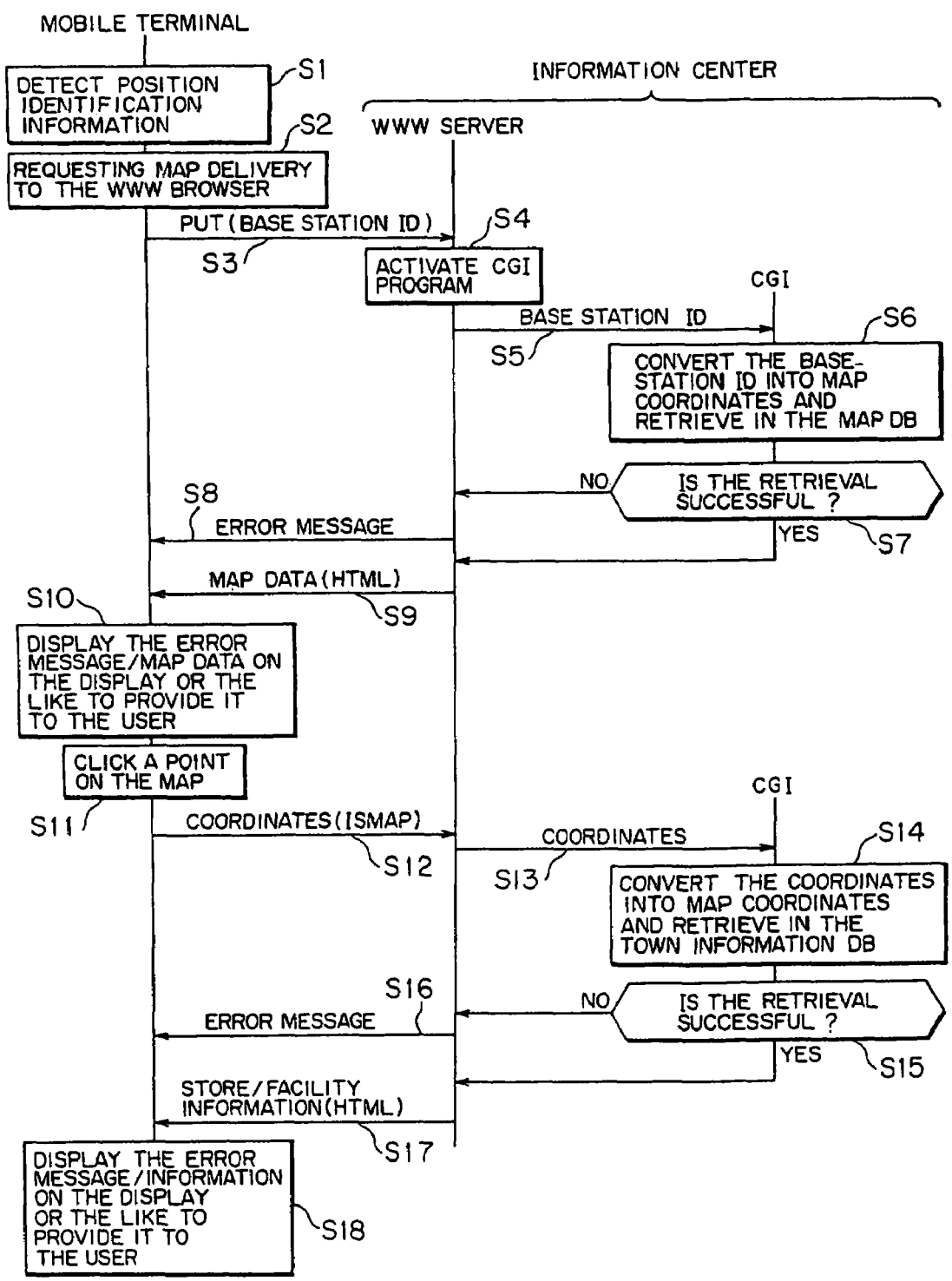
FIG. 12 is a sequence diagram for illustrating a downloading operation in the mobile communicating system according to the first embodiment.

First, an operation in the case where the mobile terminal 4 receives map information and town information from the information center 5 (down-loading) will be described with reference to a sequence diagram (Steps S1 through S18) shown in FIG. 12.

When entering a communication area of the radio base station 6, the mobile terminal 4 detects a CSID (position identification information) by the position information detecting unit 41 to be brought into a connected state with respect to the radio base station 6 (Step S1). If the user conducts an operation to demand map information around the current position through the touch panel 47-2 (for example, inputting character information of "Ginza" if intending to display a map in the vicinity of "Ginza"), the map delivery demanding unit 42a of the position information transmitting unit 42 takes out the (detected) CSID retained in the radio communicating unit 45 and transmits a map delivery demand to the WWW browser 40a (Step S2).

The WWW browser 40a sends the map delivery demand to the WWW server 51' of the information center 5 along with the CSID using, for example, a protocol activating the CGI program such as PUT or POST of http (hyper text transfer protocol) (Step S3).

The information center 5 thereby activates the CGI program 53a-1 of the map information retrieving unit 53a (Step S4), besides sending the received CSID to the CGI program 53a-1 (Step S5). The CGI program 53a-1 converts the received CSID into position information of the mobile terminal 4 such as a latitude and a longitude on the basis of the CSID-position information conversion table 53a-2 (refer to FIG. 9), then retrieves the corresponding map information database 52a with the obtained position information as a key (Step S6).

The CGI program 53a-1 judges whether corresponding map information has been found or not (the retrieval has been successful or unsuccessful) (Step S7). If the retrieval has been unsuccessful, the CGI program 53a-1 transmits the effect that corresponding data has not been found as an error message to the mobile terminal 4 through the radio base station 6 (from NO route at Step S7 to Step S8). The mobile terminal 4 displays the received error message on the LCD 47-1 (Step S10).

Figure 13:
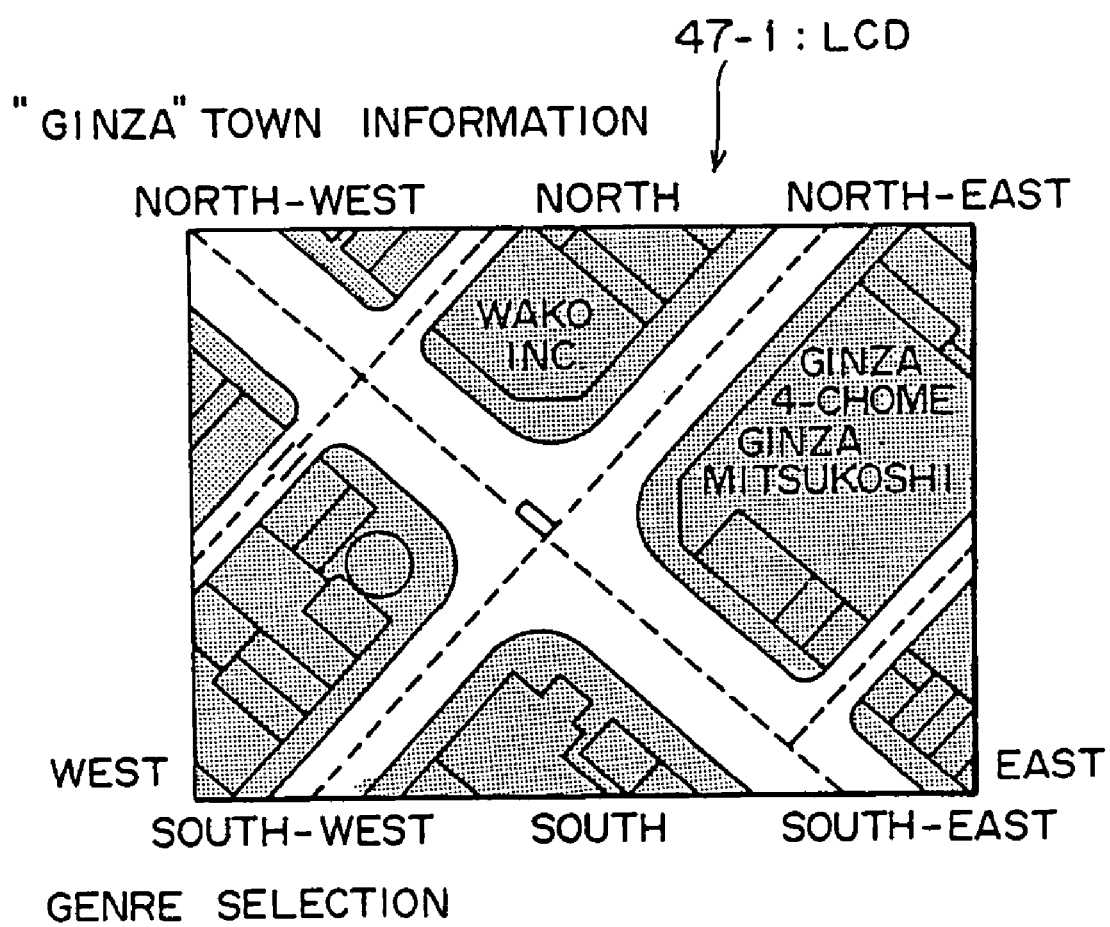
FIG. 13 is a diagram showing an example of map information displayed on a liquid crystal display of the PHS mobile terminal according to the first embodiment.

If the retrieval has been successful as a result of the retrieval by the CGI program 53a-1, the information/service providing unit 54 transmits the obtained map information as an HTML (Hyper Text Make Up Language) document, which will be described later, to the mobile terminal 4 (from YES route at Step S7 to Step S9). The mobile terminal 4 displays the received map information (a map in the vicinity of "Ginza" in this case) on the LCD 47-1 as shown in FIG. 13, for example so as to provide the map information to the user (Step S10).

After that, if the user demands detailed information (town information) about a store, a facility or the like on the map (assuming here that it is a Chinese noodle shop) by clicking a point on the map (the touch panel 47-2) displayed on the LCD 47-1, for example (Step S11), the mobile terminal 4 causes the information/service providing unit 43 to send coordinates on the clicked touch panel 47-2 to the WWW server 51' of the information center 5. By receiving them, the WWW server 51' activates the CGI program 53b-1 of the town information retrieving unit 53b (Steps S12 and S13). Incidentally, this function can be realized using a function of ISMAP described in a specification of a standard HTML.

In the information center 5, the CGI program 53b-1 refers to the screen coordinates-map coordinates conversion table to obtain map coordinates, then retrieves in the town information database 52b with these as a key (Step S14). If the retrieval has been unsuccessful, the information center 5 transmits an error message to the mobile terminal 4 and causes the LCD 47-1 to display it thereon (from NO route at Step S15 to Steps S16 and S18).

Figure 14:
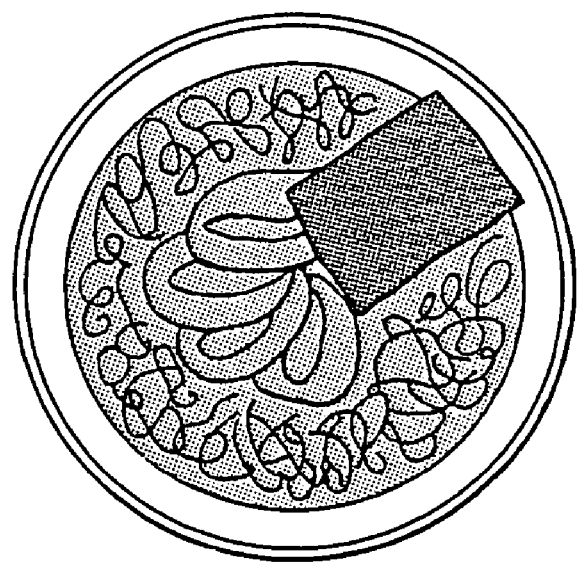
FIG. 14 is a diagram showing an example of town information displayed on the liquid crystal display of the PHS mobile terminal according to the first embodiment.

If the retrieval has been successful, the information/service providing unit 54 sends the obtained town information (store/facility information) as an HTML document described as shown in FIG. 15, for example, to the mobile terminal 4 (from YES route at Step S15 to Step S17). The mobile terminal 4 reads (executes) the received HTML document, thereby providing the town information (detailed information of a Chinese noodle shop) to the user by displaying it on the LCD 47-1 as shown in FIG. 14, for example (Step S18).

Meanwhile, this system can send a service (a program), that is, a program described in, for example, Java language, instead of the above town information (store/facility information), whereby it is possible to provide an interactive service to the user.

If a service described in the HTML document as shown in FIG. 16 is stored in the database 52 of the information center 5, for example, the user can receive desired service from the information center 5 by inputting (designating) a service program "Service.class" in Java language as shown below, for example, through the touch panel 47-2 in a procedure similar to the above.

<APPLET CODE="Service.class"WIDTH=150 HEIGHT=30>
</APPLET>

The mobile communicating system according to this embodiment provides information of a map including the current position of the mobile terminal 4 and information including information of facilities on the map as information relating to position information of the mobile terminal 4 to the user so that the user can obtain not only map information but also detailed information about facilities on the map or a service (a program) as to the map and the facilities. This feature can largely improve the service of the system.

In the above system, the information center 5 and each of the mobile terminals 4 are connected via a communicating means through the radio base station 6, and each of the mobile terminals 4 detects position identification information (a CSID) of the radio base station 6 to which the mobile terminal 4 is connected. It is therefore possible to specify a position of the mobile terminal 4 from the CSID (a communication area) so that the information center 5 can certainly provide necessary information or service relating to the position to the mobile terminal 4.

In this case, the map information retrieving unit 53a is provided as the position information converting unit for converting a CSID detected by the mobile terminal 4 into map coordinates (mobile terminal position information) in the information center 5, whereby the information center 5 can independently provide information or a service relating to map coordinates on the basis of the converted map coordinates to the corresponding mobile terminal 4 without paying attention to the CSID (irrespective of a type of the radio base station 6).

In consequence, this feature enables all users (the mobile terminals 4) of the system to equally utilize desired information or service, and largely contributes to flexibility of the system configuration.

Figure 17:
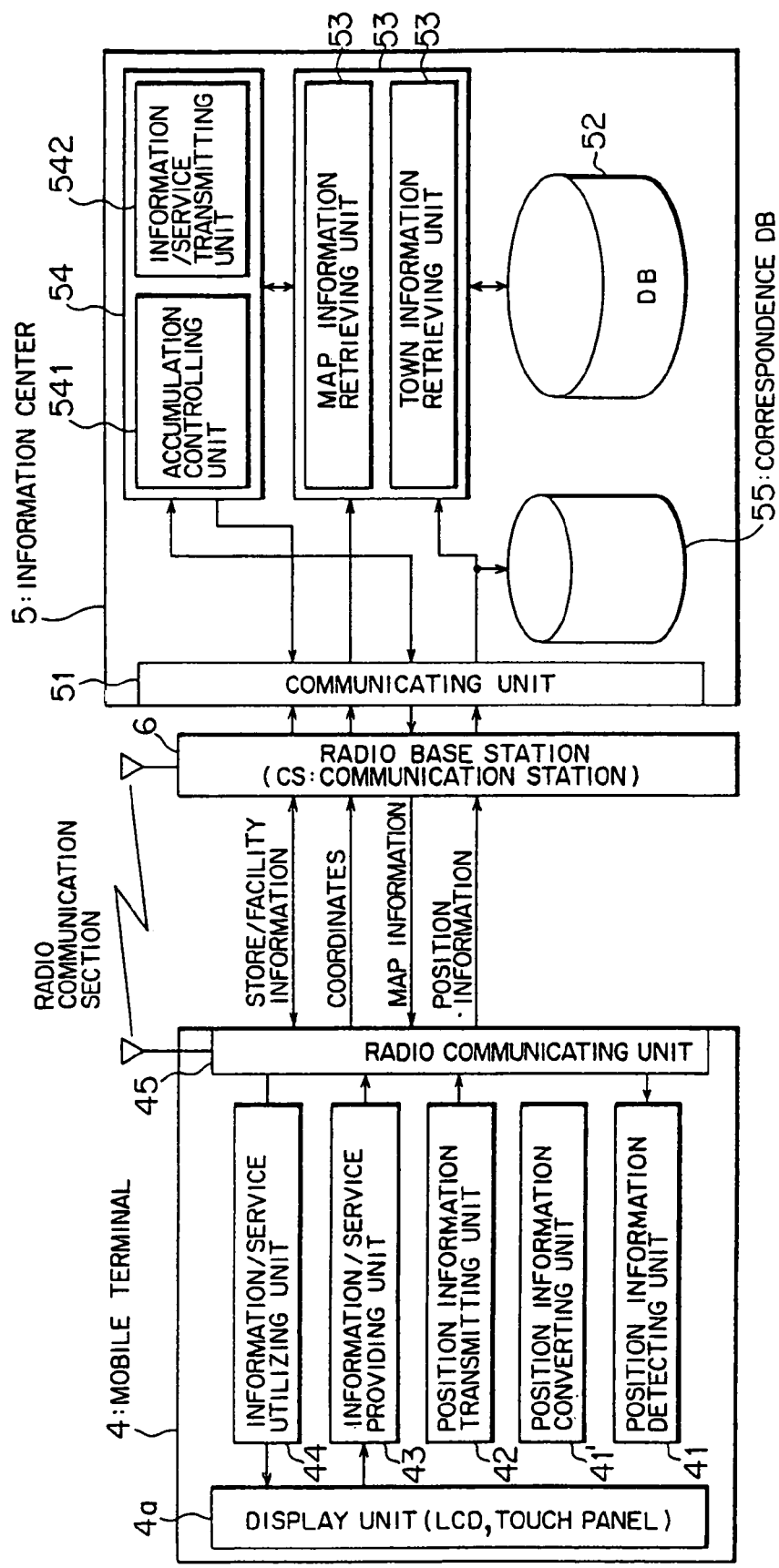
FIG. 17 is a block diagram showing another detailed structure of the mobile communicating system according to the first embodiment.
Figure 18:
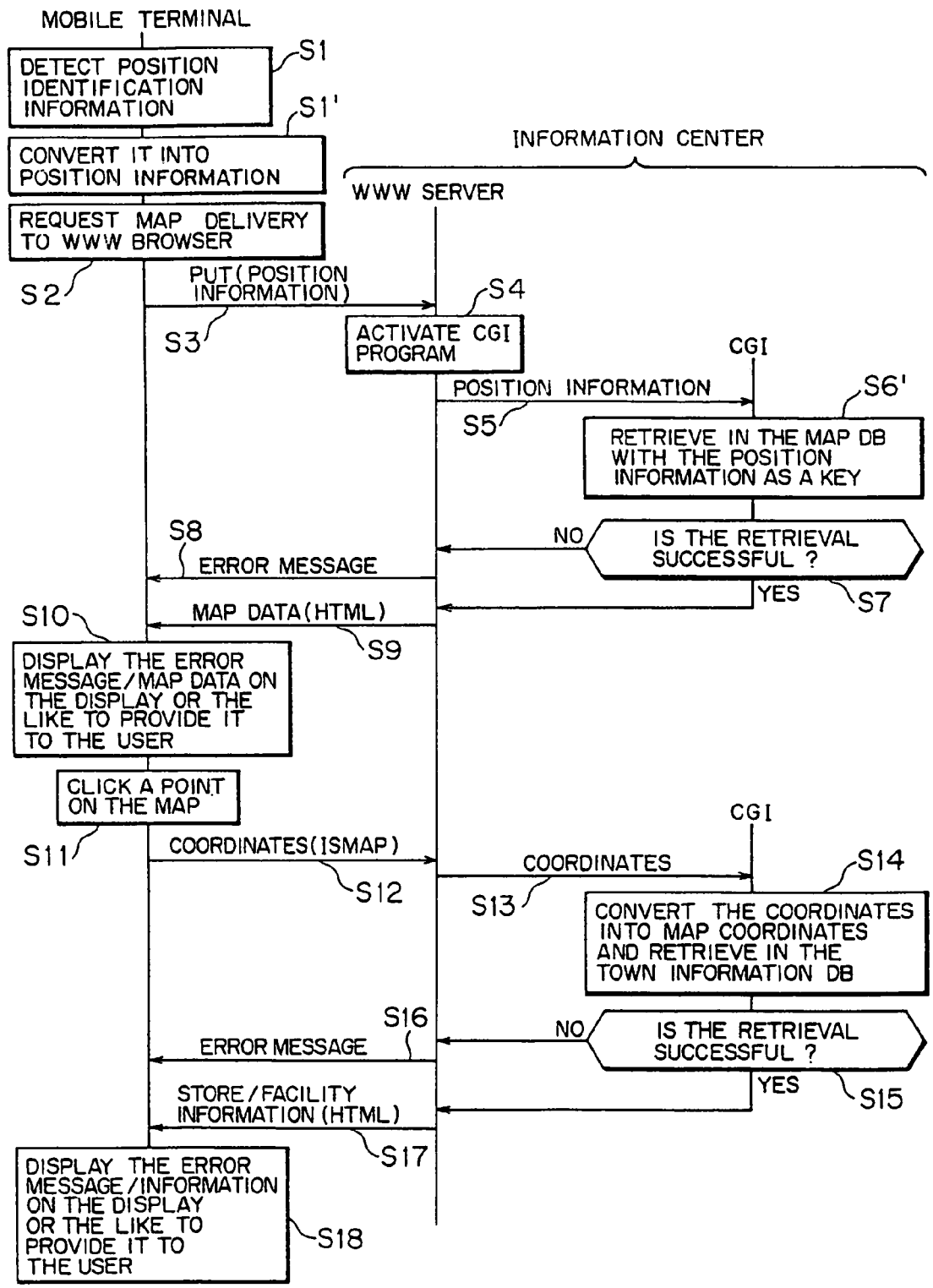
FIG. 18 is a sequence diagram for illustrating another down-loading operation in the mobile communicating system according to the first embodiment.

Incidentally, the above position information converting unit may be provided on the side of the mobile terminal 4 as a position information converting unit 41', as shown in FIG. 17. An operation sequence in this case differs from the operation sequence shown in FIG. 12 in that the position information converting unit 41' converts a CSID into position information (Step S1'), and, for this, map information retrieving unit 53a (the CGI program 53a-1) of the information center 5 uses the received position information as a key to retrieve in the map information database 52a (Step S6'), as shown in FIG. 18, for example.

In this case, each user can freely customize the mobile terminal 4 of the system.

The above position information detecting unit 41 of the mobile terminal 4 may detect position information of its own utilizing a satellite such as GPS. In which case, it is possible to accurately detect position information of the mobile terminal 4 that should be transmitted to the information center 5 and omit a procedure to input position information by the user so that a burden of an information inputting operation on the user can be largely reduced.

(2) Up-loading of Map Information, Town Information and Service

Figure 19:
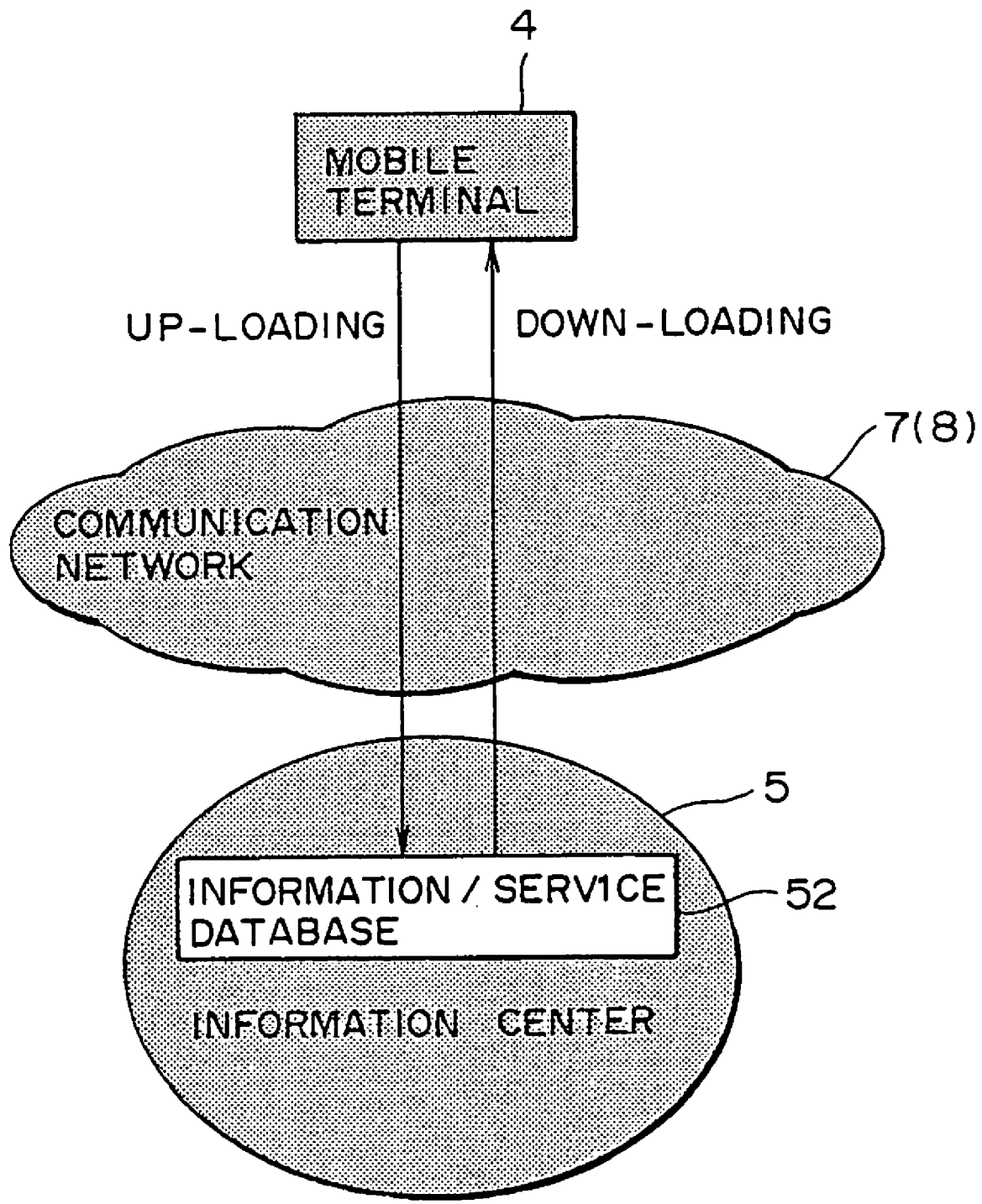
FIG. 19 is a diagram for illustrating a concept of an up-loading operation in the mobile communicating system according to the first embodiment.

Next, an operation in the case where the mobile terminal 4 provides (up-loads) map information, town information or a service to the information center 5 as shown in FIG. 19 will be described in detail.

(2-1) Up-loading of Information (Map Information and Town Information)

Figure 20:
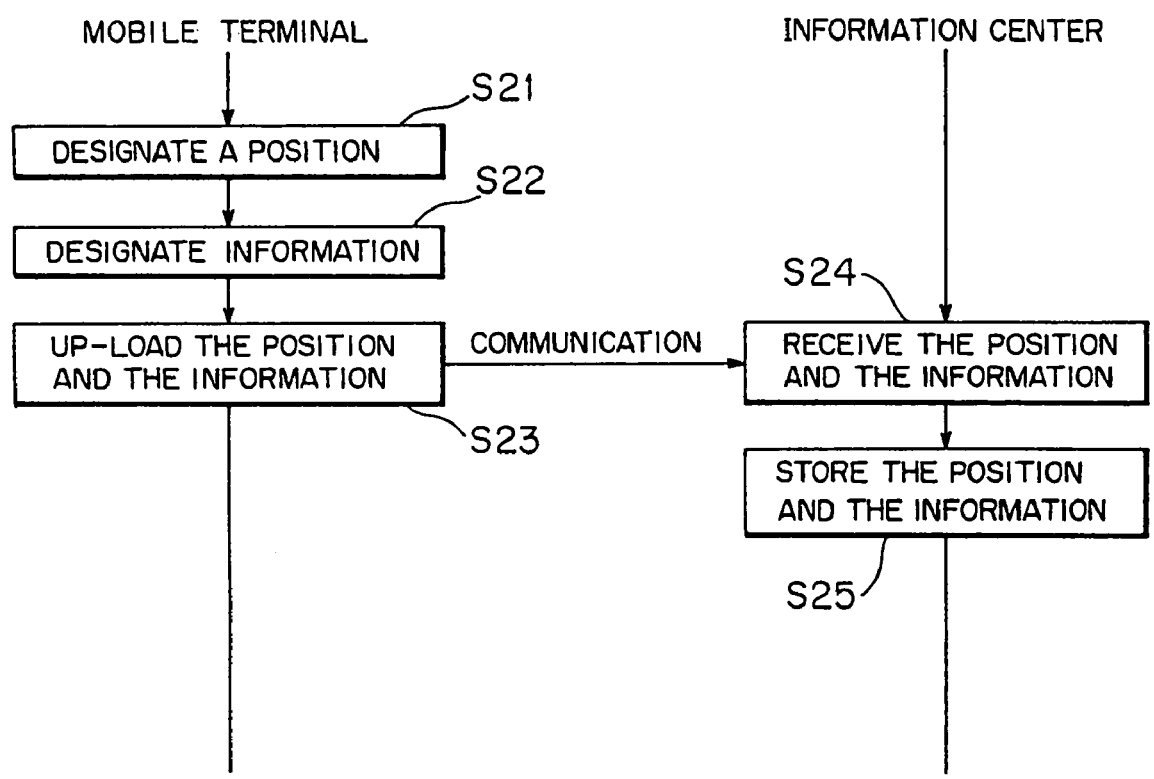
FIG. 20 is a sequence diagram for illustrating the up-loading operation in the mobile communicating system according to the first embodiment.

If map information or town information is up-loaded to the information center 5, the user basically designates a position and information on the side of the mobile terminal 4 as shown in FIG. 20, for example (Steps S21 and S22). A combination of the position and the information is transmitted (up-loaded) to the information center 5 (Step S23). The information center 5 receives the information (Step S24), and accumulates and stores it in the database 52 (Step S25).

There are two ways of the above methods of designating positions:

the current position position designation by the user

Figure 21:
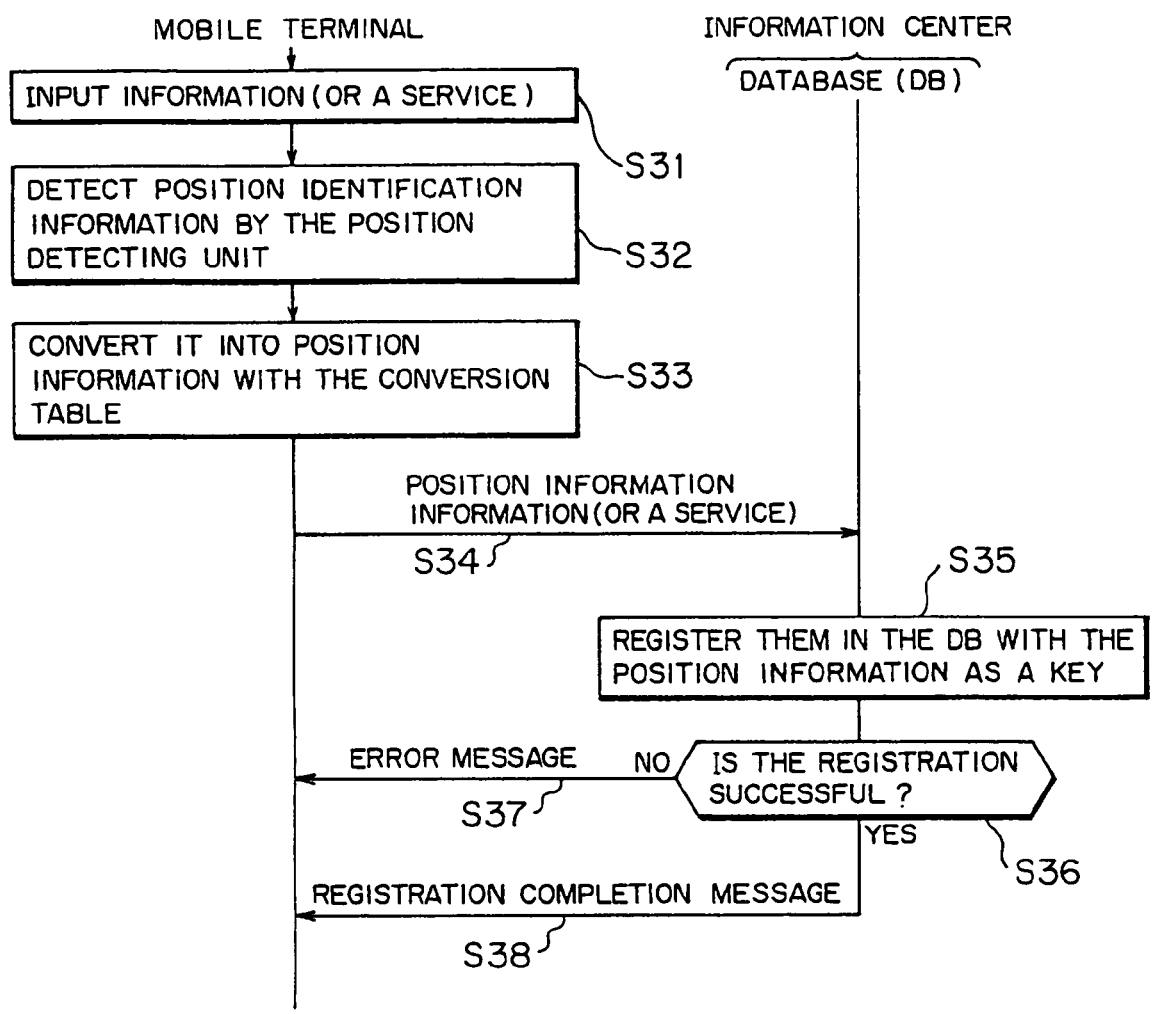
FIG. 21 is a sequence diagram for illustrating the up-loading operation in the mobile communicating system according to the first embodiment.

First, the method of designating a position with the current position will be described with reference to a sequence diagram (Steps S31 through S38) in FIG. 21. The user inputs various information (town information) about stores, facilities and the like through the LCD 47-1 (the touch panel 47-2) of the mobile terminal 4 using an exclusive pen or the like in a predetermined inputting method as will be described later (Step S31).

In the mobile terminal 4, the position imformation detecting unit 41 detects position identification information (a CSID) of the radio base station 6 connected to the mobile terminal 4 (Step S32). The position information converting unit 41' converts the CSID into position information using the conversion table 53a-2 as shown in FIG. 9 (Step S33), and transmits a combination of the information inputted by the user and the position information to the information center 5 (Step S34).

In the information center 5, the accumulation controlling unit 541 of the information/service providing unit 54 converts received screen coordinates into position information (map coordinates), and registers (accumulates) inputted information from the mobile terminal 4 in a corresponding region in the database 52 with the position information as a key (Step S35). The information/service providing unit 54 judges whether the registration of the information has been normally done or not (Step S36). If the registration has been unsuccessful, the information/service providing unit 54 transmits an error message to the mobile terminal 4 (from NO route at Step S36 to Step S37). If the registration has been successful, the information/service providing unit 54 transmits a registration completion message to the mobile terminal 4 (from YES route at Step S36 to Step S38).

In the above position information detecting unit 41, a latitude and a longitude are detected as position identification information if GPS is used, whereas a telephone number or an IP address of a fixed terminal is detected as the position identification information if the mobile terminal 4 is connected to the fixed terminal, as will be described later. In this case, conversion of the detected position identification information (a CSID or the like) into position information may be conducted on either side of the, mobile terminal 4 or the information center 5 (that is, the position information converting unit 41' may be provided on either side).

Next, position designation by the user will be described. The position designation by the user is made if information (store and facility information) to be sent to the information center 5 by the user has no relation to the actual current position.

Figure 22:
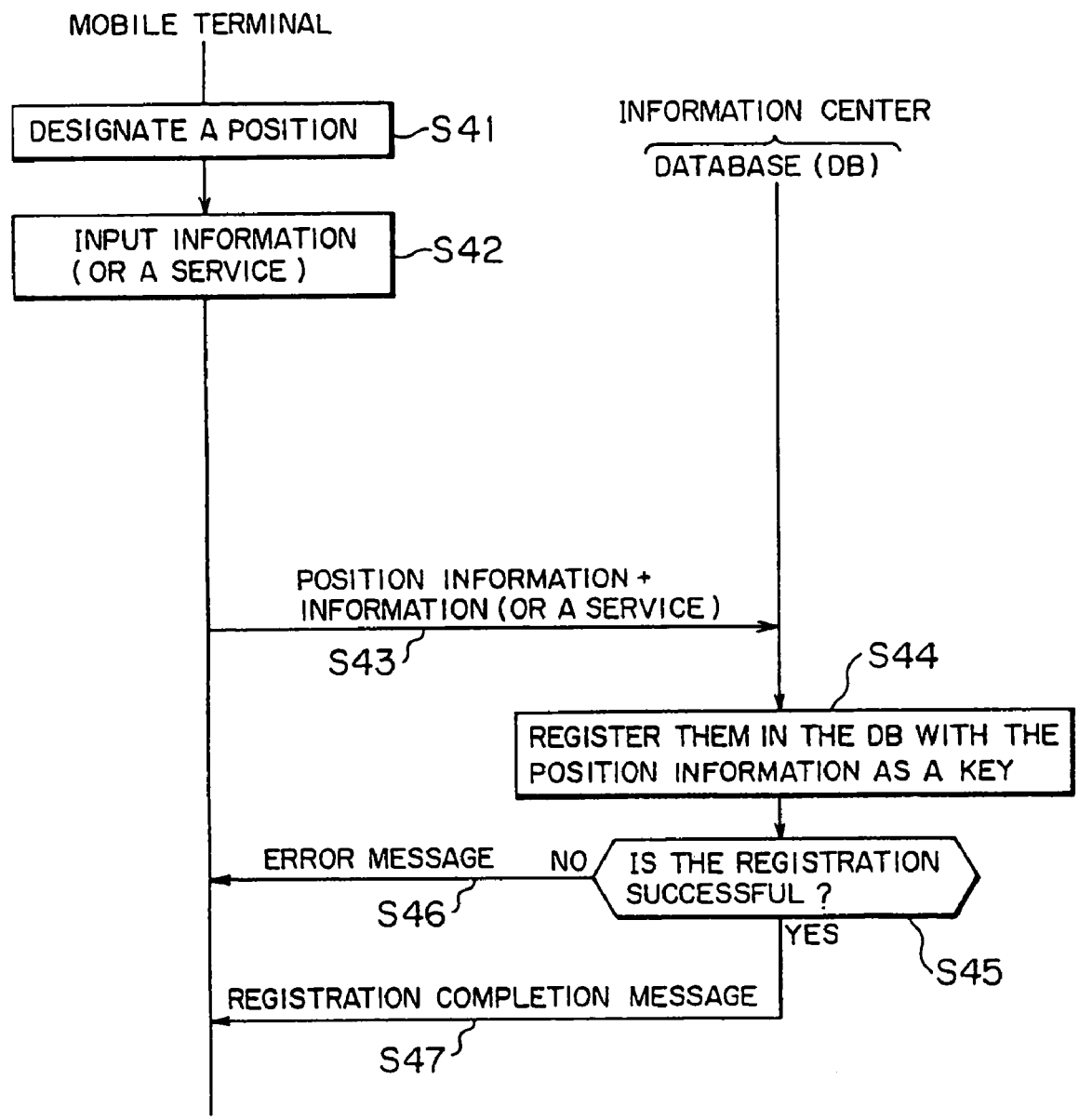
FIG. 22 a sequence diagram for illustrating the up-loading operation in the mobile communicating system according to the first embodiment.
Figure 23:
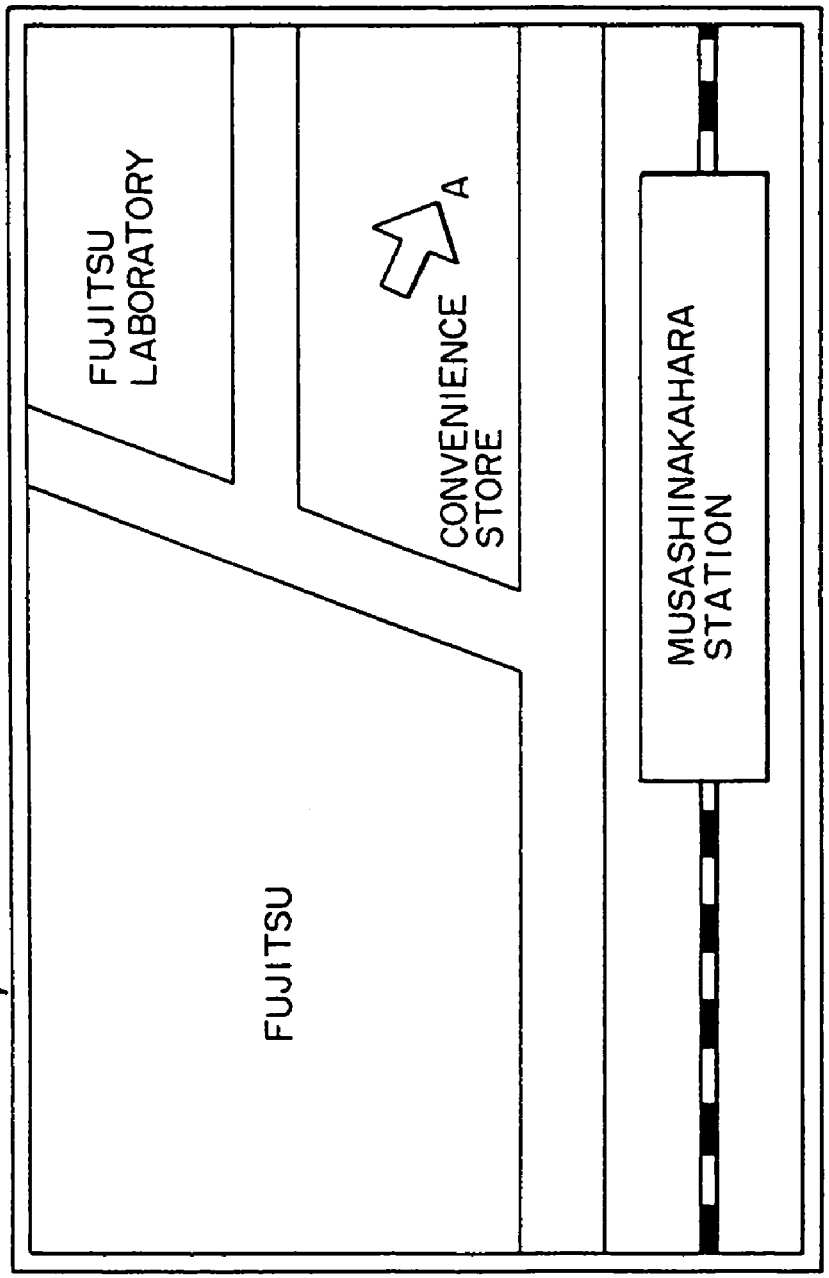
FIG. 23 is a diagram for illustrating a method of inputting position information in the up-loading operation according to the first embodiment.

The position designation by the user will be now described with reference to a sequence diagram (Steps S41 through S47) shown in FIG. 22 by way of an example in which a restaurant exists in a part indicated by an arrow A on a map displayed on the terminal screen (LCD) 47-1 of the mobile terminal 4 as shown in FIG. 23 and the user intends to provide detailed information about this restaurant (a type of a store or facility, a telephone number, a comment on the store or facility and the like) to the information center 5.

In this case, the user applies a pressure on the part indicated by the arrow A on the LCD 47-1 (touch panel 47-2) with an exclusive pen or the like to click it, thereby designating a position (Step S41). On the LCD 47-1, a fixed-form format (a template) used to input information is displayed as shown in FIG. 24, for example. The user inputs various information (a service program is also possible) according to the template (Step S42).

Here are, in advance, displayed items such as "type", "telephone number" and "recommendation" and the like on the LCD 47-1 as shown in FIG. 24. The user is going to input appropriate contents in each of these items. If items of the template particularized to specific information ("menu" in the case of a restaurant, "attraction" in the case of a recreation park, or the like) are prepared in addition to general items, the user can readily input.

As another method of designating information, the user can designate information which has been beforehand made and stored in a file or the like by the user. In which case, the user makes information beforehand using an inputting means such as an editor at the mobile terminal 4 or another terminal and stores it in a file, for example. When designating information, the user designates the file by inputting a file name or the like.

After the position (screen coordinates) and information relating to the position have been established, the mobile terminal 4 transmits (up-loads) them to the information center 5 (Step S43). At this time, it is possible to use http in up-loading in the mobile terminal 4 since the WWW browser 40a is used with a communication protocol which is http. However, the protocol is not limited to only http, but any protocol can be used in up-loading so long as it is a communication protocol permitted in the utilized communication network and the mobile terminal 4 and the information center 5 comply with it.

In the information center 5, the accumulation controlling unit 541 of the information/service providing unit 54 converts received screen coordinates into position information [map (geographical) coordinates], then registers (accumulates) inputted information from the mobile terminal 4 in a corresponding region in the database 52 with this position information as a key (Step S44). The information/service providing unit 54 judges whether the registration of the information has been normally done or not (Step S45). If the registration has been unsuccessful, the information/service providing unit 54 transmits an error message to the mobile terminal 4 (from NO route at Step S45 to Step S46). If the registration has been successful, the information/service providing unit 54 transmits a registration completion message to the mobile terminal (Step S47).

As registerable information, information as to stores such as department stores and the like, information as to transport facilities such as railway stations, bus stops and the like, information as to amusement spots such as recreation parks, art museums and the like and information as to another particular positions are possible other than restaurant information mentioned above.

Figure 25:
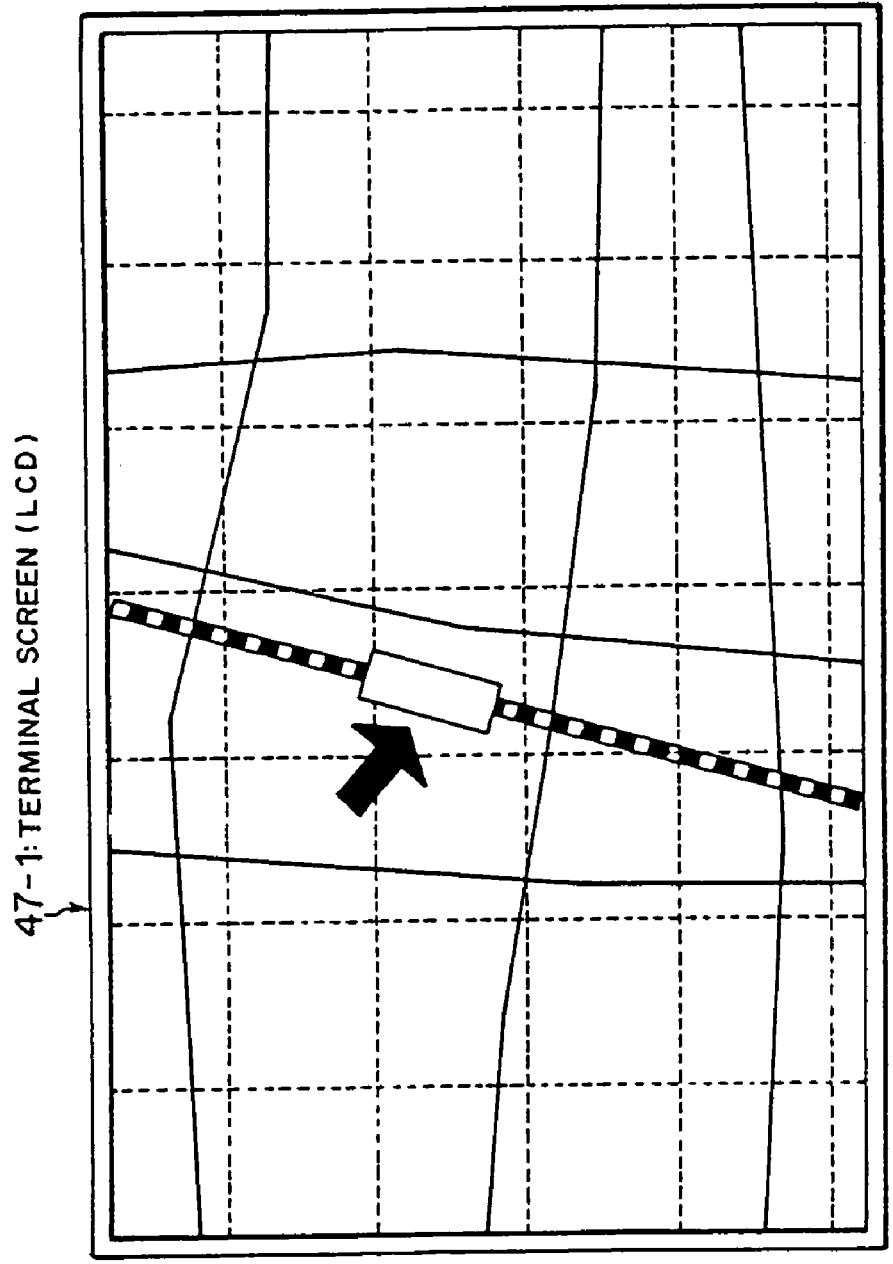
FIG. 25 is a diagram for illustrating another method of inputting position information in the up-loading operation according to the first embodiment.

If the user does not actually know where a shop or facility that the user wants to register as above locates on the map displayed on the LCD 47-1 of the mobile terminal 4, the user displays the map divided into meshes by dotted line on the LCD 47-1 as shown in FIG. 25, for example, and designates a region in which the store or facility that the user wants to register would be included (a region indicated by an arrow in FIG. 25 if the user knows that it locates at a railroad station or in the vicinity of the railroad station, for example), thereby designating the position.

(2-2) Up-loading of Service (Program)

Next, an operation in the case where the mobile terminal 4 provides a service (a program) to the information center 5 will be described. Here, service stands for a program used to retrieve a restaurant that the user wishes or a program used to exchange information complying with the mobile terminal 4 used by the user. A certain degree of service is prepared on the side of the information center 5, in general. However, there is a case where the prepared service cannot meet a demand of the user. For this, service originally made by the user is up-loaded in the information center 5 to newly provide a service to the user in this system.

Figure 26:
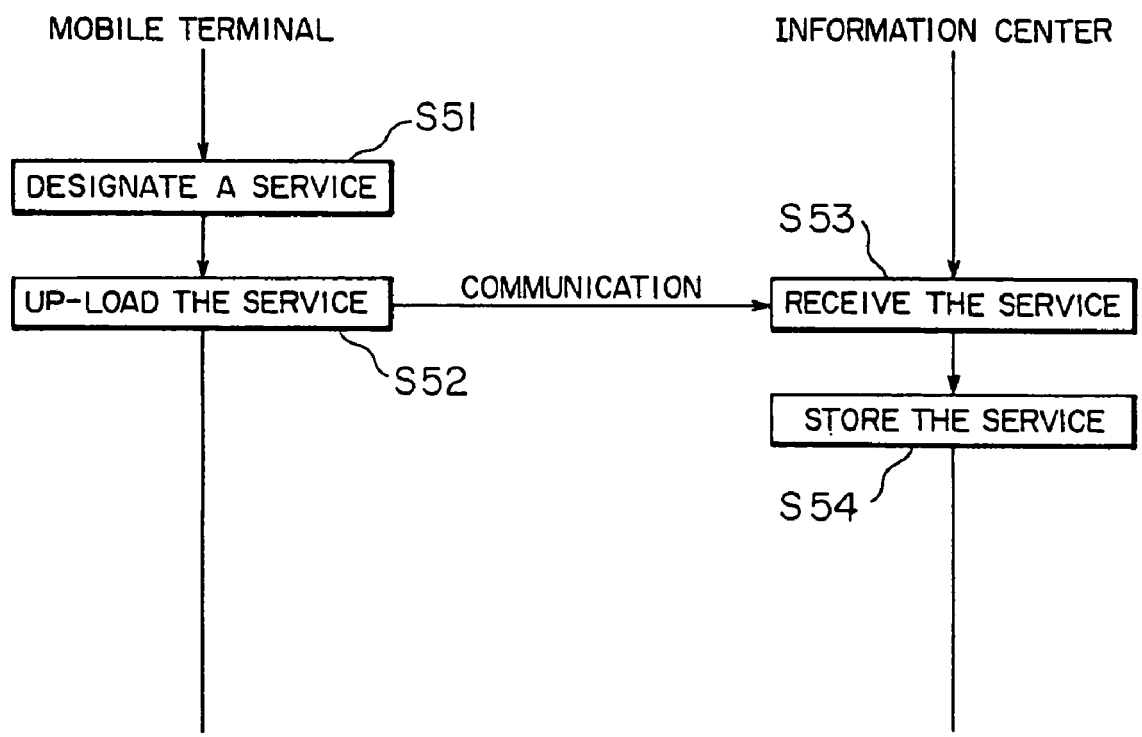
FIG. 26 is a sequence diagram for illustrating the up-loading operation in the mobile communicating system according to the first embodiment.

Now, this operation will be described with reference to a sequence diagram (Steps S51 through S54) in FIG. 26.

First, the user designates a service (a program) to be up-loaded through the LCD 47-1 of the mobile terminal 4 (Step S51). In the mobile terminal 4, the information/service providing unit 43 transmits (up-loads) the designated service to the information center 5 according to a communication protocol used between the mobile terminal 4 and the information center 5 similarly to a case of information-up-loading (Step S52). When the information center 5 receives the service (Step S53), the accumulation controlling unit 541 of the information/service providing unit 54 accumulates and stores the service in a corresponding region in the database 52 (Step S54).

As the method of designating a service at the above Step S51, it is sufficient that the user beforehand makes (programs) a service using an inputting means such as an editor at the mobile terminal 4 or another terminal and stores it in a file, then designates the file by inputting a file name or the like upon designating the service. Contents of the designated file is thereby up-loaded to the information center 5. As a language used to describe a service, Java, TeleScript or the like may be used. Even if a program code is moved through the network, it is necessary to keep portability of the language.

According to this system, each of the mobile terminals 4 transmits information or a service relating to position information as up-load data to the information center 5 through the information/service providing unit 43, thereby accumulating and updating the information or services in the information center 5 (the database 52) on occasion to always keep information or services required by the mobile terminal 4 in the information center 5.

In consequence, it is possible to provide the latest information or services reflecting demands of the user to the user on any occasion.

(3) Information Management in the Database 52 in the Information Center 5

Figure 27:
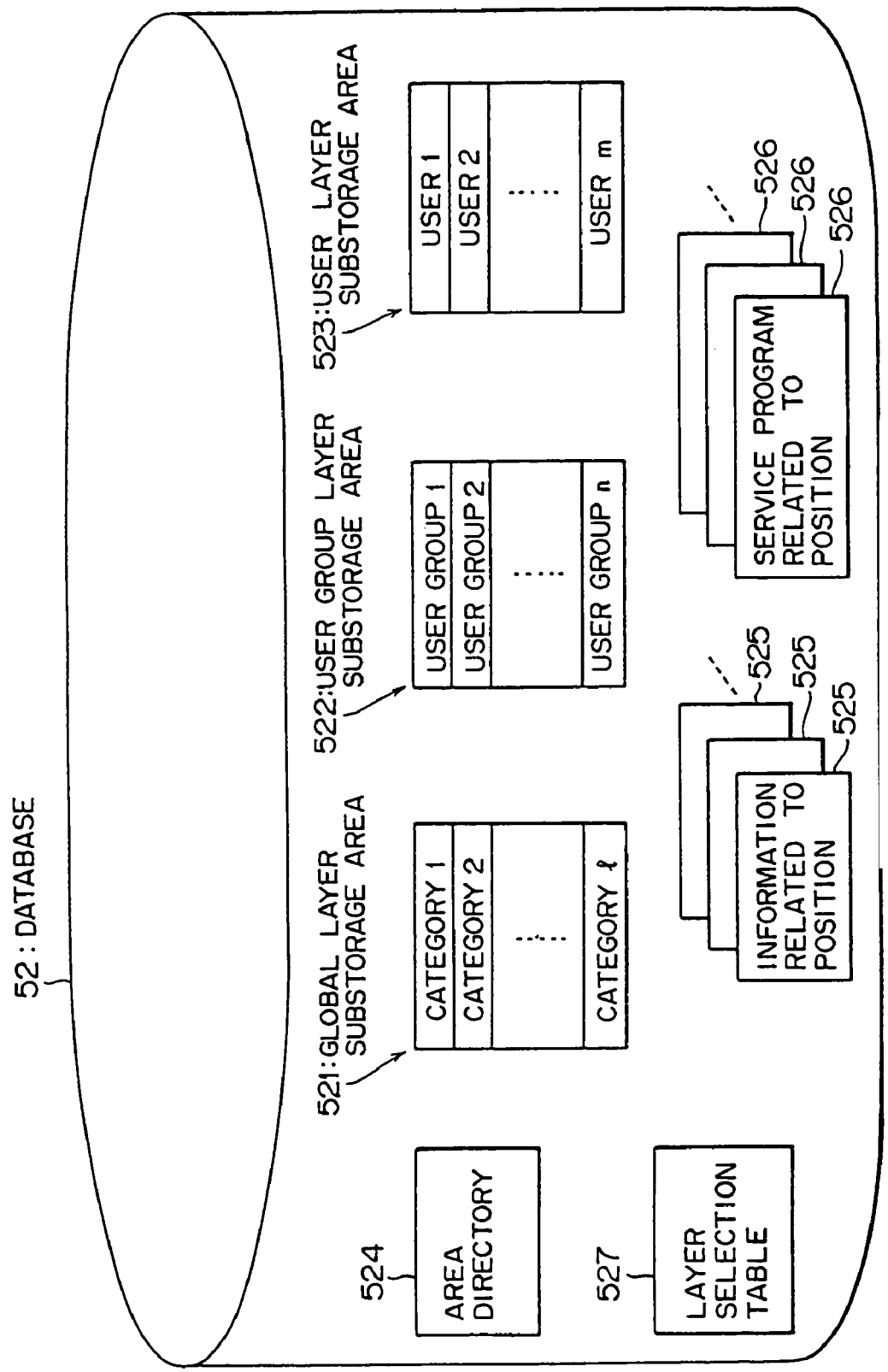
FIG. 27 is a block diagram schematically showing a structure of a database in an information center according to the first embodiment.

FIG. 27 is a block diagram schematically showing a structure of the above-mentioned database 52. As shown in FIG. 27, the database 52 in the information center 5 has a user layer 521, a user group layer 522, a global layer 523, an area directory 524, an information storing area 525, a service program storing area 526 and a layer selection table 527.

The user layer 521 is a substorage area for information in which each individual stores and accumulates private information to refer it. The user group layer 522 is a substorage area in which information can be referred and updated by each specified group is retained. The global layer 523 is a substorage area in which information which can be referred by all users is retained. Incidentally, the user can copy information accumulated in the user layer 521 to the user group layer 522 of a user group to which the user belongs to provide the information to another member of the group, or another member can copy information stored in the user group layer 522 in the user layer 521 of his/her own to use it.

In the area directory 524, address information of each of the layers 521 through 523 is stored, whereby each of the layers 521 through 523 is linked so that the area directory 524 can manage all information retained in each of the layers 521 through 523 so as to refer it. Retrieval by the retrieving unit 53 described hereinbefore in the above items (1) and (2) is executed by referring the area directory 524 by the retrieving unit 53.

In the information storing area 525, information relating to positions of the mobile terminals 4 (map information, information of shops and facilities on the map) is stored. In the service program storing area 526, service programs each attendant on the map information and the information of shops and facilities on the map are stored. Upon downloading/up-loading the above information or service, the information/service providing unit 54 operates (takes out, updates, etc. the information) on the information storing area 525 and the service program storing area 526.

In the layer selection table 527, selection information (a selection list) used to select the layers 521 through 523 which are to be provided to the mobile terminal 4 according to, for example, a time zone when the user of the mobile terminal 4 accesses to the information center 5 is stored. The selection list is expressed by, for example, an identifier unique to each of the layers 521 through 523 of the database 52. One user can possess a plurality of the lists.

The user can thereby select a different list depending on the current position or a time zone. As selection of the list, it is possible that the retrieving unit 53 of the information center 5 selects according to a selection rule set in advance, or a list is selected on the side of the mobile terminal 4 and a specific list is designated when a retrieval demand message is transmitted from the mobile terminal 4 to the information center 5.

Namely, the above database 52 has the layers (accumulating units for specified mobile terminals) 521 and 522 for specified users in which information (map information, town information and the like) or services (programs) relating to position information of specified mobile terminals 4 are stored, and the layer (an accumulating unit for unspecified mobile terminals) 523 for unspecified users in which information or services relating to position information of all the mobile terminals 4 are stored.

Figure 28:
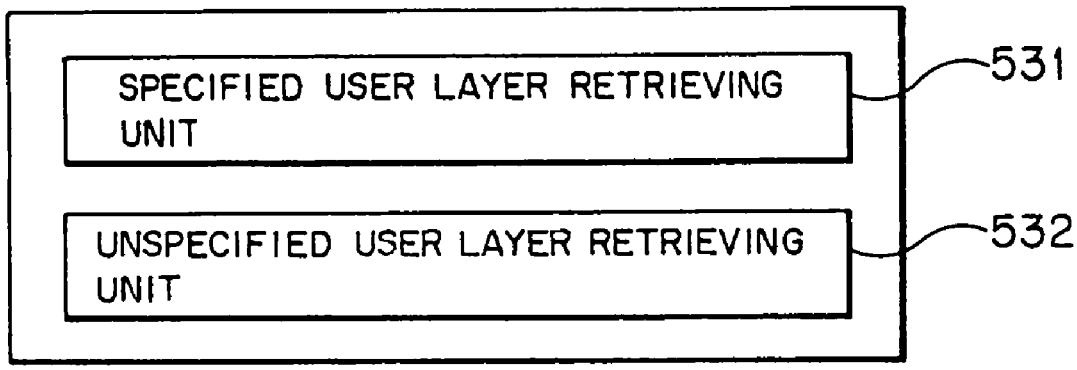
FIG. 28 is a block diagram showing a structure of a retrieving unit in the information center according to the first embodiment.
Figure 29:
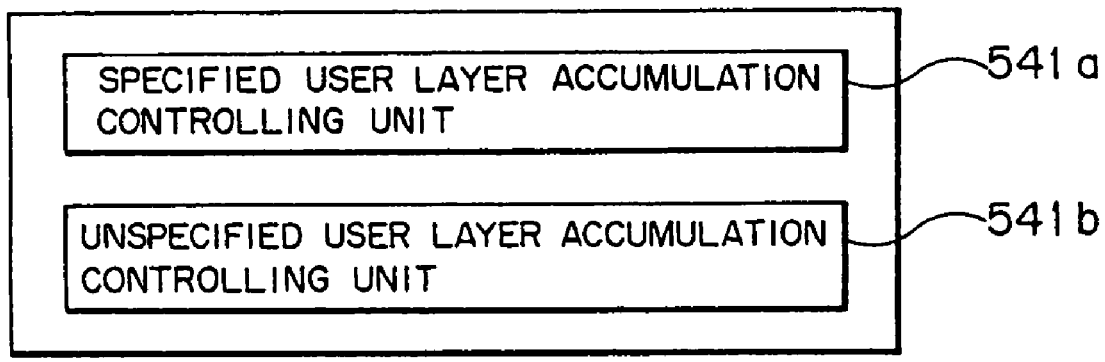
FIG. 29 is a block diagram showing a structure of an accumulation controlling unit in the information center according to the first embodiment.
Figure 30:
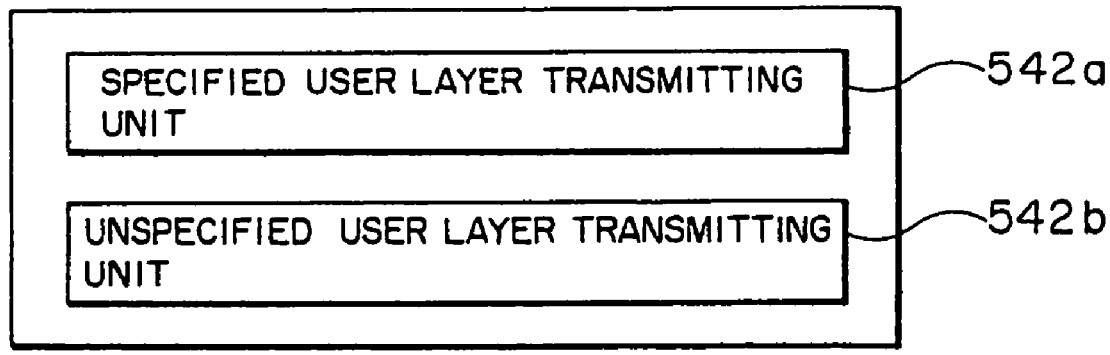
FIG. 30 is a block diagram showing a structure of an information/service transmitting unit in the information center according to the first embodiment.

For this, functions of the retrieving unit 53, the accumulation controlling unit 541 of the information/service providing unit 54 and the information/service transmitting unit 542 mentioned above are divided as shown in FIGS. 28 through 30, respectively. The retrieving unit 53 has, as shown in FIG. 28, a specified user layer retrieving unit 531 and an unspecified user layer retrieving unit 532. The accumulation controlling unit 541 has, as shown in FIG. 29, a specified user layer accumulation controlling unit 541a and an unspecified user layer accumulation controlling unit 541b. The information/service transmitting unit 542 has, as shown in FIG. 30, a specified user layer transmitting unit 542a and an unspecified user layer transmitting unit 542b.

In the retrieving unit 53, the specified user layer retrieving unit 531 receives position information sent from a specified user or a specified user group, refers to the area directory 524 or the layer selection table 527 with the position information as a key to be linked to the user layer 523 or the user group layer 522, then retrieves map information, town information or a service retained (accumulated) in the information storing area 525 or the service program storing area 526.

On the other hand, the unspecified user layer retrieving unit 532 receives position information sent from an unspecified user (any one of the plurality of mobile terminals 4), refers to the area directory 524 or the layer selection table 527 with the position information as a key to be linked to the global layer 521, then retrieves map information, town information, or a service retained (accumulated) in the information storing area 525 or the service program storing area 526.

In the accumulation controlling unit 541, the specified user layer accumulation controlling unit 541a accumulates up-load data (map information, town information or a service) sent through the information/service providing unit 43 of the mobile terminal 4 of a specified user in the information storing area 525 or the service program storing area 526 corresponding thereto linked to the user layer 523 or the user group layer 522 on the basis of the area directory 524 or the layer selection table 527. The unspecified user layer accumulation controlling unit 541b accumulates up-load data send through the information/service providing unit 43 of any one of the mobile terminals 4 of unspecified users in the information storing area 525 or the service program storing area 526 corresponding thereto linked to the global layer 521 on the basis of the area directory 524 or the layer selection table 527.

In the information/service transmitting unit 542, the specified user layer transmitting unit (an information/service transmitting unit for specified mobile terminals) 542a takes out map information, town information or a service retrieved by the above specified user layer retrieving unit 531 from the information storing area 525 or the service program storing area 526 linked to the user layer 523 or the user group layer 522, and transmits it to the mobile terminal 4 having transmitted position information. The unspecified user layer transmitting unit (an information/service transmitting unit for unspecified mobile terminals) 542b takes out map information, town information or a service retrieved by the unspecified user layer retrieving unit 532 from the information storing area 525 or the service program storing area 526 linked to the global layer 521, and transmits it to the mobile terminal 4 having transmitted position information.

Namely, in the above information center 5, the database 52, the retrieving unit 53, the accumulation controlling unit 541 and the information/service transmitting unit 542 each has two types of functions (means), that is, for specified mobile terminals and unspecified mobile terminals, whereby map information, town information or services relating to position information of the mobile terminals 4 are clearly divided (hierarchized) into for specified mobile terminals and for unspecified mobile terminals to be managed.

As above, the database 52 can selectively provide corresponding data of store/facility information (or a service) existing in a region or a plurality of regions on the terminal screen (the LCD) 47-1 and position information of the mobile terminal 4 according to a demand from the mobile terminal 4 or the selection list set in advance in the layer selection table 527.

Next, a method of managing information in the database 52 in the above information center 5 will be described in detail with reference to a sequence diagram shown in FIGS. 31 through 34.

(3-1) If the Information Center 5 Receives a Demand for Registering (Up-loading) Map Information, Town Information or a Service from the Mobile Terminal 4

Figure 31:
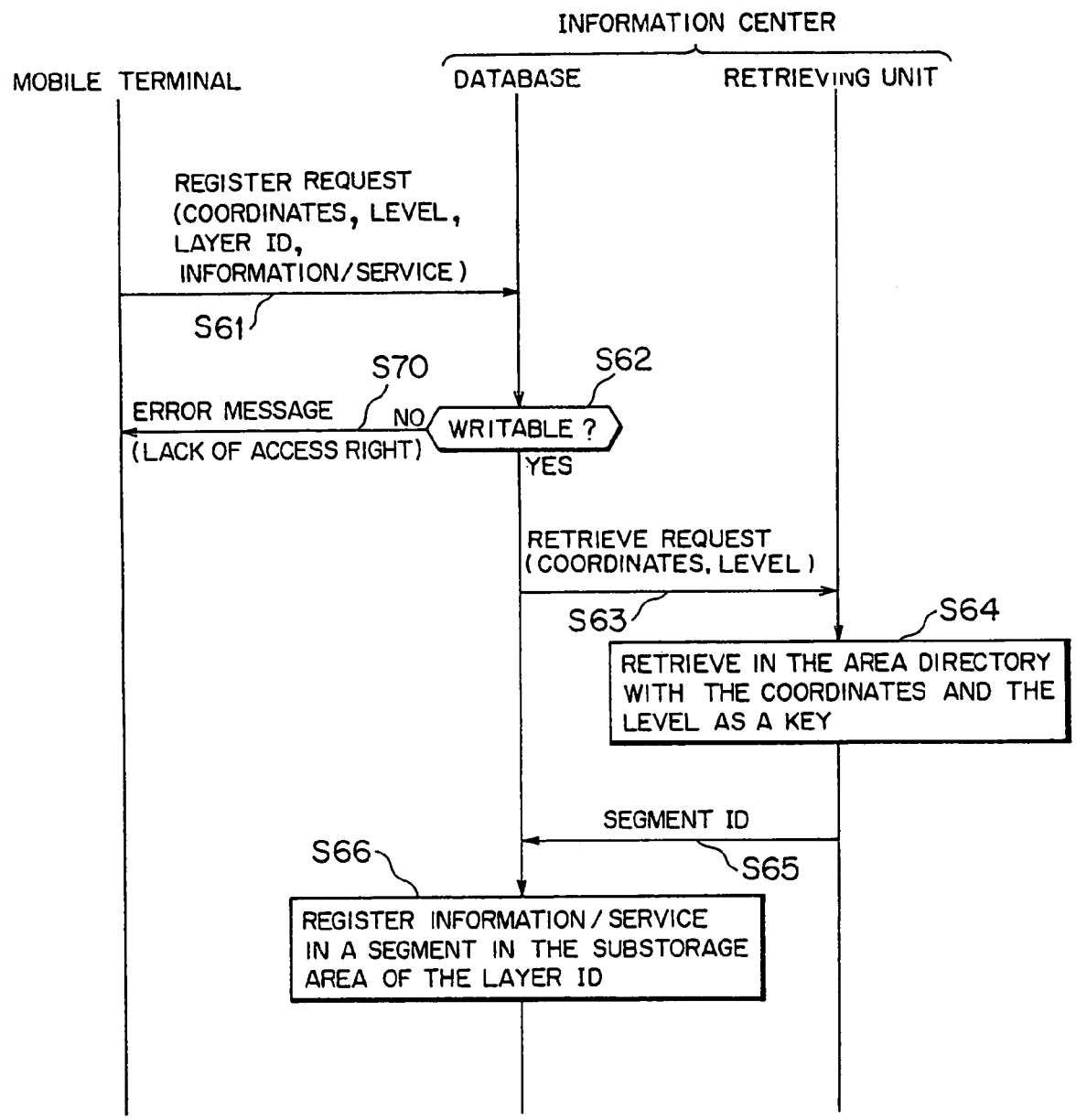
FIG. 31 is a sequence diagram for illustrating the up-loading operation for each layer in the mobile communicating system according to the first embodiment.

When screen coordinates (geographical coordinates), a level, a layer ID and information/service to be registered are transmitted as a demand for registering information/service in the database 52 from the mobile terminal 4 through the radio base station 6 as shown in FIG. 31 (Step S61), the information center 5 judges whether it is possible to write the received information/service in the information storing area 525 or the service program storing area 526 linked to a corresponding layer (a layer designated by the layer ID) 521, 522 or 523 in the database 52 or not (Step S62). Assuming here that the above geographical coordinates have been inputted in the method for designating a position described hereinbefore with reference to FIG. 23.

If it is found as a result of the judgement that the writing is impossible [for example, if a user without a right to register (access to) information/services in the user group layer 522 has made a register demand], the information center 5 sends back this effect as an error message to the mobile terminal 4 having transmitted the register demand (from NO route at Step S62 to Step S70). If the writing is possible, either the specified user layer retrieving unit 531 or the unspecified user layer retrieving unit 532 of the retrieving unit 53 is activated according to the layer ID in the information center 5, then the geographical coordinates and the level are notified as a retrieve demand (YES route at Step S62 to Step S63).

The retrieving unit 53 (the specified user layer retrieving unit 531 or the unspecified user layer retrieving unit 532) refers (retrieves) the area directory 524 with the received coordinates and level as a key, obtains a segment ID of the information storing area 525 or the service program storing area 526 in which the received information/service should be stored (Step S64), then notifies it to the database 52 (Step S65).

The database 52 accumulates the received information/service in the information storing area 525 or the service program storing area 526 corresponding to the segment ID, thereby completing the information/service registration (Step S66).

(3-2) If the Information Center 5 Receives a Demand for Retrieving (Down-Loading) Map Information, Town Information or a Service from the Mobile Terminal 4

Figure 32:
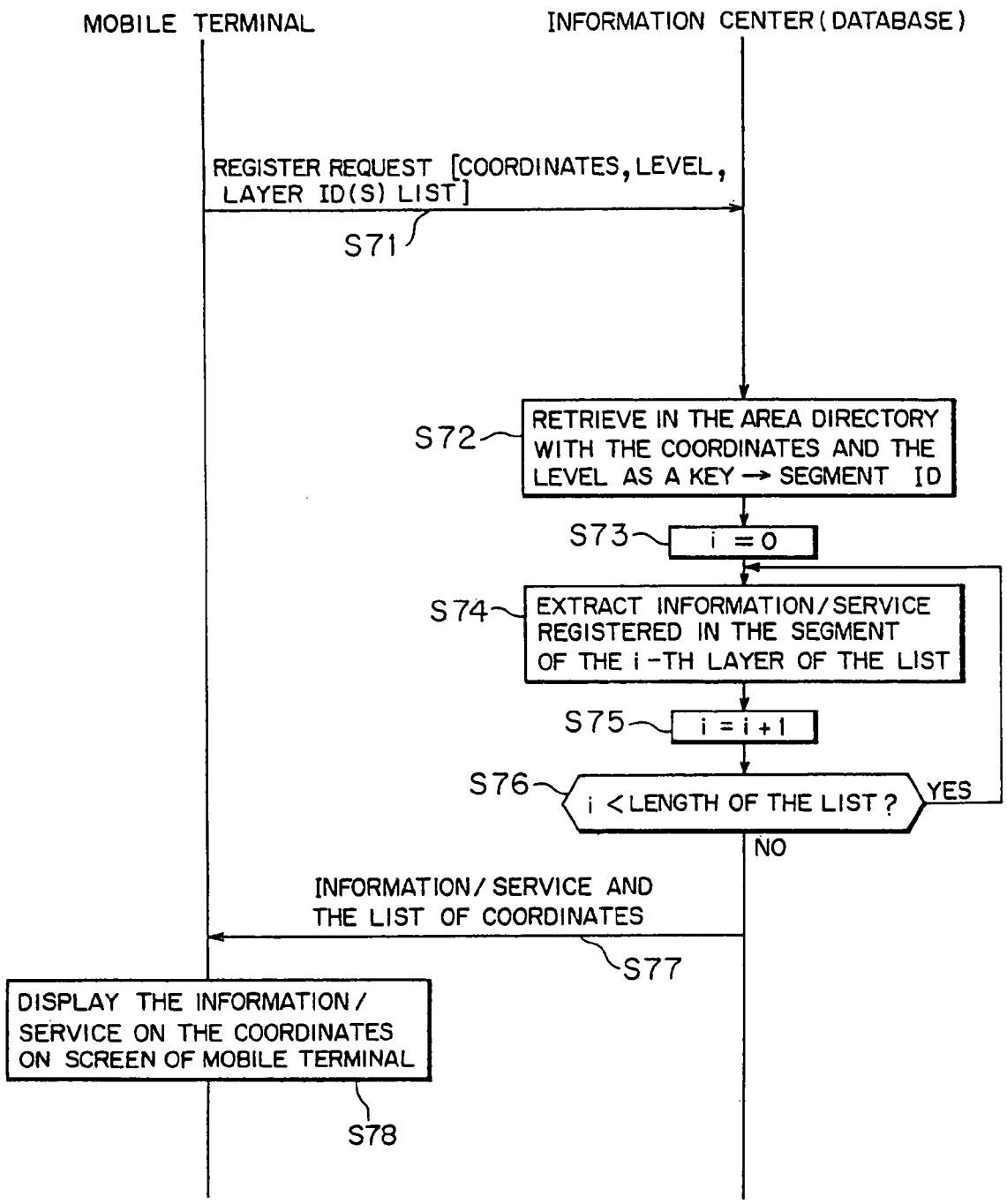
FIG. 32 is a sequence diagram for illustrating the down-loading operation for each layer in the mobile communicating system according to the first embodiment.

When a list of geographical coordinates, a level and a layer. ID is transmitted as a retrieve demand for information/service accumulated in the database 52 from the mobile terminal 4 through the radio base station 6, as shown in FIG. 32 (Step S71), the information center 5 activates either the specified user layer retrieving unit 531 or the unspecified user layer retrieving unit 532 on the basis of the received list of the layer ID, then retrieves the area directory 524 in the database 52 with the geographical coordinates and the level as a key so as to obtain the segment ID (Step S72).

The retrieving unit 53 resets (initializes) a counter value (i) used to count length of the list (i=0; Step S73), then extracts information/service stored in a segment in the i-th layer of the list in the database 52 (Step S74). After that, the retrieving unit 53 increments the counter value (i) (i=i+1) (Step S75), then judges whether the information/service to be extracted still remains or not (whether i<"a length of the list" or not) (Step S76).

If i<"length of the list" as a result, the retrieving unit 53 repeats a process at and after the above Step S73 until all information/service to be extracted is extracted (until i="length of the list"). (YES route at Step S76). When i="length of the list", the retrieving unit 53 provides a list of the extracted information/service and a list of geographical coordinates showing a displaying position of the information/service on the terminal screen (LCD) 47-1 to the mobile terminal 4 (from NO route at Step S76 to Step S77). The mobile terminal 4 displays the received information/service on the screen coordinates on the LCD 47-1 (Step S78).

In the above process, the user can display information or a service program registered in a designated layer on the LCD 47-1 in a state where an image of a map and the current position coincide to each other if designating a plurality of layers irrespective of a type of the layer and accessing to the information center 5 from the mobile terminal 4. For instance, if the user designates both a layer ID of the user group layer 522 and a layer ID of the user layer 523 and makes a retrieve demand, the user can simultaneously display information about a tennis court managed by the user group layer 522 and information about a restaurant managed by the user layer 523 over an image of a map on the LCD 47-1 of the mobile terminal 4, thereby selecting a tennis court that the user wants to reserve in a standpoint of a relation of their positions.

If the layer selection table 527 of the information center 5 is set so as to meet a life habit of the user, it is possible, for example, to automatically switch a layer in which information necessary in daytime of weekdays is collected to/from a layer in which information of restaurants necessary in the night time according to a time zone by the information center 5. In which case, the user does not need to designate a layer ID that is an object of retrieval when accessing to the information center 5.

Figure 33:
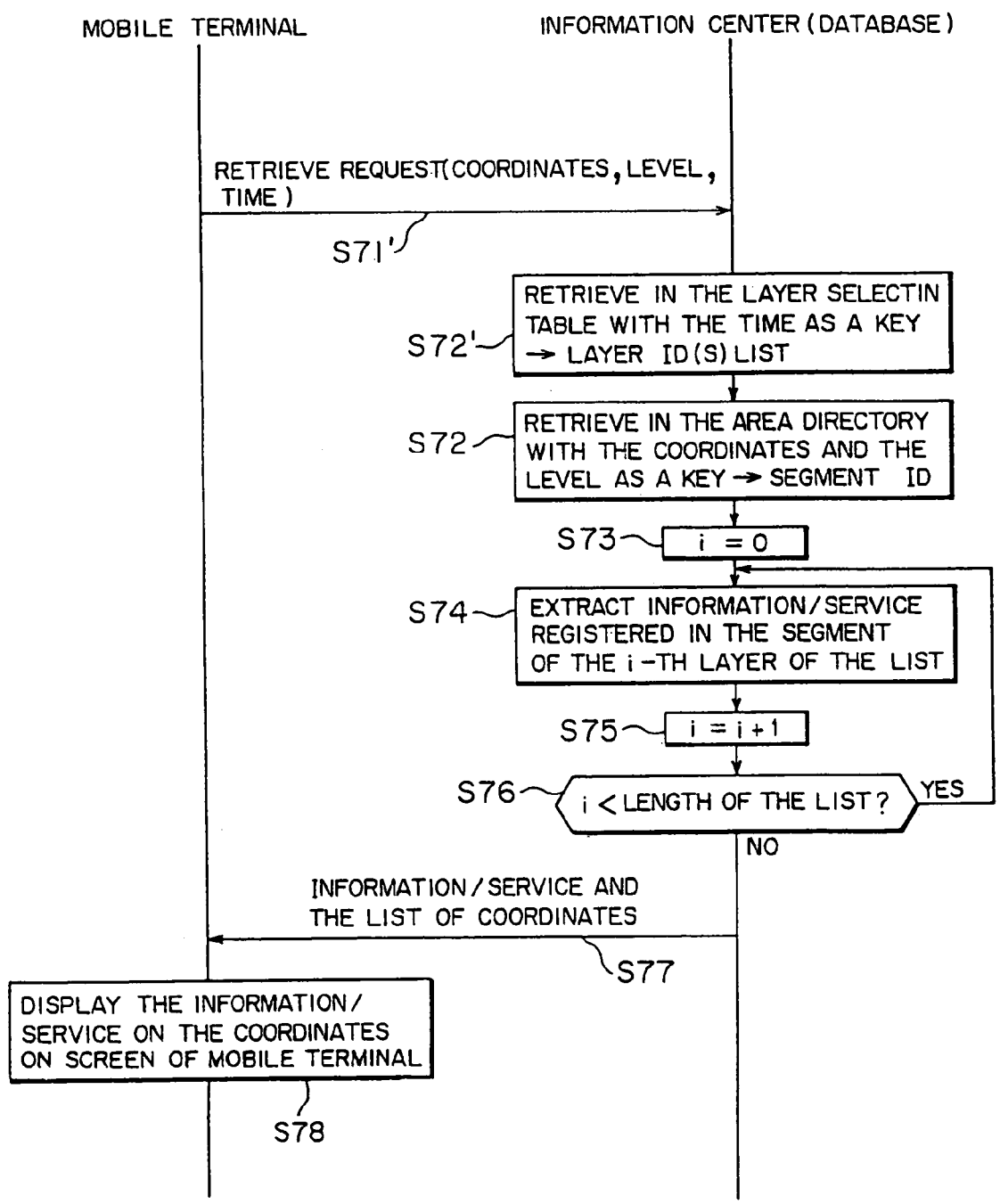
FIG. 33 is a sequence diagram for illustrating the down-loading operation for each layer in the mobile communicating system according to the first embodiment.

Namely, if the mobile terminal 4 transmits only coordinates, a level and a time as a retrieve demand (Step S71'), the retrieving unit 53 of the information center 5 retrieves in the layer selection table 527 with the received time as a key to automatically obtain a list of layer IDs (Step S72'), as shown in FIG. 33. Thereafter, it is possible to display information/service on the mobile terminal 4 according to a desired time zone in the similar process at the above Steps S72 through S78 described with reference to FIG. 32.

Each of processes at the time of the above register demand and retrieve demand is conducted on the basis of geographical coordinates inputted to the mobile terminal 4 using the method of designating a position described hereinbefore with reference to FIG. 23. However, the processes may be conducted on the basis of region information inputted to the mobile terminal 4 in the method of designating a position described hereinbefore with reference to FIG. 25.

Figure 34:
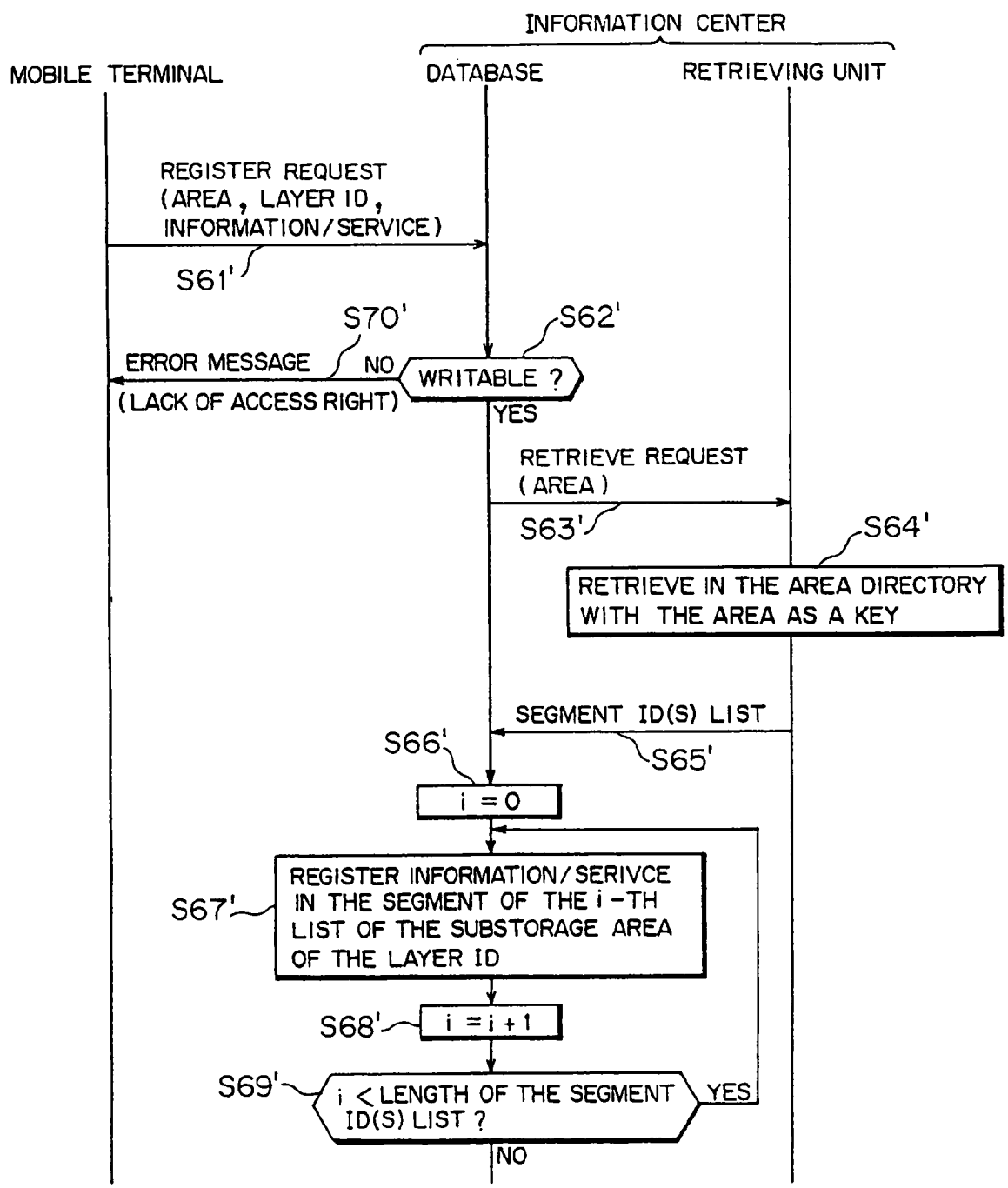
FIG. 34 is a sequence diagram for illustrating the up-loading operation for each layer in the mobile communicating system according to the first embodiment.

For instance, a process at the time of a register demand is conducted as follows. In this case, as shown in FIG. 34, a region, a layer ID and information/service to be registered are transmitted as a demand for registering information/service in the database 52 from the mobile terminal 4 through the radio base station 6 (Step S61'). The information center 5 judges whether it is possible to write the received information/service in the information storing area 525 or the service program storing area 526 linked to a corresponding layer (a layer designated by the layer ID) 521, 522 or 523 in the database 52, as well (Step S62').

If it is found as a result of the judgement that the writing is impossible, the information center 5 sends back this effect as an error message to the mobile terminal 4 having transmitted the register demand (from NO route at Step S62' to Step S70'). If the writing is possible, either the specified user layer retrieving unit 531 or the unspecified user layer retrieving unit 532 of the retrieving unit 53 is activated according to the layer ID and an area is notified as a retrieve demand in the information center 5 (from YES route at Step S62' to Step S63').

The retrieving unit 53 (the specified user layer retrieving unit 531 or the unspecified user layer retrieve unit 532) refers (retrieves) the area directory 524 with the received area as a key, obtains a segment ID of the information storing area 525 or the service program storing area 526 in which the received information/service should be accumulated (Step S64'), and notifies it to the database 52 (Step S65').

The retrieving unit 53 resets (initializes) a counter value (i) used to count a length of a list (i=0: Step S66'), then registers the received information/service in the segment of the i-th layer of the list in the database 52 through the accumulation controlling unit 541 (Step S67'). After that, the retrieving unit 53 increments the counter value (i) (i=i+1) (Step S68'), then judges whether the information/service that should be registered still remains or not (i<"length of the list" or not) (Step S69').

If i<"length of the list" as a result, the retrieving unit 53 repeats a process at and after the above Step S73 until all the information/service that should be extracted is extracted (until i="length of the list") (YES route at Step S69'). When i="length of the list", the registering process is completed (NO route at Step S69').

Figure 35:
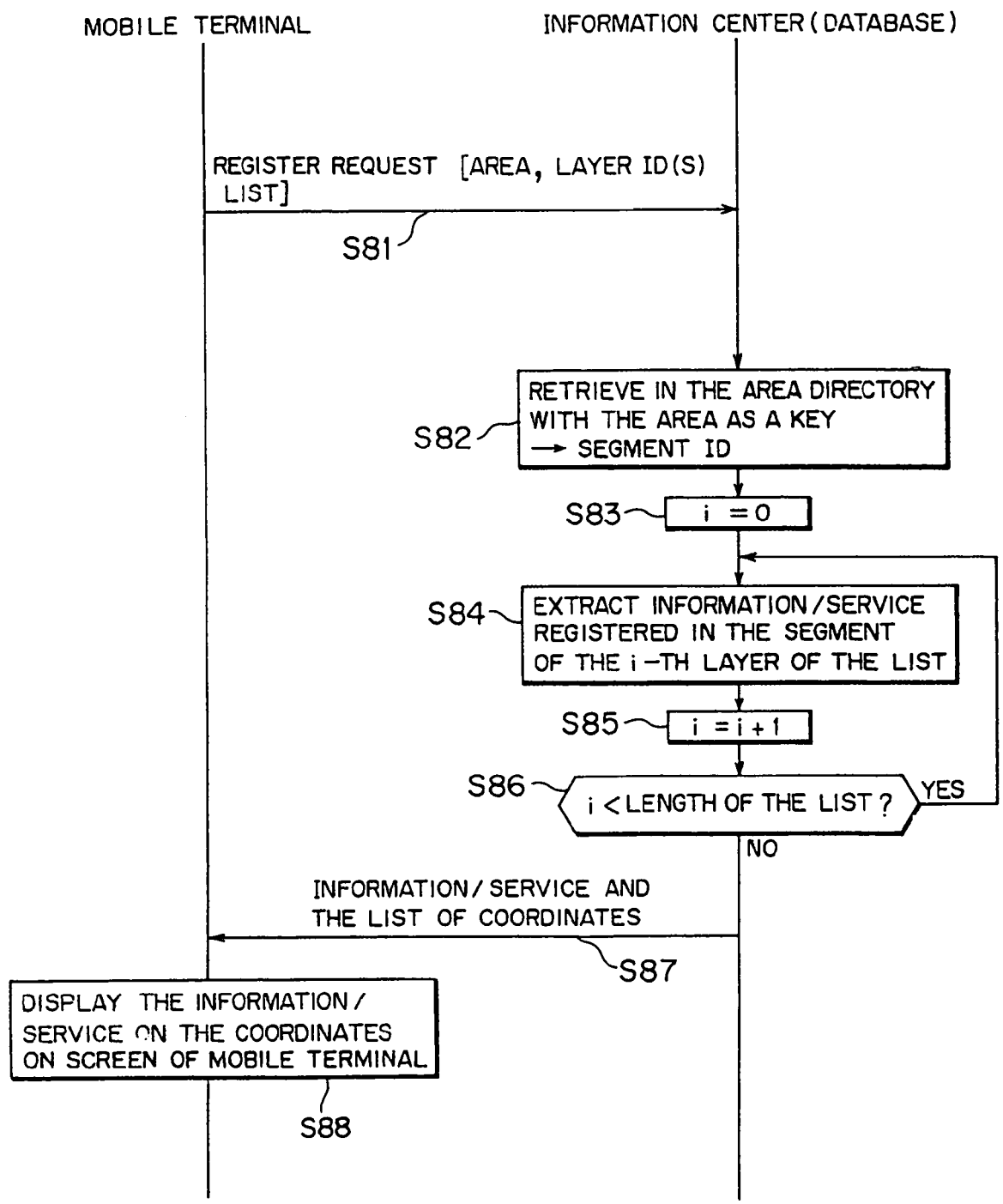
FIG. 35 is a sequence diagram for illustrating the down-loading operation for each layer in the mobile communicating system according to the first embodiment.

On the other hand, a process at the time of a retrieve demand is conducted as shown at Steps S81 through S88 in FIG. 35. In this case, the process differs from the process at Steps S71 through S78 shown in FIG. 32 in only that the retrieving process is conducted with coordinates and a level as a key or an area as a key (only the process at Steps S81 and S82 differs). Another processes are conducted quite similarly to the processes shown in FIG. 32.

Figure 36:
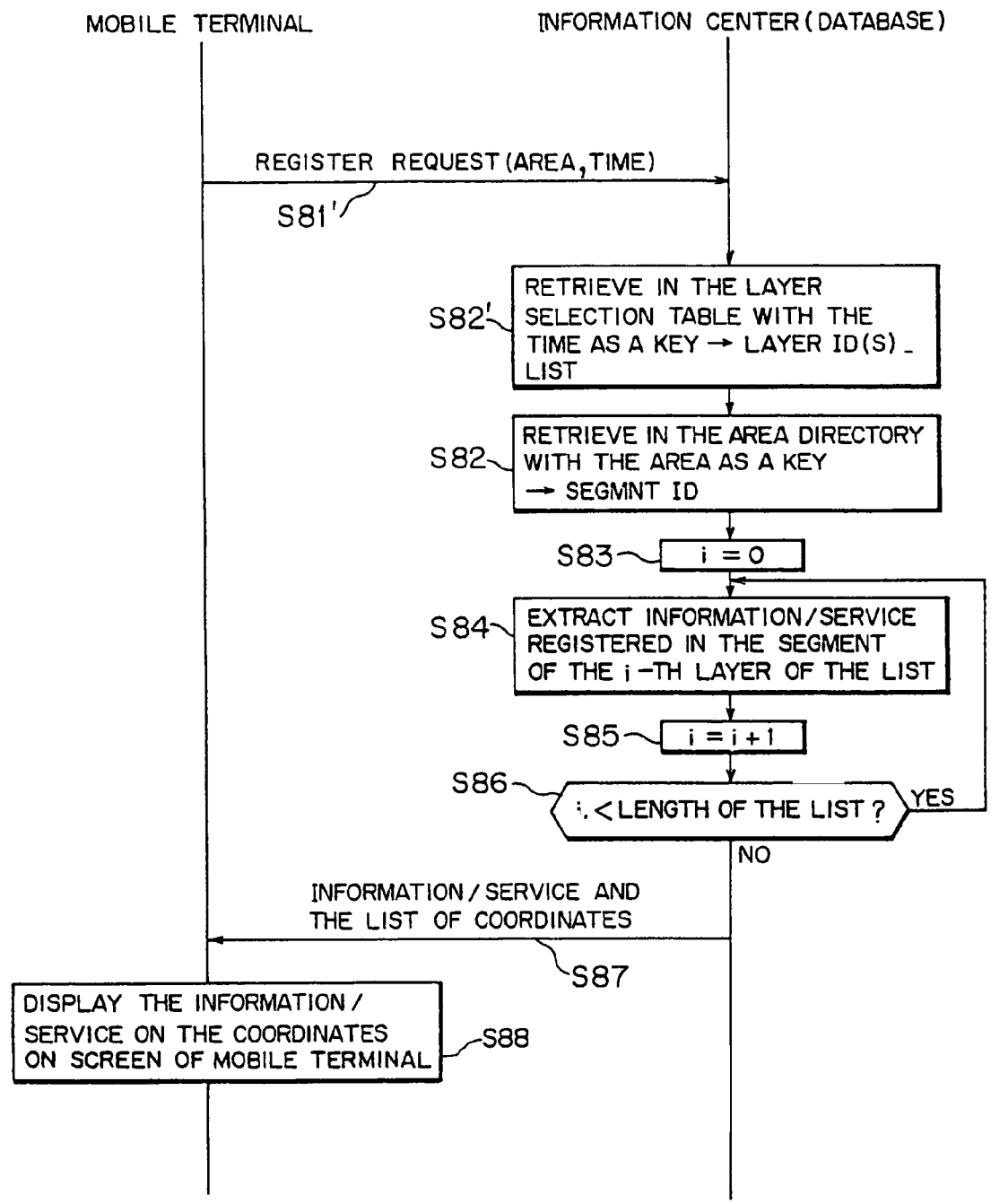
FIG. 36 is a sequence diagram for illustrating the down-loading operation for each layer in the mobile communicating system according to the first embodiment.

In this case, if the user, as well, inputs only an area and a time as a retrieve demand through the mobile terminal 4 as shown in FIG. 36 (Step S81'), the retrieving unit 53 of the information center 5 retrieves in the layer selection table 527 with the received time as a key to automatically obtain a list of the layer ID (Step S82'). After that, it is possible to display information/service according to a desired time zone on the mobile terminal 4 in a process similar to the process at Steps S82 through S88 in FIG. 35.

According to the mobile communicating system of this embodiment, it is possible to clearly divide (hierarchize) information or services relating to position information of the mobile terminals 4 into a layer for specified mobile terminals (the user group layer 522 and the user layer 523) and a layer for unspecified mobile terminals (the global layer 521) so as to manage it in the information center 5. It is therefore possible to largely reduce a burden of maintenance (maintenance and management) of information or services in the information center 5.

Owing to the user group layer 522, it is possible to commonly use the latest information by a plurality of users. Owing to the layer selection table 527, it is possible to provide a local information service customized to meet a life habit or hobby of an individual user. This feature largely contributes to improvement of the service.

If the above information (the map information and town information) or the position information of the service program is stored in the above database 52 as area data of a relatively wide area, it is possible to retain data which can be any time displayed on the mobile terminal 4 in the information center 5 even if the user changes an area of the map displayed on the mobile terminal 4.

In concrete, region data consisting of area type data representing a shape of an area and area coordinates data is set in a position information part in correspondence data of information or a service program stored in the database 52 in the information center 5 and position information of the mobile terminal 4, and an operating unit for performing an operation of an inclusive relation between a terminal displayed region and information relating to a place (position information) or region data of the service program in the database 52, in this case.

If area data showing a range in which man can move on foot from Shinjuku Station is registered as area data for a notice board service (program) in the database 52 of the information center 5, the notice board service is transmitted to the mobile terminal 4 from the information center 5 so long as a map displayed on the mobile terminal 4 overlaps an area set in the notice board service even if the map is enlarged and displayed on the mobile terminal 4. It is therefore possible that the user can grasp information of an event or the like opened in the vicinity (of Shinjuku Station) by the notice board service. In other words, it is possible to provide information or a service relating to an area wider than an area displayed on the mobile terminal 4.

(4) Exchange of Information or a Service Between the Mobile Terminals 4

Next description will be made of a case where a certain mobile terminal 4 receives map information, town information or a service retained in another mobile terminal 4 from that mobile terminal 4 without directly accessing to the information center 5.

Figure 37:
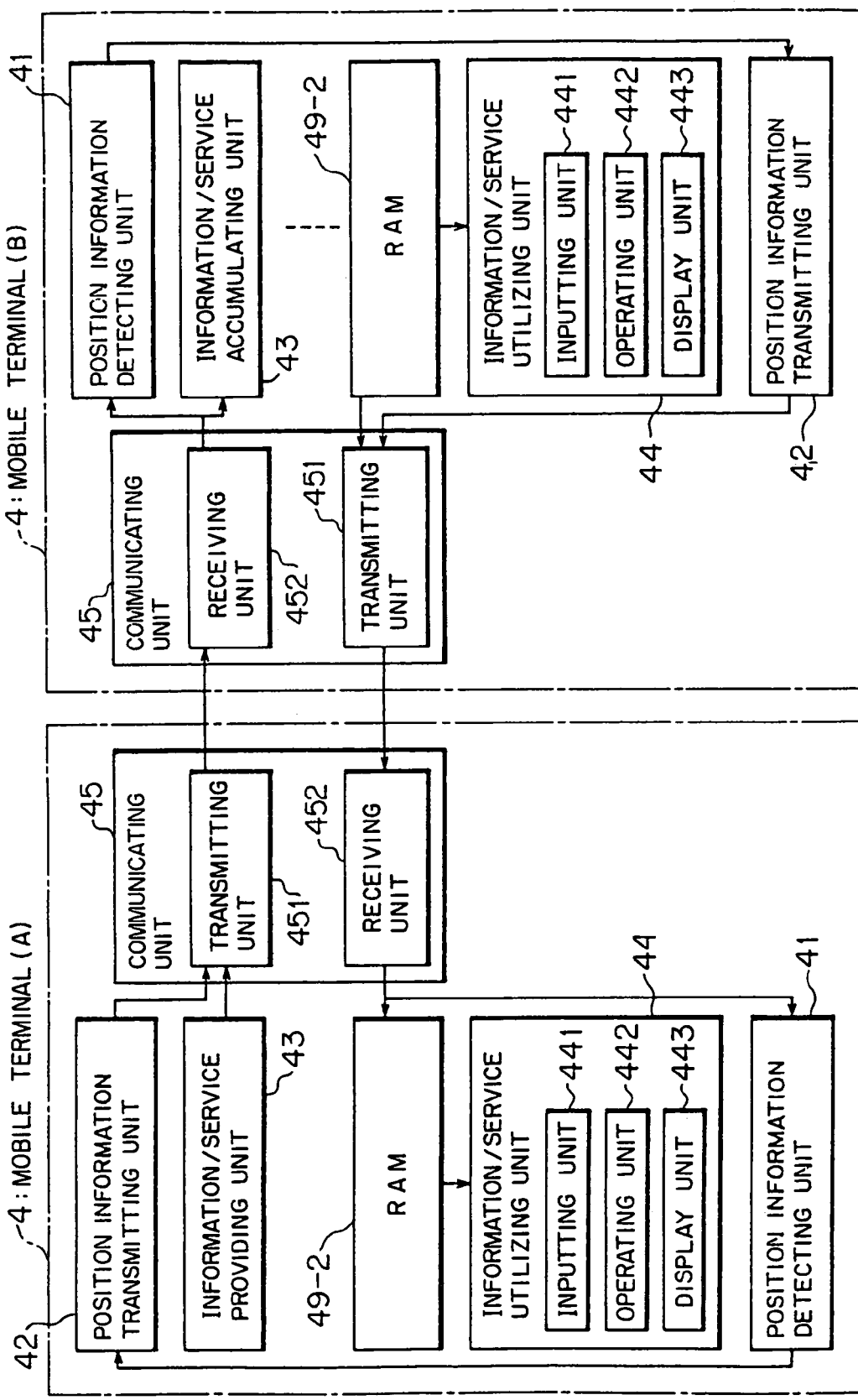
FIG. 37 is a block diagram showing another detailed structure of a PHS mobile terminal according to the first embodiment.

FIG. 37 is a block diagram showing a structure of the mobile terminal 4 in this case. As shown in FIG. 37, each of the mobile terminals 4 has a position information detecting unit 41, a position information transmitting unit 42, an information/service providing unit 43, an information/service utilizing unit 44 and a PHS radio communicating unit 45 similar to those in FIG. 7. Here, the PHS radio communicating unit 45 additionally has a transmitting unit 451 for transmitting map information, town information or a service received from the information center 5 to another mobile terminal 4, and a receiving unit 452 for receiving map information, town information or a service which has been sent to another mobile terminal 4 from the information center 5 from that mobile terminal 4. Further, the information/service utilizing unit 44 also functions as a secondary information/service utilizing unit for secondary utilizing map information, town information or a service received by the receiving unit 452.

In the information/service utilizing unit 44, reference numeral 441 denotes an inputting unit corresponding to the above-mentioned touch panel 47-2, 443 denotes a display unit corresponding to the LCD 47-1, 442 denotes an operating unit for performing a desired operating process on data (screen coordinates, map information and the like) exchanged between the inputting unit 441 and the display unit 443.

Namely, each of the mobile terminals 4 shown in FIG. 37 is configured as a third-type mobile terminal which can exchange map information, town information or a service directly received from the information center 5 with another mobile terminal 4.

Whereby, the mobile terminal 4 can transmit map information, town information or a service send from the information center 5 to another mobile terminal 4, besides being able to indirectly receive map information, town information or a service sent from the information center 5 to another mobile terminal 4 from that mobile terminal 4 to secondary utilize it.

The above operation will be next described with reference to a sequence diagram (Steps A1 through A15) shown in FIG. 38. Hereinafter, a mobile terminal 4 directly receiving map information, town information or a service from the information center 5 is named "terminal B", whereas a mobile terminal 4 receiving map information, town information or a service from the terminal B is named "terminal A" for the sake of convenience.

Figure 38:
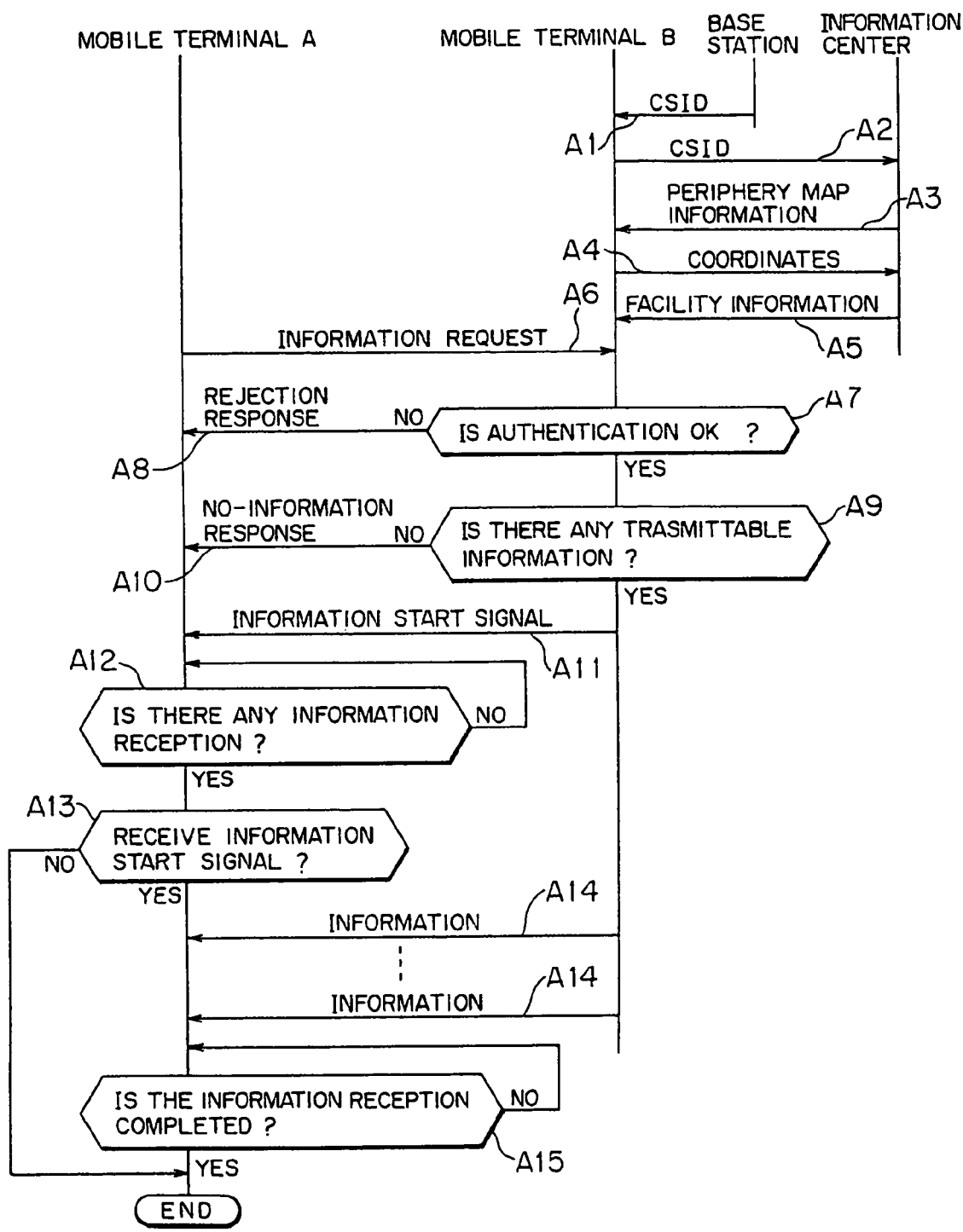
FIG. 38 is a sequence diagram for illustrating exchange of information or a service between the PHS mobile terminals in the mobile communicating system according to the first embodiment.

As shown in FIG. 38, the terminal B receives a CSID by the receiving unit 452 (the CCH receiving unit 45d; refer to FIG. 10) (Step A1), transmits it to the information center 5 (Step A2), thereby obtaining map information in the neighbour of the current position of its own (terminal B) (Step A3). When a certain point of a facility on the map is designated by the user as described before, the terminal B reads screen coordinates of that point through the touch panel 47-2 and transmits them to the information center 5 (Step A4). The terminal A thereby receives information (town information) as to a facility corresponding to the coordinates from the information center 5 (Step A5), and stores the received information in a format as described hereinbefore with reference to FIG. 11 in the RAM 49-2.

At this time, a flag "1" is set to information or a service which can be provided to another terminal A using one bit in the header 491. Here, whether information or a service can be provided to another terminal A or not may be determined as default for each item (for instance, map can be provided but a personal memorandum cannot be provided, etc.), or may be set freely by the user at an arbitrary point of time.

After that, when the terminal B receives a information demand signal from the terminal A (Step A6), the terminal B performs an authenticating process or the like as to whether the terminal A having transmitted the information demand signal is registered as a member of the same user group of the terminal B or not (Step A7). If the terminal A is not registered as a member of the same user group of the terminal B, the terminal B transmits a rejection response to the terminal A (from NO route at Step A7 to Step A8).

If the terminal A is registered as a member of the same user group of the terminal B (authentication is OK), the terminal B retrieves in the header 491 in an information area in the RAM 49-2 to check whether there is any information which can be provided or not (from YES route at Step A7 to Step A9). If there is no information or service which can be provided to the terminal A (for example, if flags in the header 491 are all set to "0"), the terminal B notifies it as a response signal representing that there is no information to the terminal A (from NO route at Step A9 to Step A10).

If there is information which can be provided, the terminal B transmits an information start signal to the terminal A (from YES route at Step A9 to Step A11), after that, provides the information or the service to the terminal A (Step A14). Incidentally, a quantity of information about map information, town information or a service that will be transmitted thereafter is set to the above information start signal.

The terminal A having received the information start signal ensures an area in which the map information, town information or service will be stored equal to a quantity of information set in the information start signal in the RAM 49-2, gives a header 491 to each type of the received information (the map information, the town information or the service), and successively accumulates it in the RAM 49-2 (Steps A12 through A14).

After that, the terminal A judges whether all information has been received from the terminal B or not (Step A15) so as to continuously receive the information until all the information has been received (NO route at Step A15). When the terminal A completes to receive all the information (YES route at Step A15), the operating unit 442 of the information/service utilizing unit 44 checks the header 491 of the information accumulated in the RAM 49-2. If the information accumulated in the RAM 49-2 is map information, the terminal A develops it into a map and displays it on the LCD 47-1. If the information is town information (characters), the terminal A displays it on the LCD 47-1 as characters.

If the information is a program, the terminal A displays this effect on the LCD 47-1 to be brought into an execution waiting state. When the user directs a start of the service, the terminal A starts execution of the program.

In this case, the map information or a program transmitted from the terminal B to the terminal A is information in a relatively large data quantity. According to this embodiment, it is possible to transmit it within an extremely short time since there is used a 32 kbps bearer transmission of PHS as described hereinbefore. For instance, a residential area map within 200 to 300 hundreds meters displayed in 240×320 dots is in a data quantity of approximately 5 k to 10 k bytes (40 k to 80 k bits) so that it can be transmitted within approximately 1.25 to 2.5 seconds.

Figure 39:
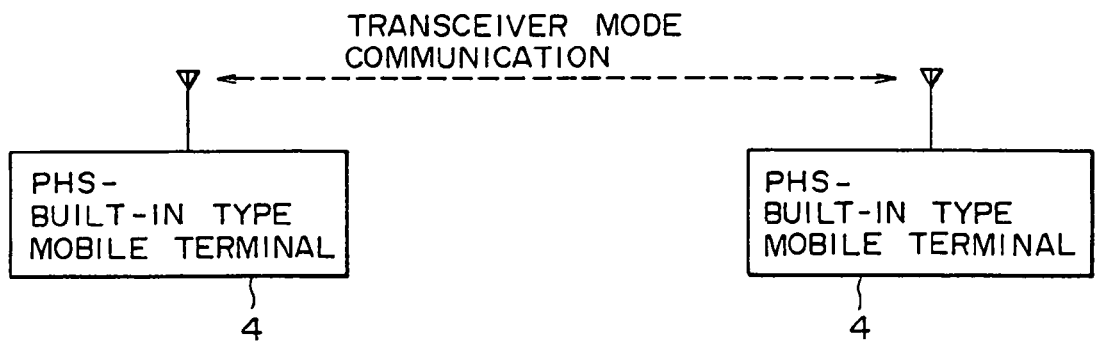
FIG. 39 is a block diagram showing an example of a communication mode between the PHS mobile terminals in the mobile communicating system according to the first embodiment.
Figure 40:
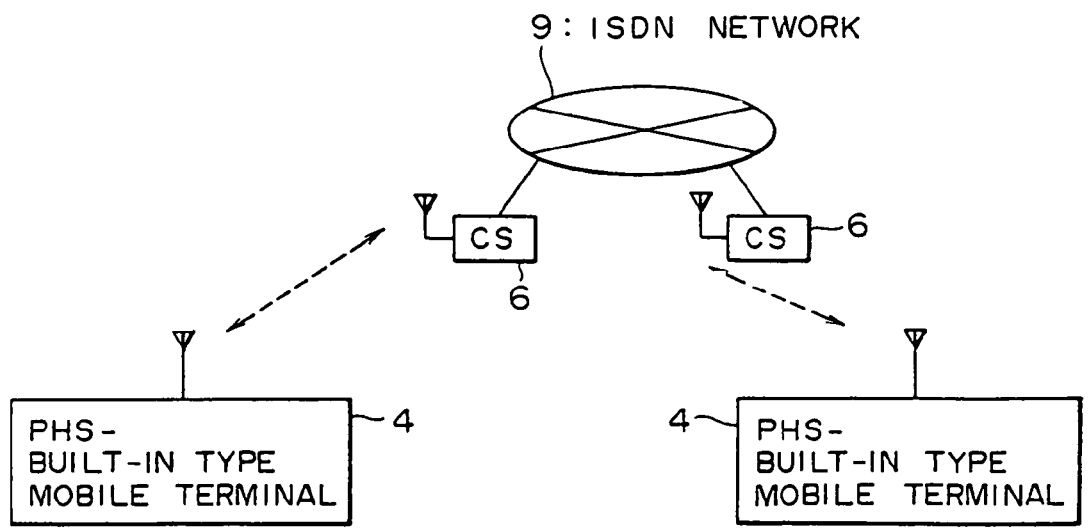
FIG. 40 is a block diagram showing an example of another communication mode between the PHS mobile terminals in the mobile communicating system according to the first embodiment.
Figure 41:
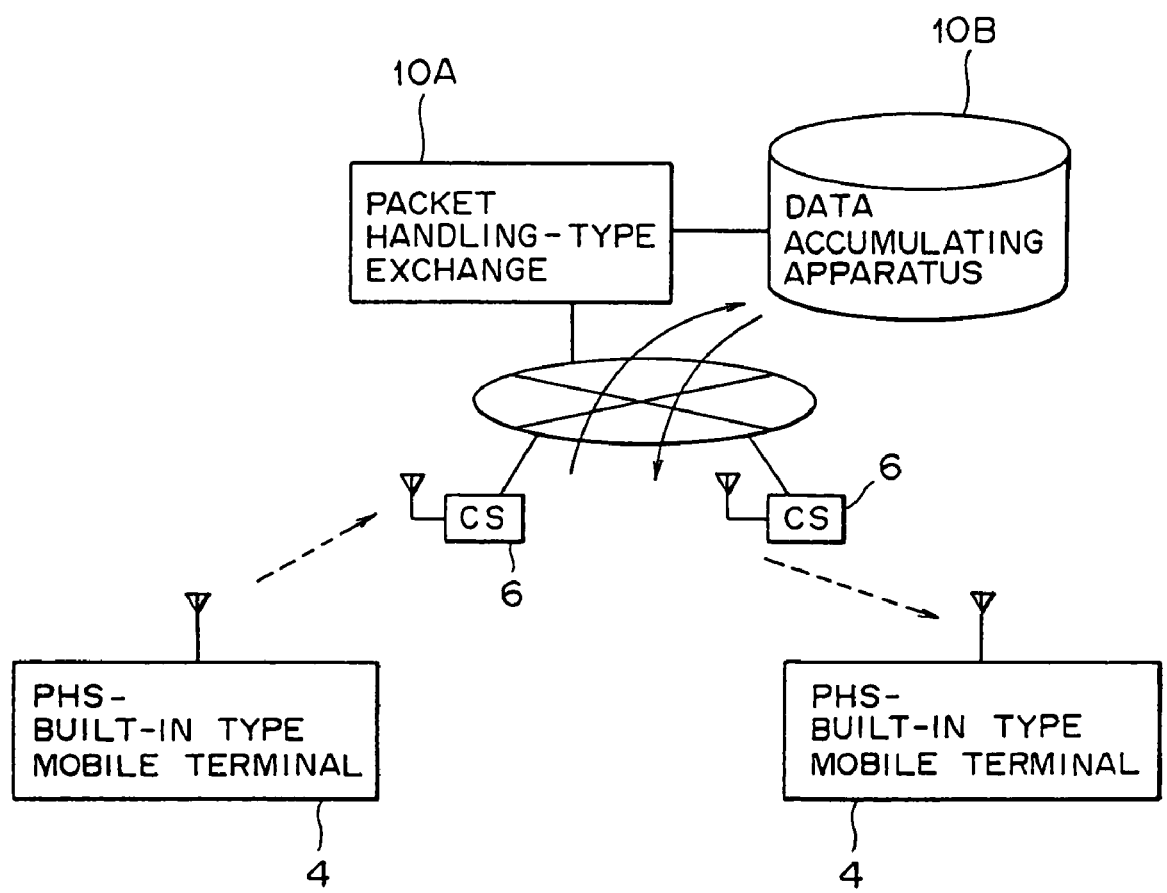
FIG. 41 is a block diagram showing an example of still another communication mode between the PHS mobile terminals in the mobile communicating system according to the first embodiment.

Meanwhile, a communication between the terminal A and terminal B may be made utilizing a transceiver mode of PHS as shown in FIG. 39, for example, whereby the terminal A and terminal B can directly communicate with each other not through the radio base station 6. Alternatively, a communication between the terminal A and terminal B may be made via the radio base station 6, over an ISDN network 9 (a general public network in the case of a portable telephone) as a general PHS communication mode or a portable telephone as shown in FIG. 40. As a communication via the radio base station 6, it is possible to use a packet handling-type exchange 10A, as shown in FIG. 41. In which case, communication data (map information, town information or a service) is temporarily accumulated in a data accumulating apparatus 10B through the packet handling-type exchange 10A, and properly transmitted to the mobile terminal 4 via the radio base station 6.

The above-mentioned mobile terminal 4 (the terminal A) can indirectly receive information or a service relating to position information sent to another mobile terminal 4 (the terminal B) from the information center 5 without necessity of directly accessing to the information center 5, and utilize it. In particular, if a plurality of mobile terminals 4 commonly possess the same information or a service, it is unnecessary for each mobile terminal 4 to receive information or a service relating to position information of its own from the information center 5 so that a scale of a source (the database 52) in the information center 5 may be minimized.

A direct communication between the mobile terminals 4 is, as shown in FIG. 39, very economical since it needs no telephone charge.

With the same terminal structure described above, the mobile terminal 4 can obtain information relating to a position of another mobile terminal 4 using a retrieving function of its own (using the retrieving unit 53 of the information center 5) on the basis-of position information such as a CSID or the like transmitted from another mobile terminal 4.

The mobile terminal 4 shown in FIG. 37 may be configured as a second-type mobile terminal which has only the transmitting unit 451 in the PHS radio communication unit 45 to only transmit map information, town information or a service to another mobile terminal 4. Alternatively, the mobile terminal 4 may be configured as a fourth-type mobile terminal which has only a receiving unit 452 to only receive map information, town information or a service from another mobile terminal 4.

Still alternatively, the mobile terminal 4 shown in FIG. 37 may be configured as a fifth-type mobile terminal which has only the receiving unit 452 and the information/service utilizing unit (the secondary information/service utilizing unit) 44 to only receive and secondarily utilize map information, town information or a service from another mobile terminal 4. Incidentally, the mobile terminal 4 without the transmitting unit 451 and receiving unit 452 served for another mobile terminal 4 which can only exchange map information, town information or a service with the information center 5 is a first-type mobile terminal.

Namely, in this mobile communicating system, a plurality of mobile terminals 4 are classified into first- to fifth-types of mobile terminals 4. The transmitting unit 451 is provided to the second-type mobile terminal 4 and the third-type mobile terminals, whereas the receiving unit 452 is provided to the third- to fifth-type mobile terminals 4, whereby at least the third- to fifth-type mobile terminals 4 do not need to directly receive map information, town information or a service from the information center 5 for each mobile terminal 4.

(5) Configuration of the Correspondence Database 55 of Position Identification Information and Position Information.

Next description will be made of a method of configuring the above correspondence database 55 (refer to FIG. 7 or 17).

Figure 42:
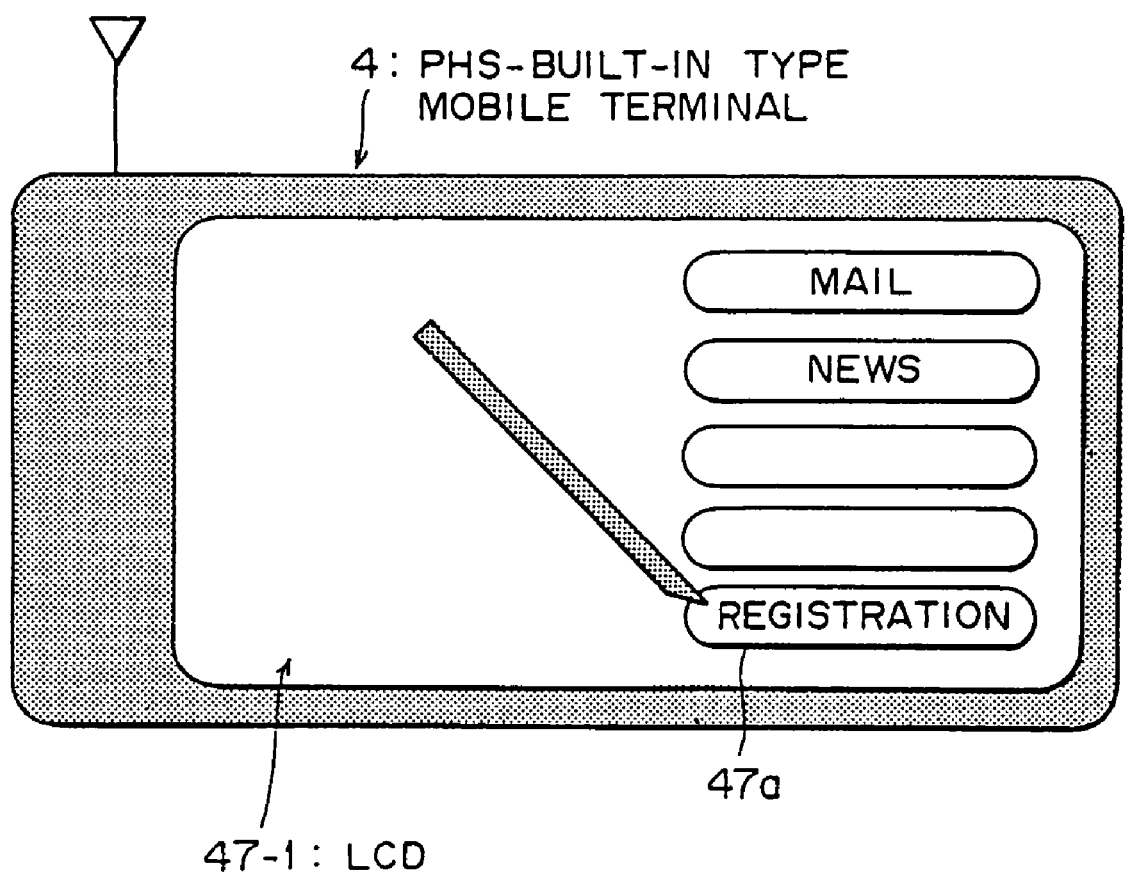
FIG. 42 is a diagram for illustrating a method of configuring a correspondence database in the mobile communicating system according to the first embodiment.

If the user intends to newly register position identification information and position information, the user commences an action relating to the registration from the mobile terminal 4. This is done by, for example, clicking an icon 47a, if the icon 47a of "registration" is displayed on the liquid crystal display (LCD) 47-1 of the mobile terminal 4 as shown in FIG. 42, for example.

Figure 43:
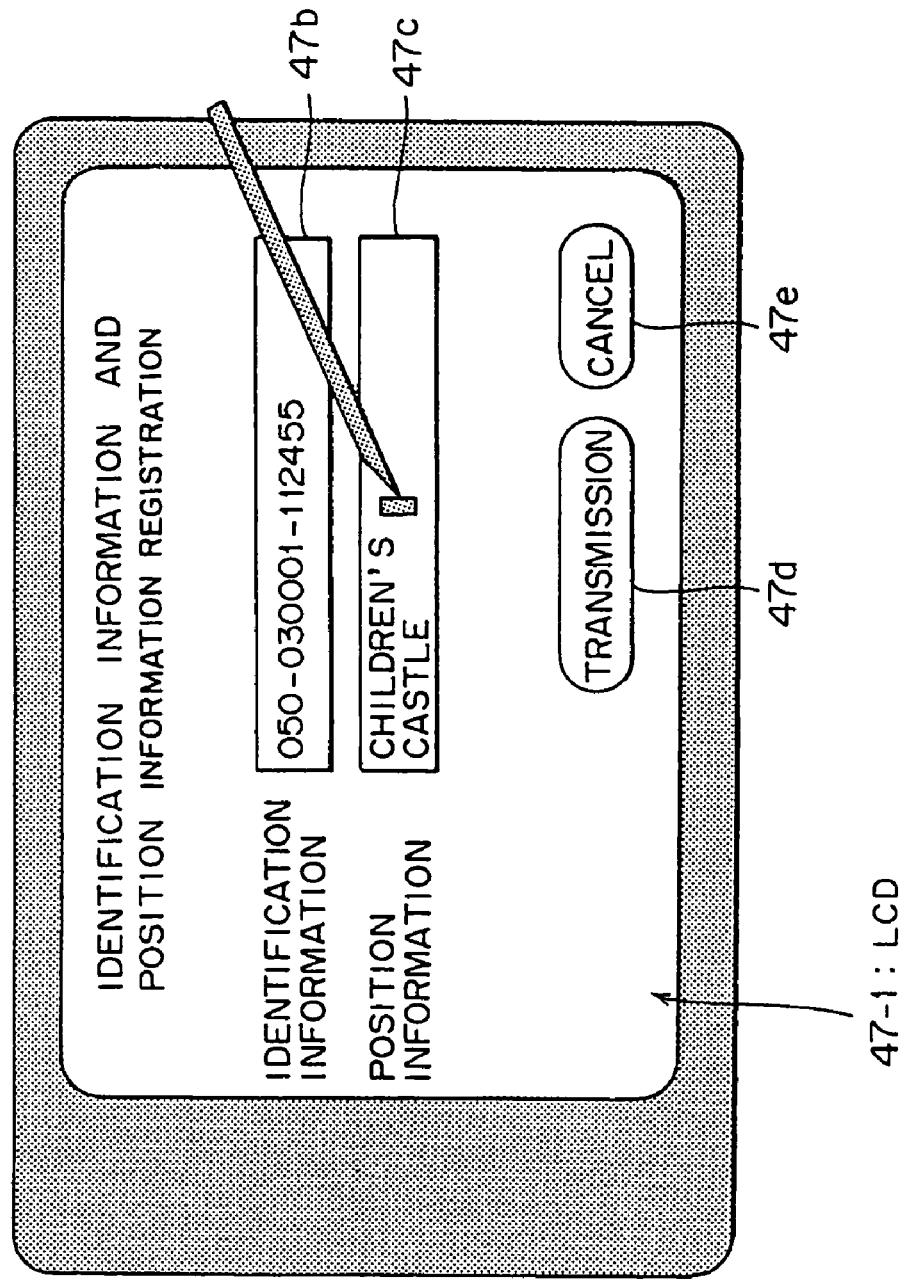
FIG. 43 is a diagram for illustrating the method of configuring the correspondence database in the mobile communicating system according to the first embodiment.

Thereupon, windows 47b and 47c for inputting information necessary for the registration are opened on the LCD 47-1 of the mobile terminal 4 as shown in FIG. 43, for example. In the window 47b used to input identification information, position identification information (a CSID) of a parent station (the radio base station 6) to which the mobile terminal 4 is currently connected is displayed in advance, whereas a cursor prompting an input of the position information blinks in the window 47c used to input position information. Incidentally, the CSID is not always necessary to be displayed in the window 47b.

Figure 44:
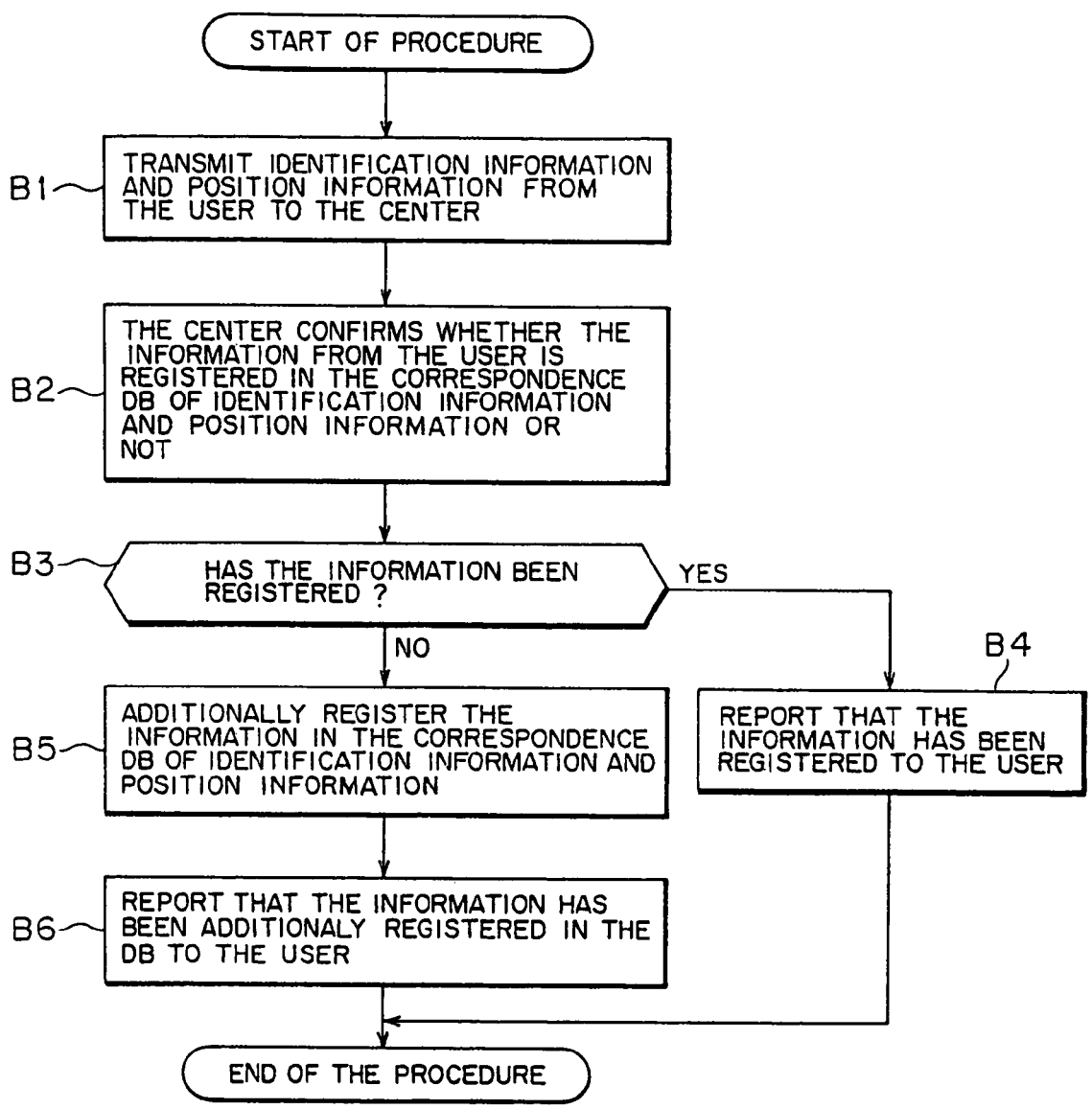
FIG. 44 is a flowchart for illustrating the method of configuring the correspondence database in the mobile communicating system according to the first embodiment.

The user inputs "Shibuya" in the window 47c for position information if the current position is "Shibuya" and clicks a transmission button 47d, thereby transmitting a combination of the identification information and the position information to the information center 5 as shown in FIG. 44 (Step B1). If the user wants to re-input, the user needs only to click a cancellation button 47e.

The information center 5 confirms whether data (the identification information and the position information) transmitted from the mobile terminal 4 is already registered in the correspondence database 55 or not (Steps B2 and B3). If it is already registered, the information center 5 notifies that it is already registered to the user (the mobile terminal 4) and terminates the procedure (from YES route at Step B3 to Step B4).

If the data transmitted from the mobile terminal 4 is not yet registered, the information center 5 corresponds the CSID and the position information received ("Shibuya" here) and additionally registers them in the correspondence database 55 (Step B5), notifies this effect to the user, and terminates the procedure (Step B6).

In the above registering process, a wide area called "Shibuya" is inputted as position information in the window 47c for position information by the user. Therefore, it is natural that the information center 5 can configure the correspondence database 55 with relation to only a broad area.

For this, the information center 5 provides some proposed position information to limit an area of position information to be inputted by the user to some extent. Hereinafter, a registering process in this case will be described with reference to a sequence diagram (Steps C1 through C8) shown in FIG. 45.

In this case, the user inputs "Shibuya" in the window 47c for position information if the current position is "Shibuya":, and transmits a combination of identification information (a CSID) and the position information to the information center 5 by clicking the transmission button 47d, as well (Step C1). The information center 5 confirms whether data (the identification information and position information) transmitted from the mobile terminal 4 is already registered in the correspondence database 55 or not (Steps C2 and C3). If it is already registered, the information center 5 notifies that it is already registered to the user (the mobile terminal 4), and terminates the procedure (from YES route at Step C3 to Step C4).

If the data transmitted from the mobile terminal 4 is not registered, the information center 5 transmits proposed landmarks (for example, "in front of Hachikou", "in front of 109", "in front of Sumitomo Seimei Building" and the like) corresponding to the received position information ("Shibuya", here) to the mobile terminal 4 having transmitted the position information (Step C5). Transmission of the proposed landmarks may be done on "html" base of "Netscape" or "applet" of "Java", for example.

The user selects and inputs a landmark nearest to the current position among the proposed landmarks displayed on the LCD 47-1 of the mobile terminal 4, and transmits it to the information center 5 (Step C6). Whereby, the position information transmitted to the information center 5 is specified in a certain specific range so that the information center 5 may readily configure the database.

Further, the information center 5 corresponds the position information from the user (a landmark selected by the user) to the CSID having been received and registers them in the correspondence database 55 (Step C7), then notifies that the registration is completed to the user so as to complete the procedure (Step C8).

It is alternatively possible in the registering process that the information center 5 provides map information of a periphery of the current position of the user to the mopbile terminal 4 instead of the above proposed landmarks, whereby the user points the current position. A registering process in this case will be next described with reference to a sequence diagram (Steps D1 through D10) shown in FIG. 46.

In this case, the user inputs position information ("Shibuya" or the like) of the current position into the window 47c for position information of the mobile terminal 4, thereby transmitting a combination of identification information (a CSID) and the position information to the information center 5, as well (Step D1). The information center 5 confirms whether data (the identification information and the position information) transmitted from the mobile terminal 4 is already registered in the correspondence database 55 or not (Steps D2 and D3). If it is already registered, the information center 5 notifies that it is already registered to the user (the mobile terminal 4), and terminates the procedure (from YES route at Step D3 to Step D4).

If the data transmitted from the mobile terminal 4 is not yet registered, the information center 5 transmits proposed landmarks corresponding to the received position information to the mobile terminal 4 having transmitted the position information (Step D5). The user selects and inputs a landmark nearest to the current position among the proposed landmarks displayed on the LCD 47-1 of the mobile terminal 4 and transmits it to the information center 5 (Step D6).

Further, the information center 5 retrieves map information of a periphery of the current position of the user in the database 52 by the retrieving unit 53 with the landmark received from the mobile terminal 4 as a key, and transmits obtained map information to the user (Step D7).

The user points the current position on the basis of the map displayed on the LCD 47-1 provided from the information center 5, thereby transmitting the current position to the information center 5 (Step D8). In this case, in order to limit an area on the map that will be pointed by the user to some degree, the received map information is divided into mesh-like areas each given an identifier (J1, J2, K1, or K2) and displayed on the LCD 47-1, as shown in FIG. 47, for example, whereby the user points the current position in a unit of area.

Namely, at the mobile terminal 4, the user can input his/her own current position according to a map displayed on the mobile terminal 4 so that a burden of a process to input position information by the user may be largely reduced.

After that, the information center 5 corresponds position information (coordinates or an area pointed) from the mobile terminal 4 to the CSID having been received and registers them in the correspondence database 55 (Step D9), then notifies that the registration is completed to the user to complete the procedure (Step D10).

In the mobile communicating system of this embodiment, position identification information (a CSID) of the radio base station 6 and position information of the mobile terminal 4 ("Shibuya" or the like) are separately transmitted to the correspondence database 55 of the information center 5 from the mobile terminal 4, whereby it is possible to independently configure the database 55 in which the CSID and the position information of the mobile terminal 4 are corresponded to each other in the information center 5 even if the information center 5 does not grasp beforehand the CSID, as above.

It is therefore possible to configure the correspondence database 55 of identification information of the radio base station 6 (or a fixed terminal such as a public telephone) which is generally grasped by only the communication company and position information not through the communication company, that is, independently of the communication network, which largely contributes to flexibility of the system configuration.

In addition, since the user registers identification information and position information, the more the system is operated or the more the users utilize the system, the more information necessary to configure the correspondence database 55 naturally comes in the information center 5 so that a burden of maintenance and operation works on the operator (the maintenance person) in the information center 5 may be largely reduced.

Whether the correspondence database 55 of identification information and position information has been configured or not can be known when a service is activated. If there is no correspondence data of identification information and position information in the correspondence database 55, it is possible to automatically prompt the user to register the identification information and the position information by sending a message or the like upon activating a service. The above information registration may be done not only by the user but also the operator of the information center 5 in an area of which map information, town information or a service is expected to be provided.

Further, if the mobile terminal 4 is connected to a fixed terminal such as a public telephone [or LAN (a Local Area Network)] to access to the information center 5, the user who will use a service transmits identification information of the fixed terminal such as a telephone number or the like (an IP address automatically obtained upon connecting to the LAN) and position information to the information center 5.

Figure 45:
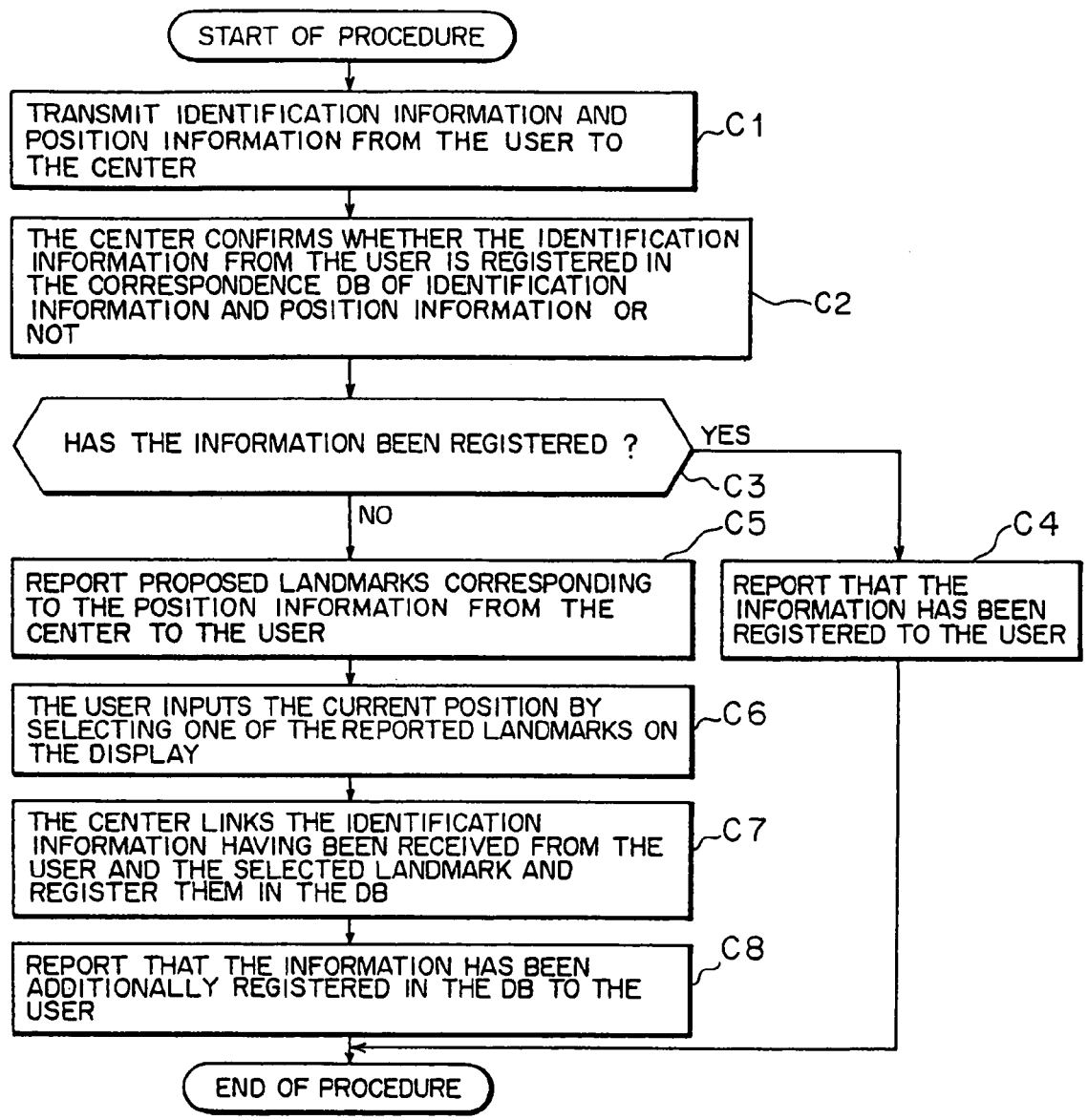
FIG. 45 is a flowchart for illustrating another method of configuring the correspondence database in the mobile communicating system according to the first embodiment.
Figure 46:
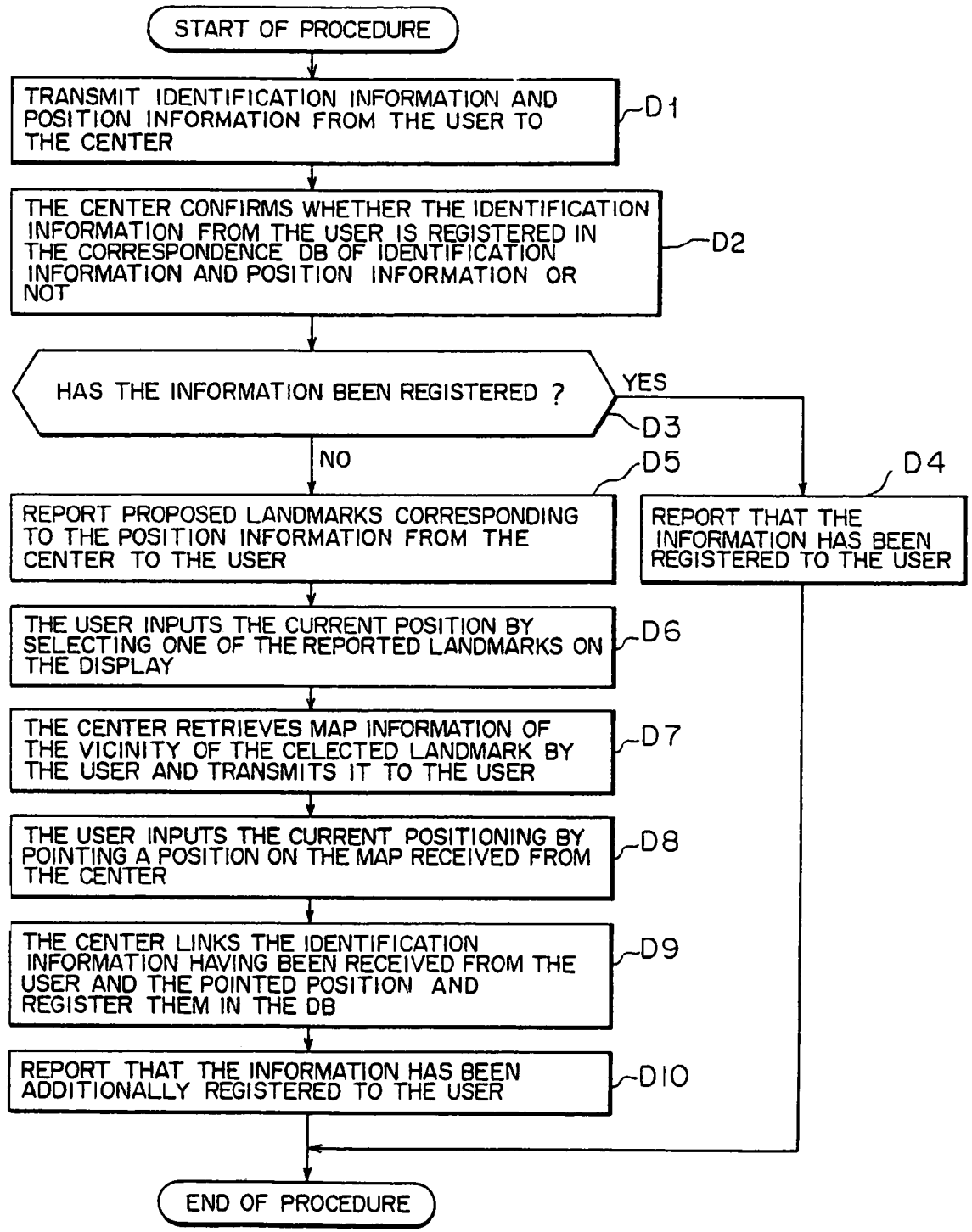
FIG. 46 is a flowchart for illustrating still another method of configuring the correspondence database in the mobile communicating system according to the first embodiment.

A procedure of a registering process in this case is similar to the process described hereinbefore with reference to FIGS. 44 through 46. However, if the mobile terminal 4 is connected to an analog or ISDN fixed telephone or an infrared interface such as IrDA, the mobile terminal 4 cannot automatically obtain (detect) identification information. For this, the user needs to input the identification information such as a telephone number or the like.

If the position information detecting unit 41 of the mobile terminal 4 detects position information of the mobile terminal 4 utilizing a satellite of GPS or the like, the position information is accurately detected. Therefore, it becomes unnecessary to conduct a process such as to send back proposed landmarks or the like to the mobile terminal 4 from the information center 5 as described before with reference to FIG. 45 or 46 so that the registration can be completed according to the process (Steps B1 through B6) described hereinbefore with reference to FIG. 44. In which case, the user can execute a registering work only by conducting a registering and transmitting operation without necessity of a character inputting work or the like since position information can be automatically obtained in the mobile terminal 4.

(6) Method of Utilizing the Correspondence Database 55

Next, a method of utilizing and managing the above correspondence database 55 will be described.

Figure 48:
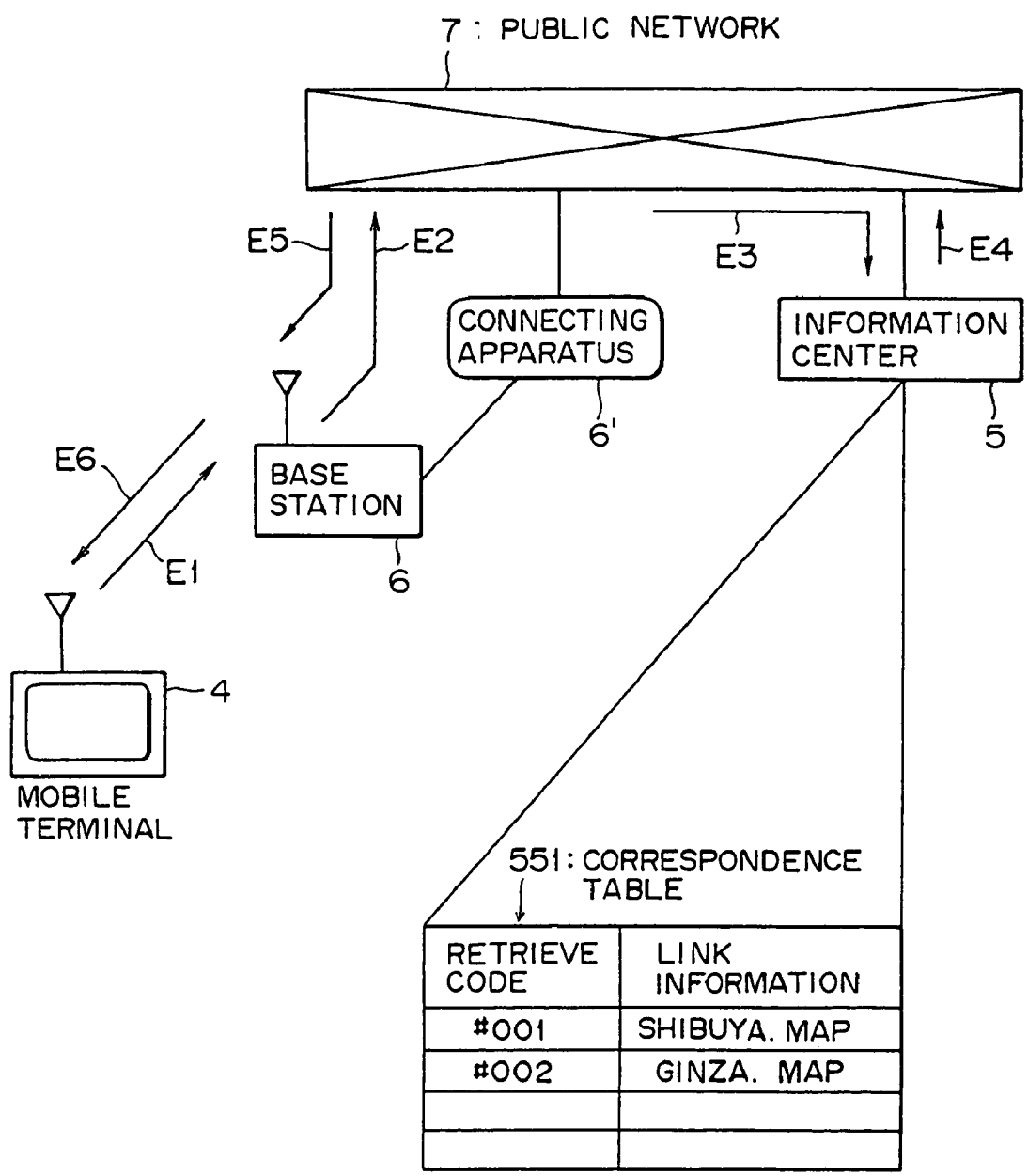
FIG. 48 is a diagram for illustrating a method of utilizing the correspondence database in the mobile communicating system according to the first embodiment.

If the user intends to obtain map information, town information or a service corresponding to the current position, as shown in FIG. 48, the user transmits a retrieval code of map information, town information or a service.(a name showing a position such as "Shibuya" or the like or a systematical code of such name) that the user wants to take out to the information center 5 from the mobile terminal 4 via the radio base station 6 over the public network 7 (Steps E1 through E3).

The information center 5 finds out map information, town information or a service according to a corresponding position on the basis of the received retrieval code from a correspondence table 551 configured as the correspondence database 55, then sends back information linked to the above retrieval code to the mobile terminal 4 (Steps E4 through E6). In FIG. 48, reference numeral 6' denotes a connecting apparatus for connecting the radio base station 6 to the public network 7.

As above, the correspondence table 551 prepared in the information center 5 enables all users of the service to utilize the correspondence database 55.

Figure 49:
FIG. 49 is a diagram showing an example of a group correspondence table used in the mobile communicating system according to the first embodiment.

A correspondence table 552 for each group that a user group can use may be provided in the information center 5 as shown in FIG. 49. In which case, if intending to obtain information according to a position of the mobile terminal 4, the user transmits a retrieval code of information that the user wants to take out ("Shibuya", "Ginza" or the like) to the information center 5 via the radio base station 6 over the public network 7 as described above with reference to FIG. 48, upon which the user adds a group code ($1000, $1001, or the like in FIG. 49) to the retrieval code. The information center 5 can thereby select link information (user1000.map or the like) that only the service users in the group can use on the basis of the received group code, and provide private information of the group to the user.

Namely, the above correspondence database 55 has, similarly to the database 52, two sorts of storage units for specified users such as individual users, user groups and the like, and for all users, which can largely reduce a burden of maintenance and management of information in the correspondence database 55.

Figure 50:
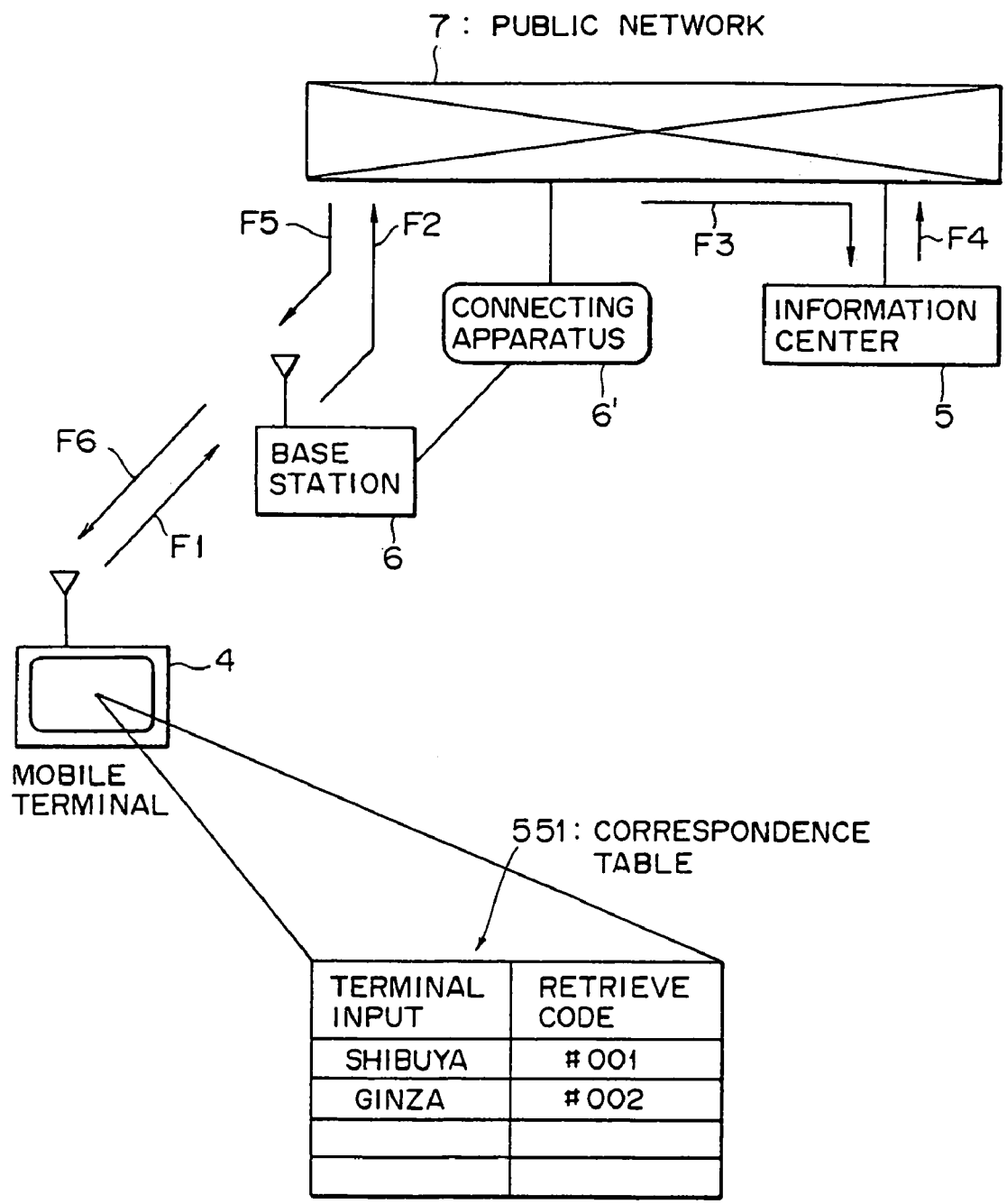
FIG. 50 is a diagram for illustrating another method of utilizing the correspondence database in the mobile communicating system according to the first embodiment.

The above correspondence table 551 may be, for example, provided on the side of the mobile terminal 4 as shown in FIG. 50. In which case, position information ("Shibuya", for example) inputted by the user is automatically converted into a retrieval code (#001, for example) on the basis of the correspondence table 551, and the retrieval code is transmitted to the information center 5 (Steps F1 through F3).

The information center 5 sends back map information, town information or a service corresponding to the received retrieval code (#001, for example) to the mobile terminal 4 (Steps F4 through F6).

As above, providing the correspondence table 551 on the side of the mobile terminal 4 enables the user to individually make the table 551 so as to freely customize it. In the above items (1) through (5), the retrieval code is coincided with the CSID, then the CSID is transmitted to the information center 5.

Figure 51:
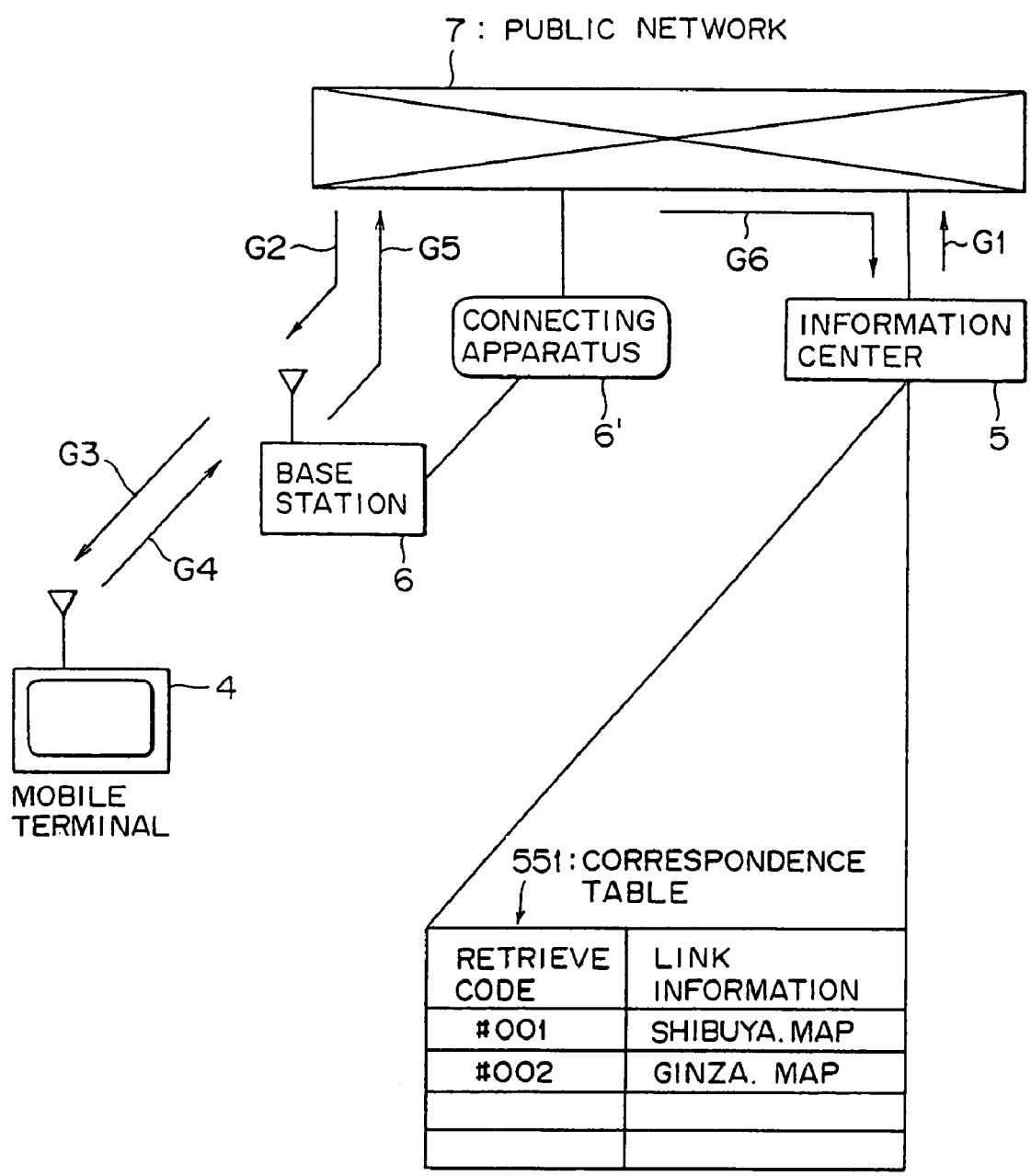
FIG. 51 is a diagram for illustrating still another method of utilizing the correspondence database in the mobile communicating system according to the first embodiment.

The above method is alternatively possible such that, as shown in FIG. 51, for example, the information center 5 first sends an area map (map information) showing an area in which the information center 5 is currently giving a service to the mobile terminal 4 when the mobile terminal 4 accesses to the information center 5 to prompt the service utilizer to conduct a retrieving operation (Steps G1 through G3).

The user points a place whose information the user wants on the map displayed on the mobile terminal 4 so as to transmit a position pointed (screen coordinates) as a retrieval code (#001, #002 or the like) to the information center 5 (Steps G4 through G6). The information center 5 sends back a subdivided area map if existing on the basis of the received retrieval code. If not, the information center 5 sends back information according to the position.

According to the above utilizing method, it is possible to exchange map information, town information or a service without the user and the operator of the information center 5 being conscious of identification information such as a CSID managed by the communication company.

(7) Others

Each of the above mobile terminals 4 is configured with an electronic pocketbook in which PHS (the PHS radio communicating unit 45) is incorporated. It is, however, possible to provide PHS outside the electronic pocketbook. Another radio communicating system such as a portable telephone may be used other than PHS.

In the above mobile communicating system, the information center 5 and each of the mobile terminals 4 are connected via a communicating means through the radio base station 6 as shown in FIG. 7. It is alternatively possible to connect the information center 5 and each of the mobile terminals 4 via a communicating means such as a fixed terminal 6A, for example, a public telephone or the like, as shown in FIG. 52, for example, whereby the same functions and effects may be realized as above embodiment.

In consequence, the user can arbitrarily select a method of connecting the mobile terminal 4 and the information center 5 depending on a situation at that time, which largely contributes to improvement of flexibility of the system operation or a degree of the service.

Figure 52:
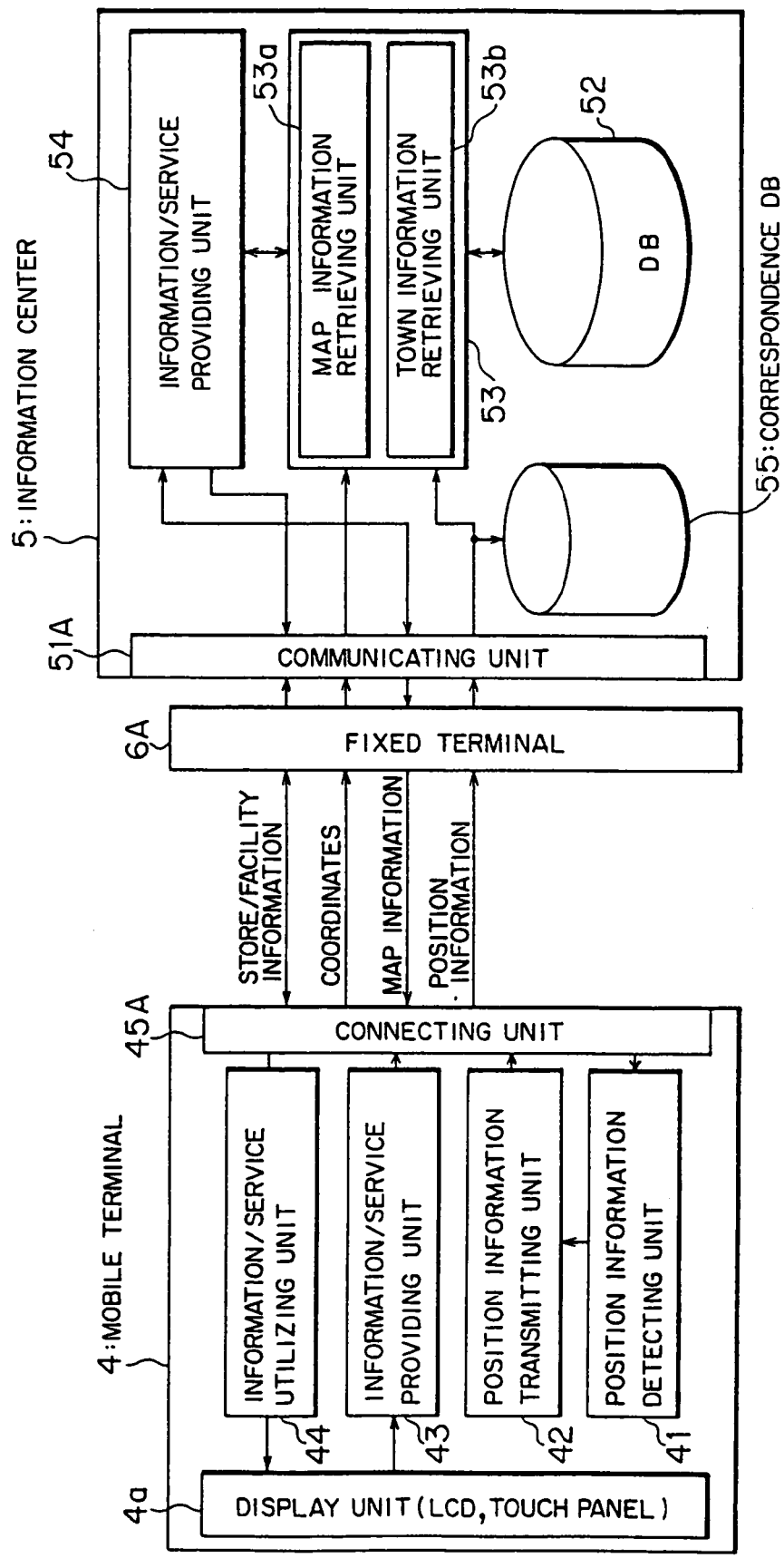
FIG. 52 is a block diagram showing another structure of the mobile communicating system according to the first embodiment.

In which case, the mobile terminal 4 in a structure shown in FIG. 7 has a connecting unit 45A which can be connected to a public telephone or LAN instead of the PHS radio communicating unit 45 as shown in FIG. 52, whereas the information center 5 has a communicating unit 51A which can communicate with a fixed terminal 6A via, for example, a public network/exclusive line of ISND, an analog telephone or the like, LAN, CATV or the like instead of the communicating unit 51.

In the above case, the position information detecting unit 41 of the mobile terminal 4 detects position identification information (a telephone number in the case of a public telephone, an IP address in the case of LAN or the like) of the fixed terminal 6 to which the mobile terminal 4 is connected instead of position identification information (a CSID) of the radio base station 6. Therefore, the information center 5, as well, can certainly provide information or a service relating to a position necessary to the mobile terminal 4.

If the position information detecting unit 41 detects position information of its own utilizing a satellite of GPS or the like as described before with reference to FIG. 7 in this case, it is possible to accurately detect the position information. In addition, it is possible to omit a procedure to input position information by the user, which can largely reduce a burden of an information inputting operation on the user.

As having been described with reference to FIGS. 7 and 17, if a position information converting unit 41' for converting position identification information of the fixed terminal 6A detected by the position information detecting unit 41 into mobile terminal position information is provided in the information center 5 or the mobile terminal 4, the information center 5 can independently provide map information, town information or a service to a corresponding mobile terminal 4 without being conscious of the position identification information of the fixed terminal 6A (irrespective of a type of the fixed terminal). This can largely improve flexibility of the system configuration.

The mobile communicating system according to this embodiment is realized with Internet 8. However, the present invention is not limited to this example, but another network is employable.

(c) Description of a Second Embodiment

Figure 55:
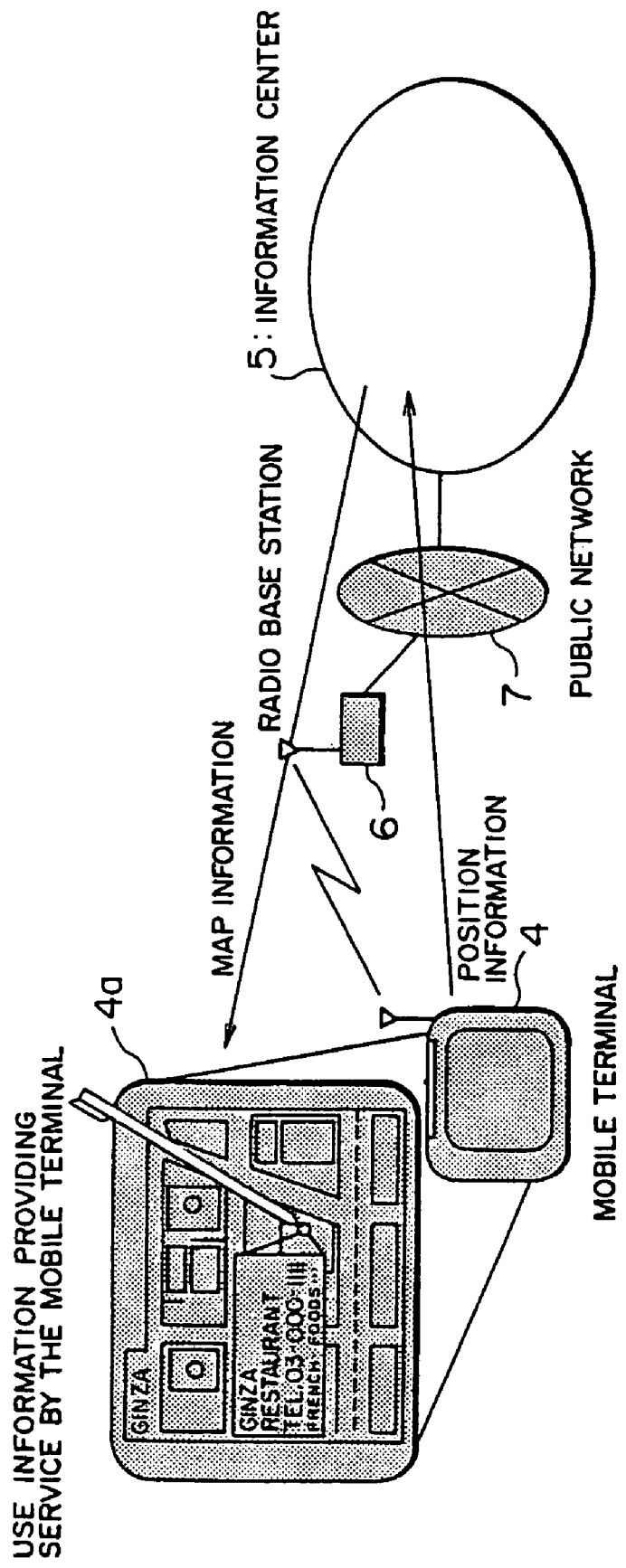
FIG. 55 is a block diagram showing a mobile communicating system according to a second embodiment of this invention.

FIG. 55 is a block diagram showing a mobile communicating system according to a second embodiment of this invention. In FIG. 55, reference numeral 4 denotes a PHS mobile terminal, 5 denotes an information center, 6 denotes a PHS radio base station (CS), and 7 denotes a public network, similarly to the first embodiment. The PHS mobile terminal 4 is a PHS of an electronic pocketbook type, which is a so-called electronic notebook in which a PHS is incorporated. The user conducts an operation to demand/provide information or a service relating to a position of the mobile terminal 4 (information of a map, information of facilities on the map, a service program relating to the map, etc.) through a displaying unit 4a using an exclusive pen or the like, whereby the PHS mobile terminal 4 can exchange desired information or service program with the information center 5 via the radio (PHS) base station 6 over the public network 7.

Figure 56:
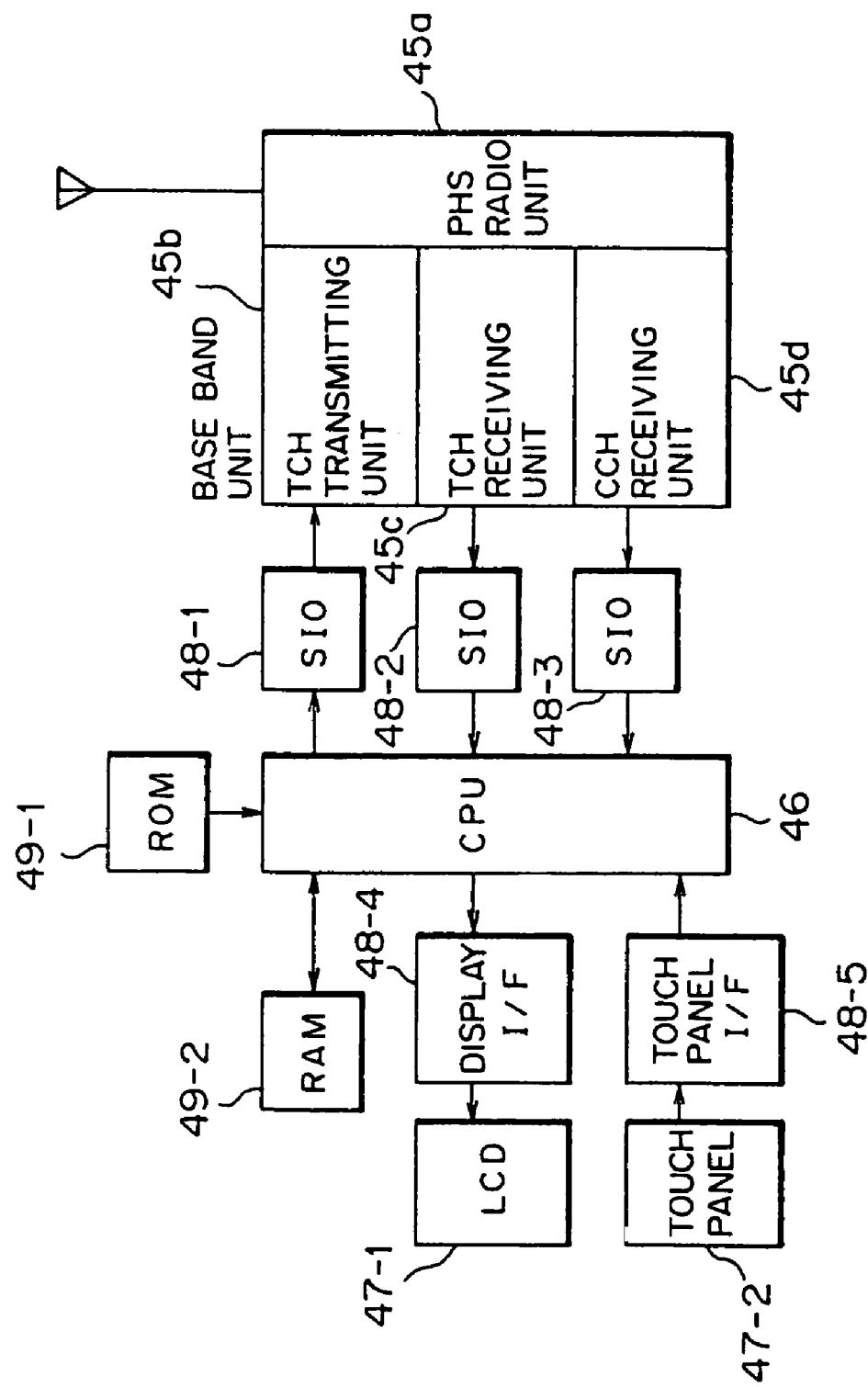
FIG. 56 is a block diagram showing a hardware structure of a mobile terminal according the second embodiment.

The mobile terminal 4 is assumed to have a hardware structure as shown in FIG. 56, for example, similarly to that described before in the first embodiment (details of each part shown in FIG. 56 are omitted since they have been described hereinbefore with reference to FIG. 10).

Figure 57:
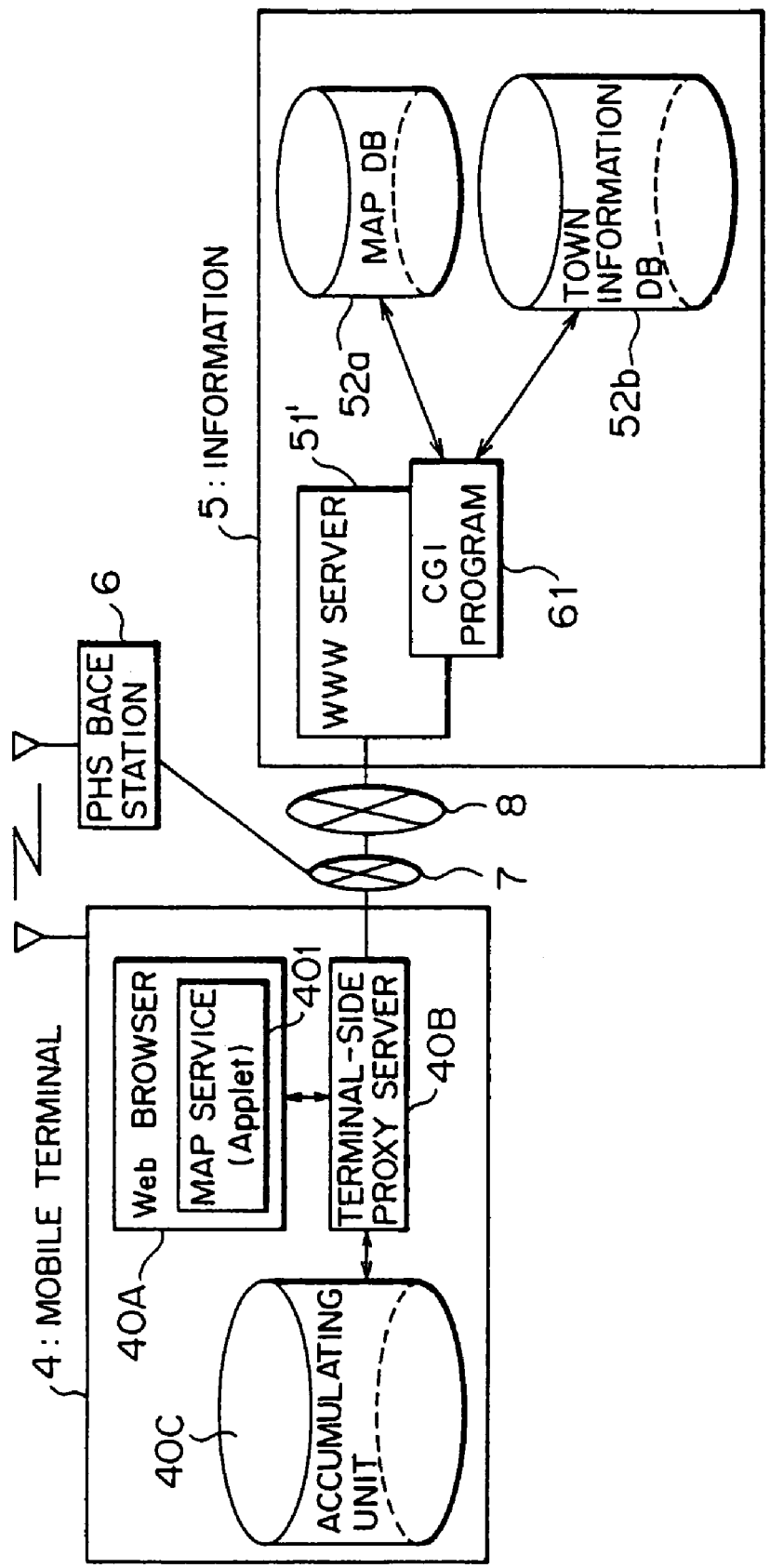
FIG. 57 is a block diagram schematically showing a structure of the mobile communicating system according to the second embodiment if the mobile communicating system is realised using Internet.

FIG. 57 is a block diagram schematically showing a structure in the case where the above-mentioned system in FIG. 57 is realized using Internet. As shown in FIG. 57, the mobile terminal 4 has a Web (World Wide Web) browser 40A, a terminal-side proxy 40B, a terminal-side accumulating unit 40C. According to this embodiment, the mobile terminal 4 is connected to Internet 8 using, for example, PPP via a commercial provider or a dial-up router (connected to the public network 7) installed in a company, a college or the like.

On the other hand, the information center 5 can be connected to Internet 8 using a WWW server 51', which has a CGI program 61, a map information database 52a and a town information database 52b, etc.

In the information center 5, the databases 52a and 52b (a center-side accumulating-unit) accumulate information of a map as information (or a service program) relating to information of a position according to a movement of the mobile terminal 4, and town information such as facility information on the map, respectively. The CGI program (a retrieving unit) 61 retrieves map information and town information accumulated in the databases 52a and 52b on the basis of a demand sent from the mobile terminal 4. The WWW server 51' functions as an information/service transmitting unit for taking out map information or town information (or a service program) retrieved by th CGI program 61 from a corresponding database 52a or 52b and transmitting it to the mobile terminal 4.

In the mobile terminal 4, the Web browser 40A makes various map services, which will be described later, usable by a map service program 401 according to this embodiment. The Web browser 40A utilizes, for example, "Netscape" or "Internet Explore" in which Java language is operable. Incidentally, the above map service program 401 is described as Applet of Java language, which can be received from the information center 5 or a predetermined storage medium such as a memory card.

The terminal-side accumulating unit 40C accumulates map information and town information (or a service program) sent from the information center 5. The terminal-side proxy 40B is a proxy server, which is generally provided on the side of the information center 5, mounted in the mobile terminal 4. The terminal-side proxy 40B temporarily accumulates data (map information and the like) delivered from the information center 5 in the terminal-side accumulating unit 40C, takes out (caches) the data from the terminal-side accumulating unit 40C when the user demands for the same data, and delivers the data to the Web browser 40A (the map service program 401). This function of the terminal-side proxy 40B can reduce the number of accesses to the information center 5.

Meanwhile, the above terminal-side accumulating unit 40C corresponds to the RAM 49-2 shown in FIG. 56. Functions of the Web browser 40A and the terminal-side proxy 40B are realized by a CPU 46 shown in FIG. 56. There is sometimes a case where the terminal-side accumulating unit 40C is included in the terminal-side proxy 40B. In the following description, the terminal-side accumulating unit 40C is assumed to be included in the terminal-side proxy 40B.

Figure 58:
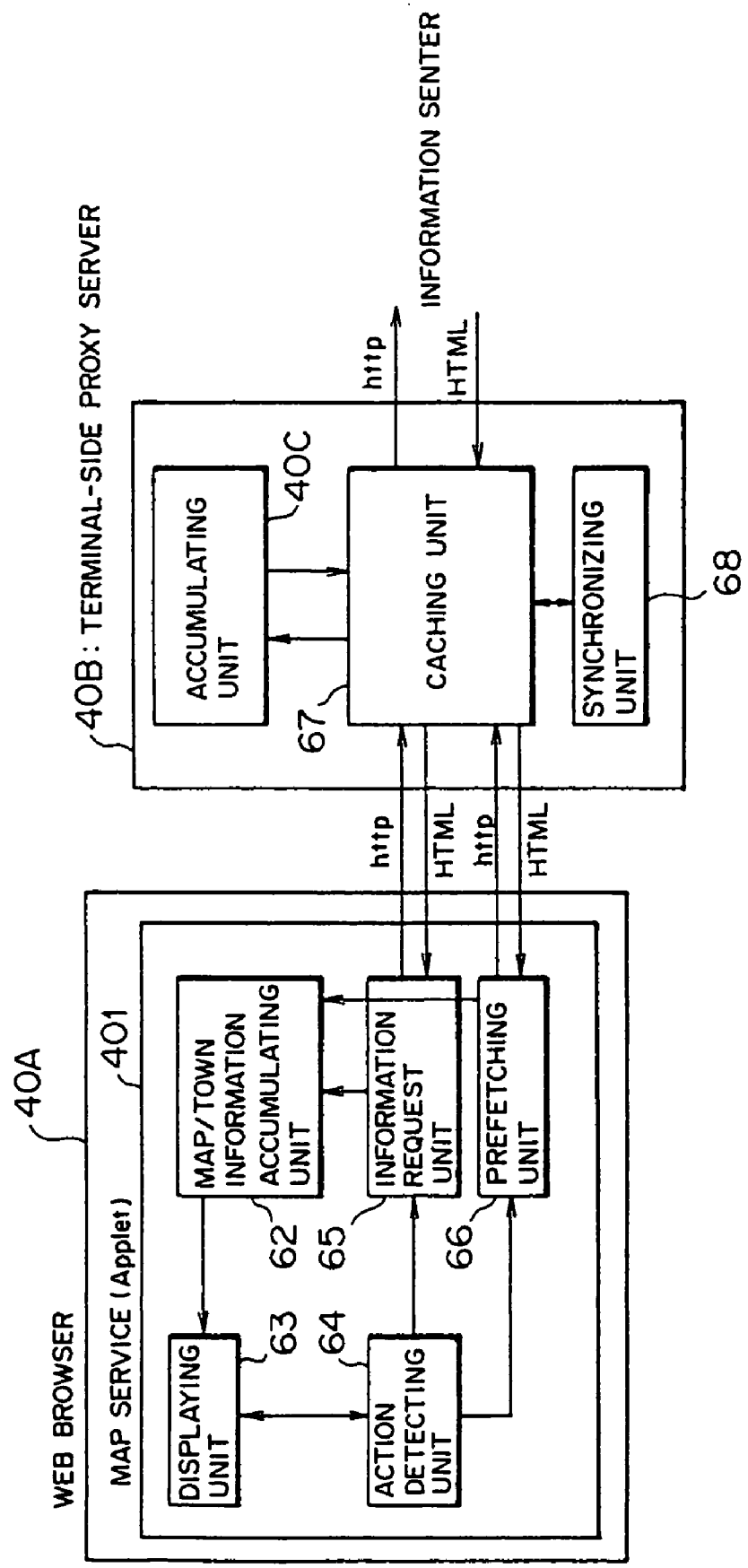
FIG. 58 is a block diagram schematically showing a software structure of the mobile terminal according to the second embodiment.

To realize the above functions, the map service program 401 of the above Web browser 40A has a map/town information accumulating unit 62, a display unit 63, an action detecting unit 64 an information requesting unit 65 and a prefetching unit 66 as schematically shown in FIG. 58, for example, whereas the terminal-side proxy 40B has a caching unit 67 and a synchronizing unit 68, as schematically shown in FIG. 58, as well.

The above map/town information accumulating unit 62 temporarily accumulates map information or town information sent from the information center 5 or the terminal-side accumulating unit 40C through the caching unit 67 of the terminal-side proxy 40B so as to function as a buffer for the display unit 63. The display unit (an information/service utilizing unit) 63 displays the map information or the town information accumulated in the map/town information accumulating unit 62 on a display or the like of the mobile terminal 4, thereby enabling utilization of the map information or the town information.

The action detecting unit 64 detects an action of the user. According to this embodiment, the action detecting unit 64 can detect a pointing operation, a scrolling (drugging) operation on map data displayed on the display unit (display region/display screen) 63 of the mobile terminal 4 as an action (provided information/service changing operation) by the user, as will be described later.

The information requesting unit 65 operates cooperatively with the caching unit 68 on the basis of a result of action detection (an action of the user) by the action detecting unit 64, thereby requesting (demanding) map information, town information or a service program from the information center 5 using http (hyper text transfer protocol) or the like and accumulating the map information, the town information or the service program (occasionally referred as position relating information) sent from the information center 5 in response to the demand in the terminal-side accumulating unit 40C. For instance, when the user points a certain shop or facility on map data being displayed, detailed information (town information) relating to the shop or the facility is accumulated in the terminal-side accumulating unit 40C.

The prefetching unit 66 operates cooperatively with the caching unit 68 on the basis of a result of action detection by the action detecting unit 64, thereby demanding position relating information which is expected to be necessary from the information center 5 using http or the like and accumulating the position relating information sent from the information center 5 in response to the demand in the terminal-side accumulating unit 40C. For instance, map data of a periphery of map data being currently displayed is automatically accumulated in the terminal-side accumulating unit 40C, according to this embodiment.

The caching unit 67 retrieves the accumulating unit 40C when the mobile terminal 4 demands the above position relating information from the information center 5, takes out the position relating information from the terminal-side accumulating unit 40C without transmitting a demand to the information center 5, if the position relating information has been already accumulated in the accumulating unit 40C, and supplies the position relating information to the display unit 63 via the information demanding unit 65 (or the prefetching unit 66) and the map/town information accumulating unit 62.

The synchronizing unit 68 synchronizes position relating information accumulated in the terminal-side accumulating unit 40C with position relating information accumulated in the databases 52a and 52b in the information center 5.

Hereinafter, detailed description will be made of the action detecting unit 64, the prefetching unit 66, the caching unit 67 and the synchronizing unit 68, which are essential parts of this embodiment, in each item.

(1) Detailed Description of the Action Detecting Unit 64

Figure 59:
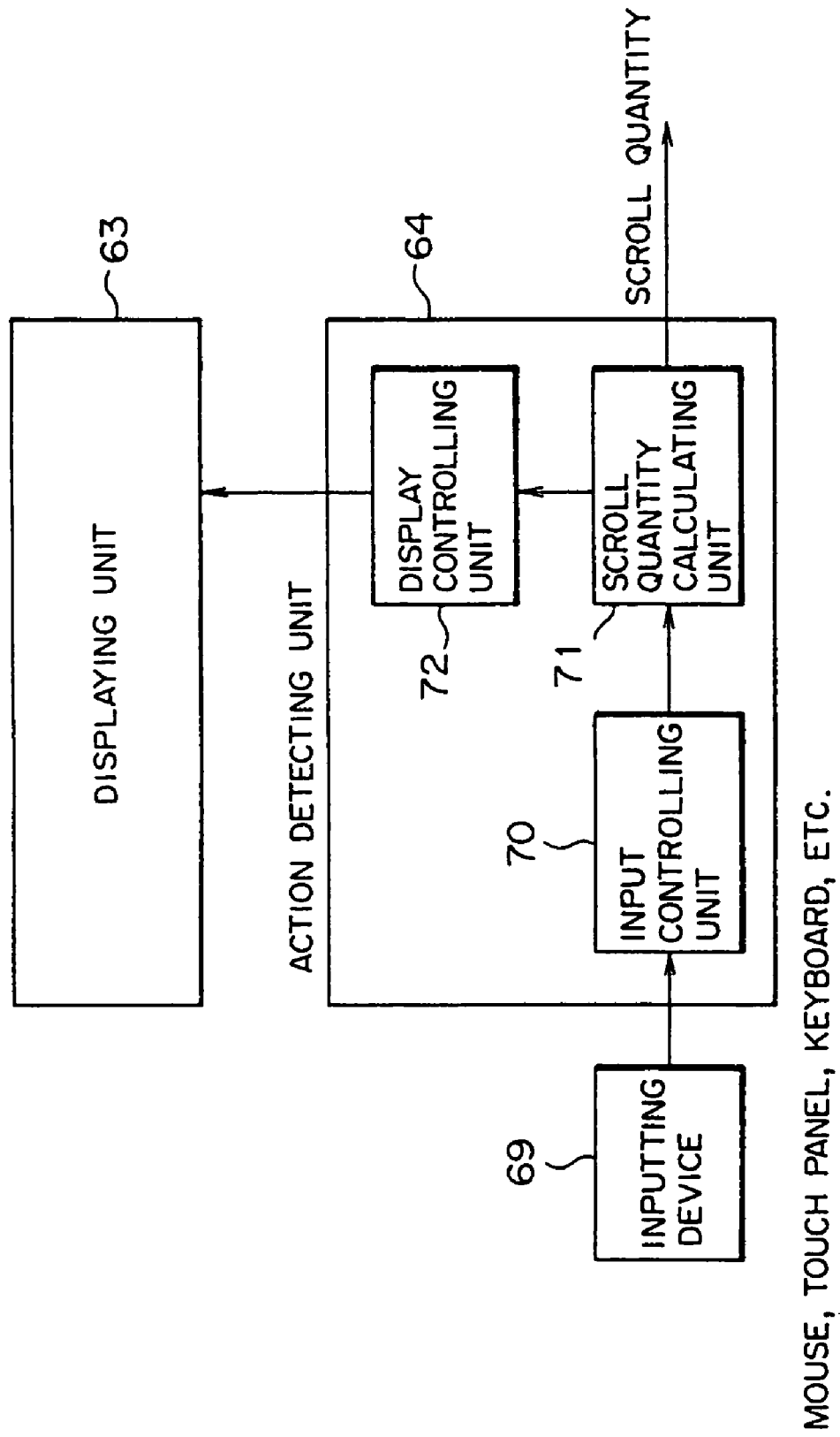
FIG. 59 is a block diagram showing a structure of an essential part of an action detecting unit of the mobile terminal according to the second embodiment.

FIG. 59 is a block diagram showing a structure of an essential part of the above action detecting unit 64. As shown in FIG. 59, the action detecting unit 64 according to this embodiment has an input controlling unit 70, a scroll quantity calculating unit 71 and a display controlling unit 72.

The input controlling unit 70 detects operation information (scrolling operation information, for example) of the user inputted using an inputting device 69 such as the touch panel 47-2 (refer to FIG. 56) or the like (a mouse or a keyboard is also usable). The scroll quantity calculating unit 71 calculates a scroll quantity showing which direction and how much a scrolling operation has been done with respect to the display region 63 of the mobile terminal 4 (for example, a difference between screen coordinates obtained when the scrolling is started and screen coordinates obtained when the scrolling is finished) on the basis of the scrolling operation information detected by the input controlling unit 70. The obtained scroll quantity is supplied to the prefetching unit 66.

The display controlling unit 72 controls the display region 63 on the basis of a result of calculation (a scroll quantity) by the scroll quantity calculating unit 71 and converts map data being currently displayed to another map data, thereby scrolling the map data being currently displayed by a quantity of a scrolling operation by the user. This function enables the user to freely change a display region of a map being currently displayed by dragging on the display screen 63 using a mouse, a pen or the like.

Namely, the action detecting unit 64 detects a scrolling operation on the display screen 63 of the mobile terminal 4 as a provided information/service changing operation by the user. Therefore, the user can easily receive necessary map data (position relating information) while referring to the display screen 63 without conducting any special operation, for example, inputting a place name such as "Shibuya" or "Ginza" in order to demand position relation information, and irrespectively of the current position of the user.

The action detecting unit 64 may detect movement information of the mobile terminal 4 as the above provided information/service changing operation using an CSID of the PHS base station 6 or GPS as described in the first embodiment. In which case, necessary map data is automatically accumulated in the terminal-side accumulating unit 40C with the movement of the user so that map data of the current position of the user can be automatically and successively displayed on the display screen 63. The user, therefore, do not need to access to the information center 5 in order to obtain missing map data each time the current position changes.

(2) Detailed Description of the Prefetching Unit 66

Figure 60:
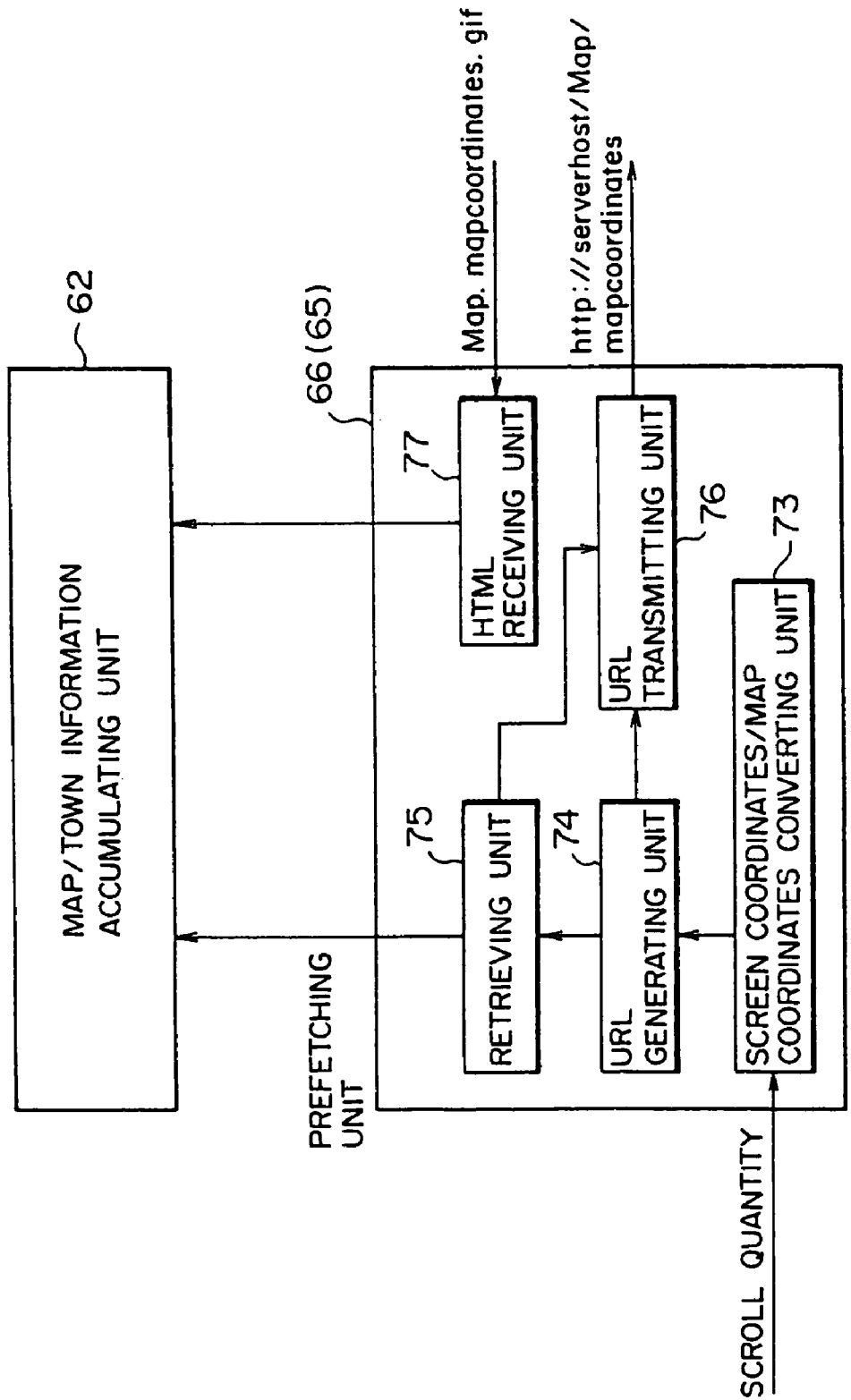
FIG. 60 is a block diagram showing a structure of an essential part of a prefetching unit of the mobile terminal according to the second embodiment.

FIG. 60 is a block diagram showing a structure of an essential part of the above prefetching unit 66. As shown in FIG. 60, the prefetching unit 66 according to this embodiment has a screen coordinates/map coordinates converting unit 73, a URL (Uniform Resource Locator) generating unit 74, a retrieving unit 75, a URL transmitting unit 76 and an HTML receiving unit 77.

The screen coordinates/map coordinates converting unit 73 converts a scroll quantity (screen coordinates) supplied form the above scroll quantity calculating unit 71 into map coordinates (a latitude and a longitude, for example). The URL generating unit 74 generates URL (http://serverhost/Map/mapcoordinates, for example) used to demand map data including map coordinates obtained by the screen coordinates/map coordinates converting unit 73.

According to this embodiment, the above map data is managed by data quantity (a file) of the display screen (display region) 63 of the mobile terminal 4. The URL generating unit 74 therefore demands map data of a file as a unit (a grid unit which will be described later). Namely, the URL generating unit 47 demands a part of map data (position relating information) depending on a size of the display region 63 of the mobile terminal 4 so as to decrease a quantity of a unit of data transferred from the information center 5, thereby avoiding the necessary map data to be transferred at a time from the information center 5. It is thereby possible to quickly display a map at the beginning and decrease a time of communication with the information center 5.

The URL generating unit 47 also has a function to change an order of generating URL according to a direction of the scrolling operation (a result of action detection by the action detecting unit 64), thereby changing an order of demanding (a prefetching procedure) map data which is expected to be necessary (that is, map data that will be displayed on the display screen 63 by the scrolling operation), as will be described later.

The retrieving unit 75 retrieves the map/town information accumulating unit 62 on the basis of URL generated by the URL generating unit 74 to judge whether the above map data has been accumulated in the map/town information accumulating unit 62 or not. If the above map data has been accumulated in the map/town information accumulating unit 62, the retrieving unit 75 gives a URL transmission inhibit instruction to the URL transmitting unit 76. If the above map information is not accumulated in the map/town information accumulating unit 62, the retrieving unit 75 gives a URL transmit instruction to the URL transmitting unit 76.

The URL transmitting unit 76 transmits the URL generated by the URL generating unit 74 to the caching unit 67 in response to the instruction given by the retrieving unit 75. The HTML receiving unit 77 receives map data (Mapmap-coordinates.gif, for example) or an HTML (Hyper Text Make up Language) document or the like sent back as a response to the URL transmitted from the URL transmitting unit 76, and accumulates it in the map/town information accumulating unit 62.

The prefetching unit 66 retrieves the map/town information accumulating unit 62 by the retrieving unit 75 on the basis of a result of action detection (a scroll quantity) by the action detecting unit 64, and utilizes map data in the map/town information accumulating unit 62 without accessing to the information center 5 (without transmitting URL) if the map data which is predicted to be necessary to the user has been accumulated in the map/town information accumulating unit 62. If the above map data is not accumulated in the map/town information accumulating unit 62, the prefetching unit 66 makes the URL transmitting unit 76 transmit URL to the caching unit 66, and receives map data which is expected to be necessary by the caching unit 66, and accumulates it in the map/town information accumulating unit 62.

At this time, the URL generating unit 74 changes an order of generating URL according to a direction of the scrolling operation to change the above prefetching procedure. Whereby, it is possible to obtain data which is promptly necessary (for example, map data of a part that should be immediately displayed on the display screen 63 by the scrolling operation) prior to another data which is expected to be necessary. As a result, the user can receive necessary map data with little delay.

Incidentally, the information demanding unit 65 operates similarly to the prefetching unit 66 excepting that the above screen coordinates/map coordinates converting unit 73 converts coordinates on the basis of a position on the display screen 63 pointed by the user.

(3) Detailed Description of the Caching Unit 67 and the Synchronizing Unit 68

Figure 61:
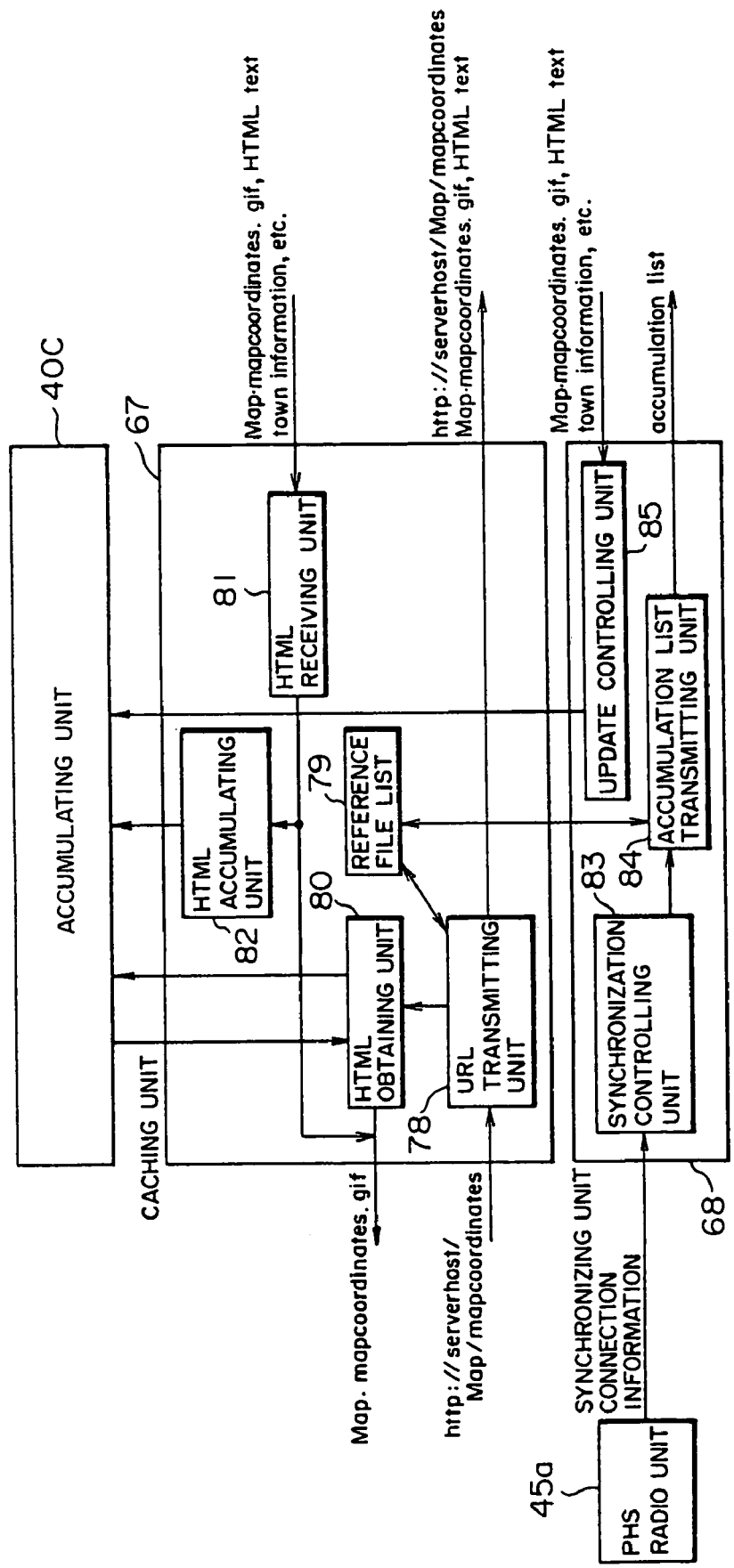
FIG. 61 is a block diagram showing structures of essential parts of a caching unit and a synchronizing unit of the mobile terminal according to the second embodiment of the second invention.

FIG. 61 is a block diagram showing structures of essential parts of the above caching unit 67 and the synchronizing unit 68. As shown in FIG. 61, the caching unit 67 according to this embodiment has a URL transmitting unit 78, a reference file list 79, an HTML obtaining unit 80, an HTML receiving unit 81 and an HTML accumulating unit 82. The synchronizing unit 68 has a synchronization controlling unit 83, an accumulation list transmitting unit 84 and an update controlling unit 85.

In the caching unit 67, the URL transmitting unit 78 retrieves the terminal-side accumulating unit 40 on the basis of URL (http://serverhost/Map/mapcoordinates) sent from the Web browser 40A [the URL transmitting unit 76 of the prefetching unit 66 (the information demanding unit 65)], takes out map data from the terminal-side accumulating unit 40C without making a demand to the information center 5, if corresponding map data has been already accumulated in the map terminal-side accumulating unit 40C, and supplies it to the display screen 63.

Here, URL fed from the Web browser 40A is corresponded to a map data file name (file N.html, where N is a natural number) described in an HTML document to form the reference file list 79, as shown in FIG. 62. The URL transmitting unit 78 checks the reference file 79 on the basis of a received URL to judge whether a corresponding file exists or not. If the corresponding file exists, the URL transmitting unit 78 gives an instruction to the HTML obtaining unit 80 to take out the file (map data) from the terminal-side accumulating unit 40C.

If the corresponding file does not exist in the reference file list 79, the received URL used to obtain the file (map data) from the information center 5 is transmitted (transferred) as it is from the URL transmitting unit 78 to the information center 5.

The HTML obtaining unit 80 takes out a necessary file (map data) from the terminal-side accumulating unit 40C according to an instruction given by the above URL transmitting unit 78, and delivers the map data (Mapmapcoordinates.gif) to the Web browser 40A [the HTML receiving unit 81 of the prefetching unit 66 (the information demanding unit 65)]. The HTML receiving unit 81 receives map data (Mapmapcoordinates.gif) (or a HTML document, or town information) sent from the information center 5. The HTML accumulating unit 82 accumulates the map data received by the HTML receiving unit 81 in the terminal-side accumulating unit 40C.

Namely, the caching unit 67 demands map data from the information center 5 only when the necessary map data is not accumulated in the terminal-side accumulating unit 40C. Therefore, the mobile terminal 4 accesses to the information center 5 only when necessary. As a result, it is possible to hold necessary map data (which is expected to be necessary) while suppressing a time of communication and a quantity of communication with the information center 5 to a minimum at any time.

In the synchronizing unit 68, the synchronization controlling unit 83 activates the accumulation list transmitting unit 84 when a communication between the mobile terminal 4 and the information center 5 is established and the mobile terminal 4 receives connection information through the PHS radio unit 45a (refer to FIG. 56) in order to transmit a list of map data accumulated in the terminal-side accumulating unit 40C to the information center 5. The accumulation list transmitting unit (an information/service list sending unit) 84 refers to the above reference file list 79 when being activated by the synchronization controlling unit 83, and transmits a URL part thereof as an accumulation list to the information center 5, thereby sending a list of the map data (position relating information) accumulated in the terminal-side accumulating unit 40C to the information center 5.

The update controlling unit 85 receives map data (here, only map data missing from the accumulation list is sent through a retrieving process conducted on the side of the information center 5) sent from the information center 5 as a response to the accumulation list so as to update the map data in the terminal-side accumulating unit 40C with the received map data.

The mobile terminal 4 can thereby automatically supply missing map data (position relating information) whenever accessing to the information center 5 so as to hold the same position relating information as the information center 5. It is therefore possible to flexibly react to update of position relating information on the side of the information center 5, for example.

Figure 69:
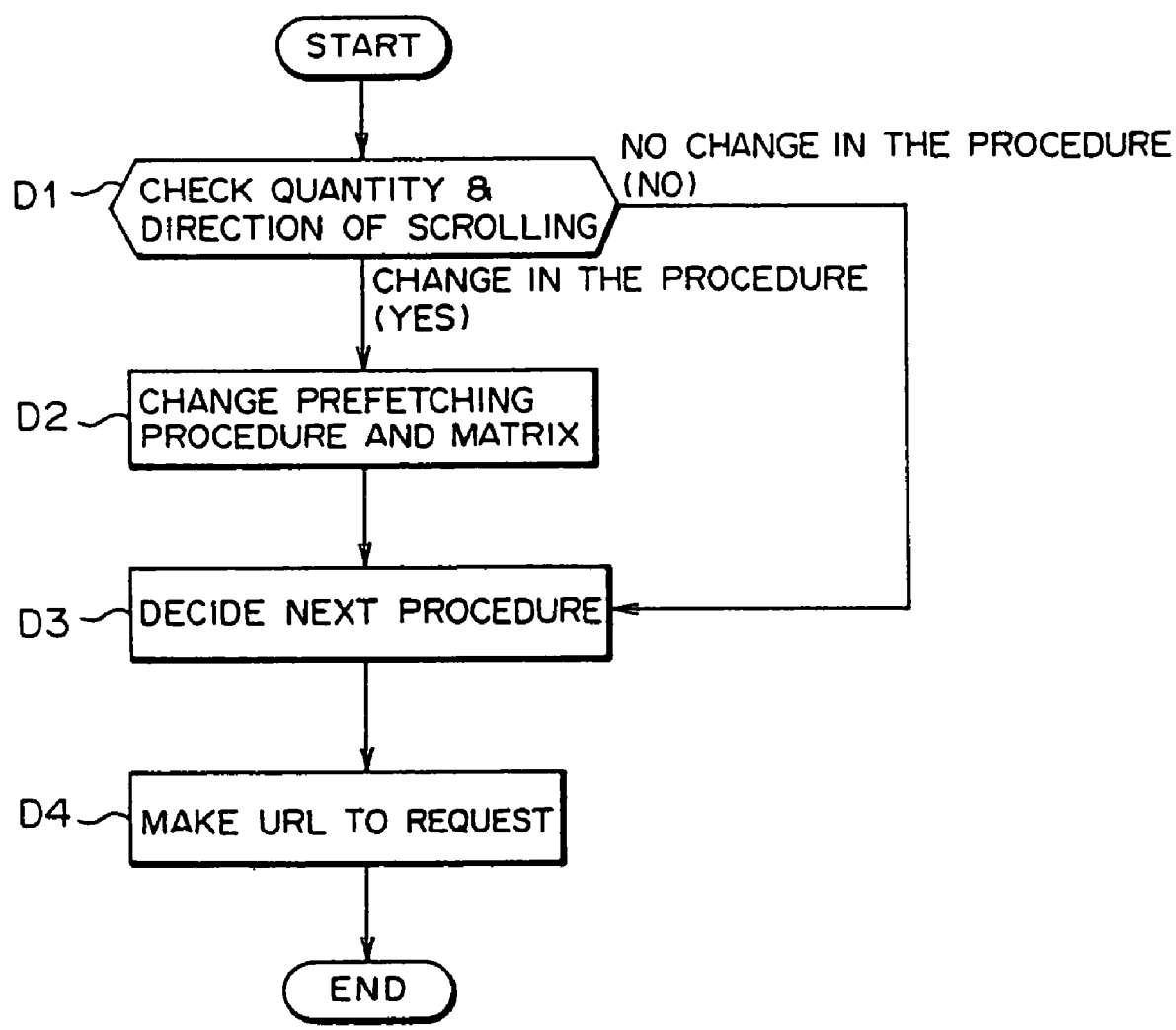
FIG. 69 is a flowchart for illustrating the prefetching procedure changing operation according to the second embodiment.

Hereinafter, an operation of the mobile communicating system according to this embodiment with the above structure will be described with reference to a sequence diagram (Steps A1 through A33) shown in FIG. 63, a flowchart (Steps B1 through B8) shown in FIG. 65, a flowchart (Steps C1 through C6) shown in FIG. 66 and a flowchart (Steps D1 through D4) shown in FIG. 69. Here, it is assumed that a map service program 401 (the map/town information accumulating unit 62, the display unit 63, the action detecting unit 64, the information demanding unit 75 and the prefetching unit 66) for the Web browser 40A is provided from the information center 5.

When the user operates (clicks an icon, for example) the mobile terminal 4 in order to utilize map service, the Web browser 40A generates URL (http://server/MapApplet) to demand the map service program 401 (Step A1 in FIG. 63), and sends the URL to the terminal-side proxy 40B (Step A2 in FIG. 63) in the mobile terminal 4.

Figure 63:
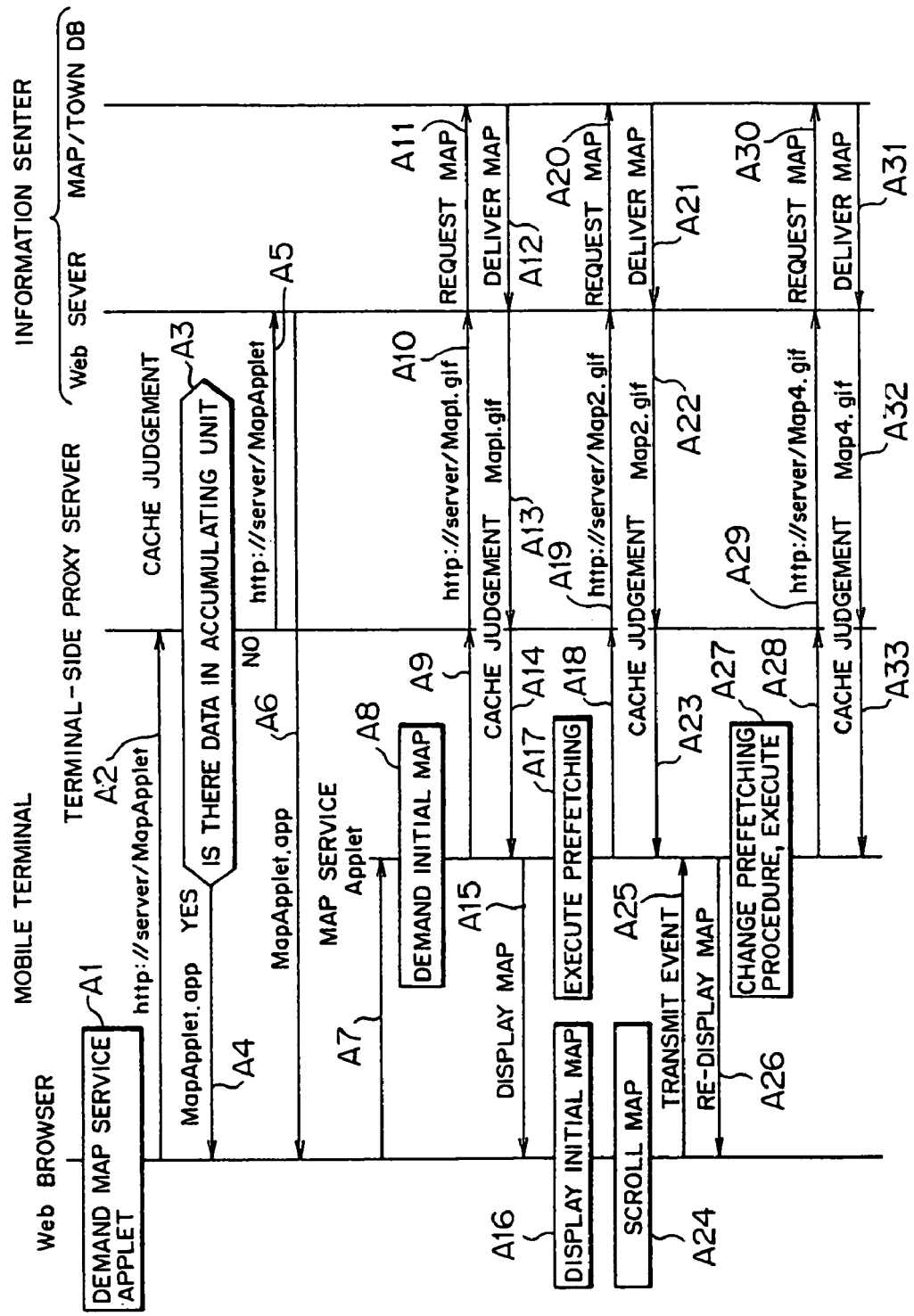
FIG. 63 is a sequence diagram for illustrating an operation of the mobile communicating system according to the second embodiment.

In the terminal-side proxy 40B receiving the URL, the URL transmitting unit 78 (refer to FIG. 61) in the caching unit 67 refers to the reference file list 79 on the basis of the received URL to check whether a corresponding file [a program (a program file) 401] has been accumulated in the terminal-side accumulating unit 40C or not (Step A3 in FIG. 63).

If it is found, as a result, that the program file 401 has been accumulated in the terminal-side accumulating unit 40C (if the judgement at Step A3 results in YES), the URL transmitting unit 78 gives a take instruction to the HTML obtaining unit 80 to take out the program file 401 (MapApplet.app) by the HTML obtaining unit 80, and delivers it to the Web browser 40A (Step A4 in FIG. 63).

If it is found that the program file 401 is not accumulated in the terminal-side accumulating unit 40C (if the judgement at Step A3 results in NO), the URL transmitting unit 78 transmits the received URL (http://server/MapApplet) as it is to the Web (WWW) server 51' of the information center 5 (Step A5 in FIG. 63). The information center 5 (the Web server 51') obtains the program file 401 on the basis of the received URL, and delivers the program file 401 to the mobile terminal 4 (the Web browser 40A) (step A6 in FIG. 63).

The mobile terminal 4 stores the received program file 401 in, for example, the RAM 49-2 (refer to FIG. 56) so as to be in a state where the user can utilize the map service.

When the user conducts a map service utilization starting operation on the mobile terminal 4 (Step A7 in FIG. 63), the CUP 46 operates according to the service program 401 to demand map data that should be initially displayed (Step A8 in FIG. 63). The map data that should be initially displayed may be either what is obtained by inputting a place name by the user or what is obtained according to the current position using a CSID of the base station 6 or GPS as described before in the first embodiment. In either case, the service program 401 generates URL (http://server/Map1.gif) used to demand necessary map data (including town information/service) by the URL transmitting unit 73 of the information demanding unit 65, and transmits the URL to the terminal-side proxy 40B (Step A9 in FIG. 63).

Figure 65:
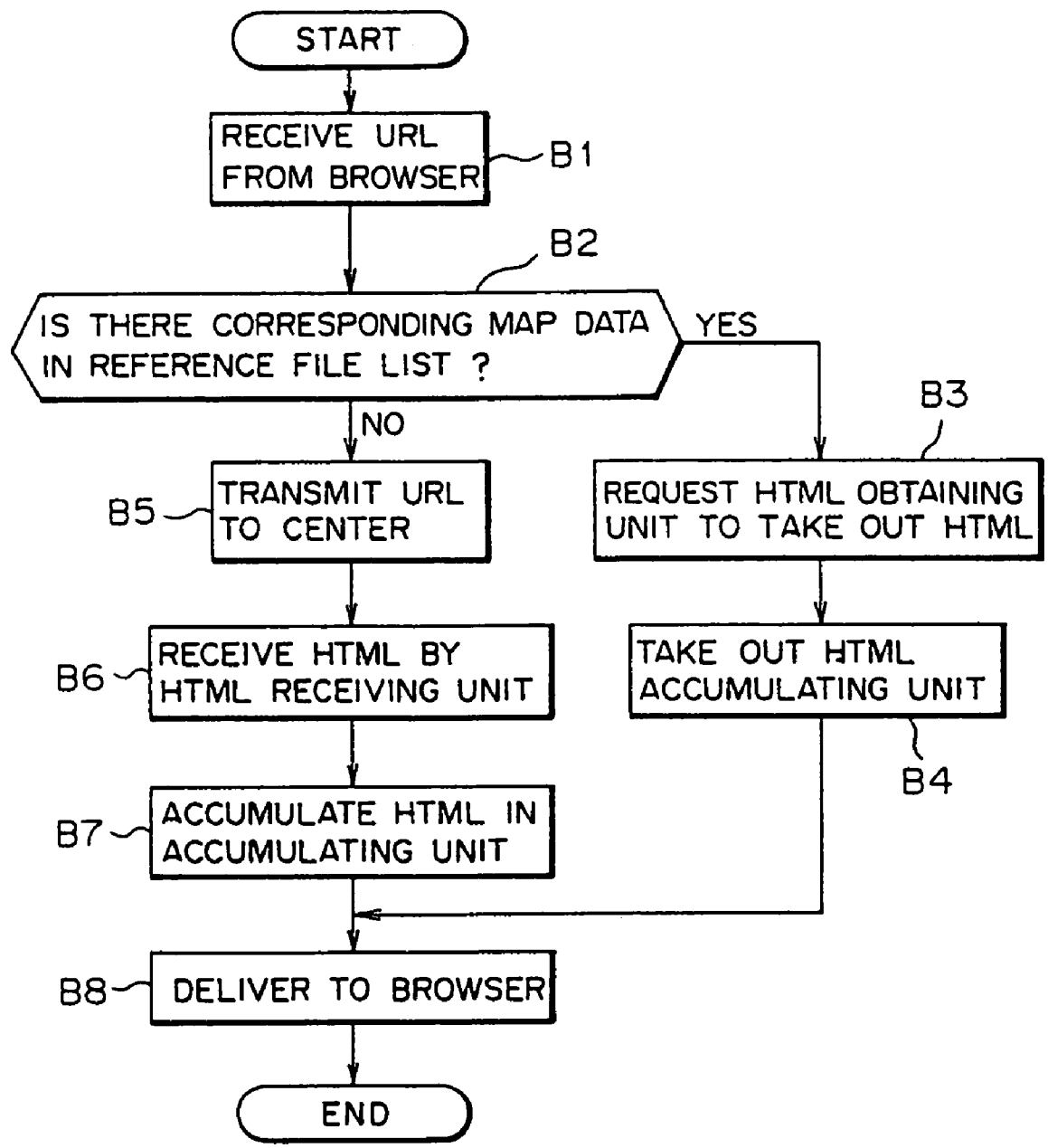
FIG. 65 is a flowchart for illustrating an operation of the caching unit according to the second embodiment.

In the terminal-side proxy 40B, the URL transmitting unit 78 of the caching unit 66 checks the reference file list 79 on the basis of the URL (http://server/Map1.gif) when receiving the above URL (Step B1 in FIG. 65) to judge (make a cache judgement) whether the demanded map data (Map1.gif) has been accumulated in the terminal-side accumulating unit 40C or not (Step B2 in FIG. 65).

If it is found, as a result, that the demanded map data (Map1.gif) has been accumulated in the terminal-side accumulating unit 40C (if the judgement at Step B2 in FIG. 65 results in YES), the HTML obtaining unit 80 takes out the map data (Map1.gif) from the terminal-side accumulating unit 40C (Step B4 in FIG. 65), and delivers it to the service program 401 (the information demanding unit 65) of the Web browser 40A (from Step A9 in FIG. 63 to Step A14, and Step B8 in FIG. 65).

If it is found that the demanded map data (Map1.gif) is not accumulated in the terminal-side accumulating unit 40C (the judgement at Step B2 in FIG. 65 results in NO), the URL transmitting unit 78 transfers the received URL (http://server/Map1.gif) as it is to the Web server 51' of the information center 5 (Step A10 in FIG. 63, and Step B5 in FIG. 65).

In the information center 5, the Web server 51' activates the CGI program 61 (refer to FIG. 57) so that the CGI program 61 retrieves the databases 52a and 52b on the basis of the received URL (http://server/Map1.gif), takes out corresponding map data (Map1.gif) (Steps A11 and A12 in FIG. 63), and sends back the map data (Map1.gif) to the terminal-side proxy 40B of the mobile terminal 4 (Step A13 in FIG. 63).

The terminal-side proxy 40B receives the map data (Map1.gif) by the HTML receiving unit 81 of the caching unit 66 (Step B6 in FIG. 65), and accumulates the map data (Map1.gif) in the terminal-side accumulating unit 40C by the HTML accumulating unit 82 (Step B7 in FIG. 65), besides delivering it to the service program 401 (the information demanding unit 65) (Step A14 in FIG. 63, and Step B8 in FIG. 65).

The information demanding unit 65 develops the received map data (Map1.gif) by the map/town information accumulating unit 62 so as to display it on the display unit (display screen) 63, thereby presenting the map service to the user (Steps A15 and A16 in FIG. 63).

Figure 64:
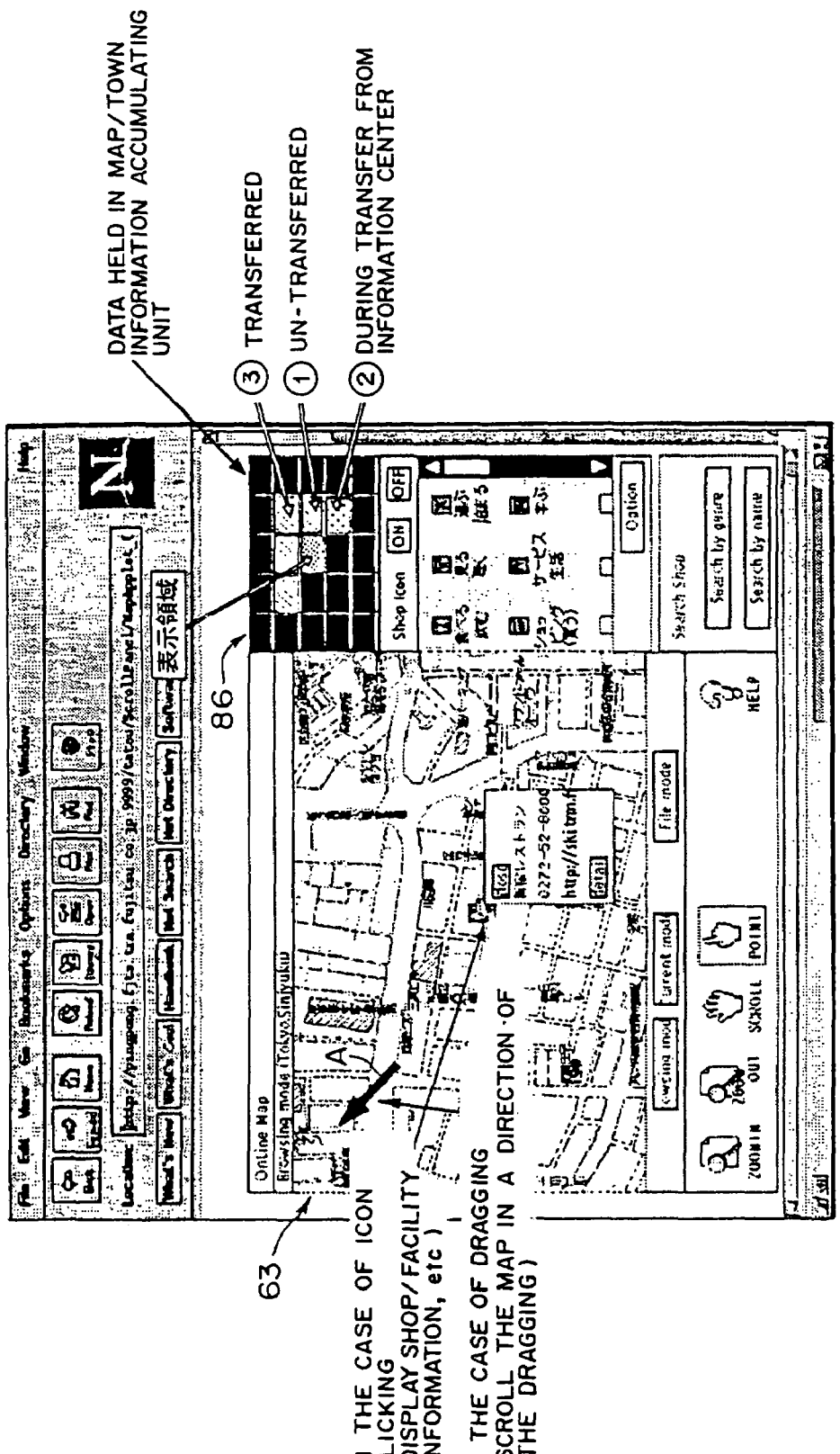
FIG. 64 is a diagram showing an example of an initial map display screen in the mobile terminal according to the second embodiment.

FIG. 64 is a diagram showing an example of an initial map display screen at this time. As shown in FIG. 64, to notify to the user whether map data (including shop and facility information on the map) has been accumulated in the map/town information accumulating unit 62 or not (a state of preservation of accumulated data), a rectangular region 86 consisting of 5×5 grids is displayed at the top right-hand corner of the map (display screen 63), for example, according to this embodiment. A color of display of each of the grid in the rectangular region 86 is varied depending on a state such as ① untransferred data, ② during data transfer, and ③ transferred data, whereby the user can know at a glance map data in which direction with respect to the display screen 63 has been accumulated.

Incidentally, map data is transferred the above grid by grid from the information center 5. In an initial stage, map data in the center of the 5×5 grids is first transferred. After that, map data that is expected to be necessary is automatically and successively transferred by the prefetching unit 66 using idleness of the line, as will be described later. At this time, if a size of a grid is decreased, a size of a data transfer unit is also decreased so that the map can be displayed at a high speed in the initial stage. However, if a size of one grid is excessively small, the number of times of transfer is increased. In consequence, a size of a grid is set to an optimum value in consideration of a data transfer rate, a communication time and the like of the communication line.

At this time, in the service program 401, the prefetching unit 66 executes a prefetching process to successively demand map data [for example, peripheral map data of the above initial map data (Map1.gif)] which is expected to be necessary, in parallel to the above initial displaying process (Step A17 in FIG. 63). For instance, in the prefetching unit 66, the screen coordinates/map coordinates converting unit 73 calculates peripheral map coordinates from the initial display screen coordinates (Step C1 in FIG. 66), and the URL generating unit 74 automatically generates URL (http://server/Map2.gif) used to demand peripheral map data (Map2.gif, for example) (Step C2 in FIG. 66).

The generated URL (http://server/Map2.gif) is supplied to the retrieving unit 75. The retrieving unit 75 checks whether corresponding peripheral map data (Map2.gif) has been accumulated in the map/town information accumulating unit 62 or not on the basis of the URL (http://server/Map2.gif) (Step C3 in FIG. 66). If it is found, as a result, that the peripheral map data (Map2.gif) has been accumulated in the map/town information accumulating unit 62 (if the judgement at Step C3 in FIG. 66 results in YES), a URL transmission inhibit instruction is given to the URL transmitting unit 76 so that the peripheral map data (Map2.gif) in the map/town information accumulating unit 62 is displayed as it is in the display screen 63. If the peripheral map data (Map2.gif) is not accumulated in the map/town information accumulating unit 62 (if the judgement at Step C3 in FIG. 66 results in NO), a URL transmit instruction is given to the URL transmitting unit 76 so that the URL (http://server/Map2.gif) is transmitted to the terminal-side proxy 40B (Step A18 in FIG. 63 and Step C4 in FIG. 66).

In the terminal-side proxy 40B, the caching unit 66 judges whether the demanded peripheral map data (Map2.gif) has been accumulated in the terminal-side accumulating unit 40C or not (a cache judgement) on the basis of the received URL (http://server/Map2.gif) similarly to the procedure (Steps B1 through B8) described before with reference to FIG. 65. If the peripheral map data (Map2.gif) has been accumulated in the terminal-side accumulating unit 40C, the caching unit 66 takes out the peripheral map data (Map2.gif) from the terminal-side accumulating unit 40C, and delivers it to the service program 401 (the prefetching unit 66) (from Step A18 to Step A23 in FIG. 63).

Figure 66:
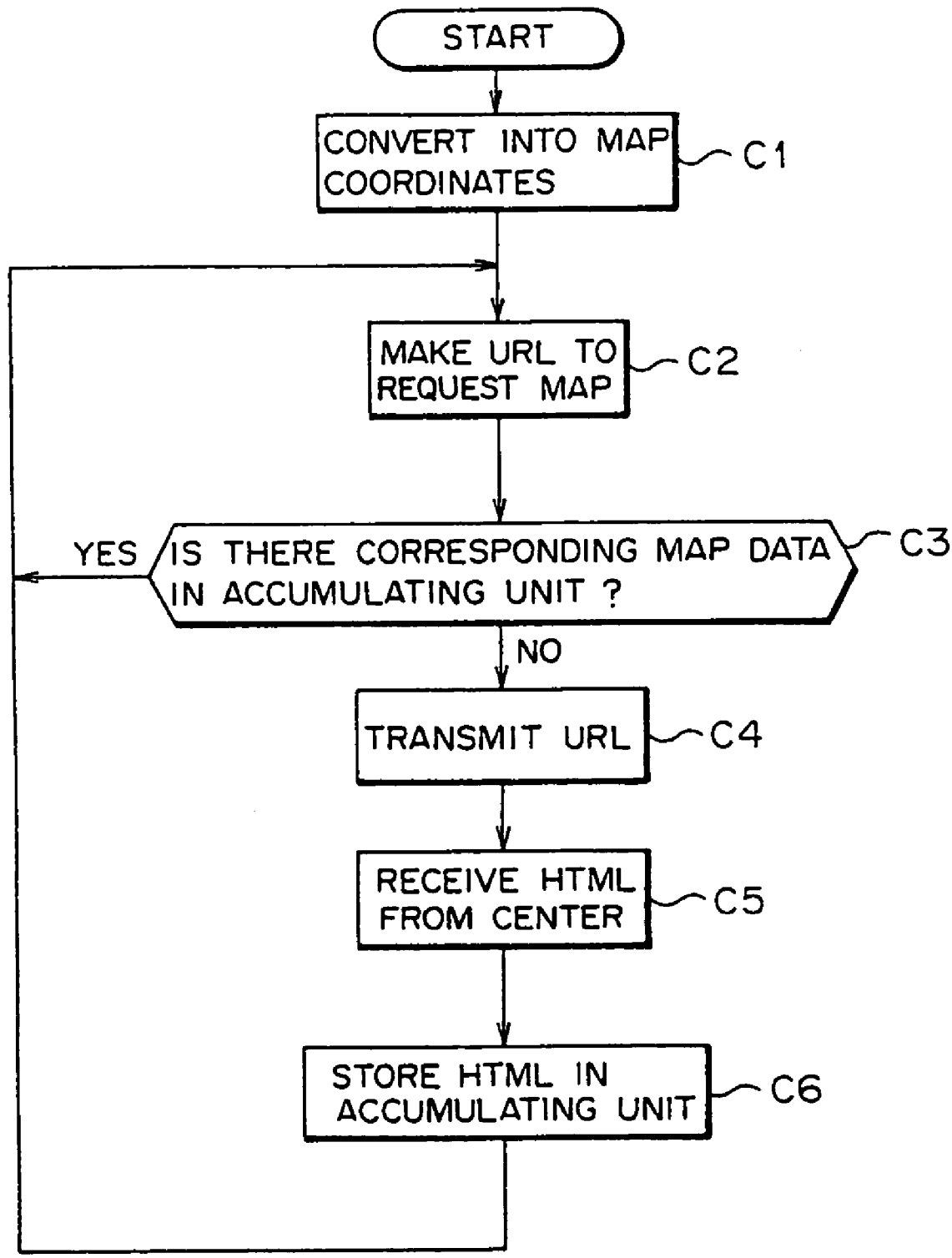
FIG. 66 is a flowchart for illustrating an operation of the prefetching unit according to the second embodiment.

The prefetching unit 66 receives the above peripheral map data (Map2.gif) by the HTML receiving unit 77 (Step C5 in FIG. 66), and accumulates and stores it in the map/town information accumulating unit 62 (Step C6 in FIG. 66).

If the demanded map data (Map2.gif) is not accumulated in the terminal-side accumulating unit 40C, the URL transmitting unit 78 transmits the received URL (http://server/Map2.gif) as it is to the Web server 51' of the information center 5 (Step A19 in FIG. 63). In the information center 5, the Web server 51' (the CGI program 61) retrieves corresponding map data (Map2.gif) in the map information database 52a on the basis of the received URL (http://server/Map2.gif), takes it out from the map information database 52a (Steps A20 and A21 in FIG. 63), and sends back the map data (Map2.gif) to the terminal-side proxy 40B (Step A23 in FIG. 63). In the terminal-side proxy 40B, the HTML accumulating unit 82 of the caching unit 66 accumulates the received map data (Map2.gif) in the terminal-side accumulating unit 40C.

After that, the prefetching unit 66 automatically and successively (in the order indicated by encircled numbers in FIG. 67, for example) obtains the peripheral map data (Map3.gif, Map4.gif, . . . ) from the terminal-side proxy 40B or the information center 5 in the similar manner, and makes the peripery map data be in a displayable state. Incidentally, in FIG. 67, each region indicated by an encircled number corresponds to one grid (one display region).

If the user drugs a map being currently displayed on the display screen 63 to conduct a scrolling operation during execution of the prefetching process (Step A24 in FIG. 63), an event to the scrolling operation is transmitted from the Web browser 40A to the service program 401 (Step A25 in FIG. 63).

In the service program 401, the action detecting unit 64 detects this event by the input controlling unit 70 (refer to FIG. 59), calculates a scroll quantity by the scroll quantity calculating unit 71, and controls the display region 63 by the display controlling unit 72 according to a result of the calculation to re-display (scroll) the map data (Step A26 in FIG. 63).

At this time, the scroll quantity obtained by the above scroll quantity calculating unit 71 is supplied to the prefetching unit 66. The prefetching unit 66 converts the scroll quantity to map coordinates to judge a direction of the scrolling, and change the above prefetching procedure being currently executed (change the order of generating URL), thereby obtaining data which is promptly required (map data of a part that should be immediately displayed on the display screen 63 due to the scrolling operation) prior to the others (Step A27 in FIG. 63).

Figure 68:
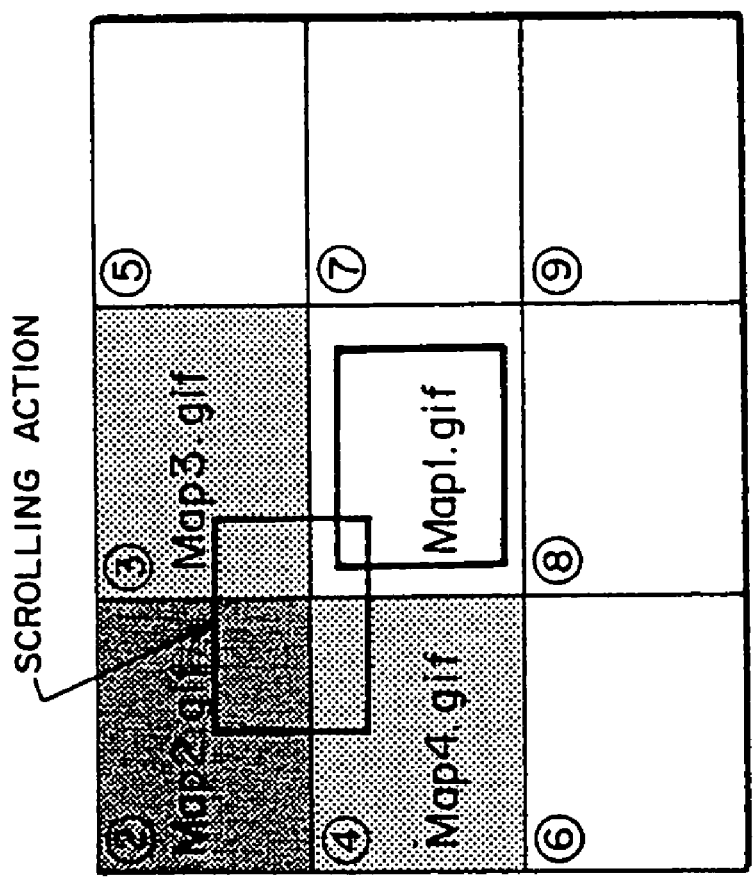
FIG. 68 is a diagram for illustrating a prefetching procedure changing operation according to the second embodiment.
Figure 70:
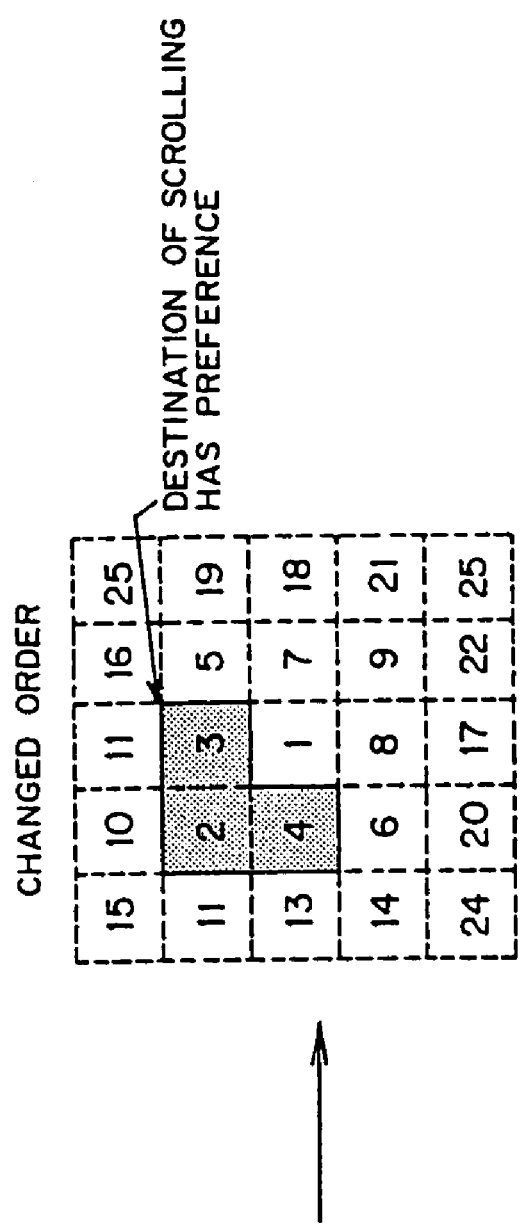
FIGS. 70(a) and 70(b) are diagrams for illustrating the prefetching procedure changing operation according to the second embodiment.

Assuming here that a dragging operation (scrolling) is conducted in a direction indicated by a thick arrow A in FIG. 64, for instance. In which case, the mobile terminal 4 will surely require map data [peripheral map data of meshed regions (Map2.gif,Map3.gif,Map4.gif)] of a destination of the scrolling, as shown in FIG. 68. For this, in the prefetching unit 66, as shown in FIG. 69, the URL transmitting unit 74 checks a scroll quantity (a direction of the scrolling) (Step D1), after that, changes an original order of prefetching [matrix: refer to FIG. 70(a)] to as shown in FIG. 70(b), for example, to change (determine) the procedure such as to demand the above peripheral map data (Map2.gif,Map3.gif, Map4.gif) in prior (from YES route at Step D1 to Steps D2 and D3).

Whereby, the peripheral map data (Map4.gif) which has been the ninth in the original order of prefetching becomes the fourth in the new order of prefetching so that URL (http://server/Map4.gif) is generated in prior by the URL generating unit 74 following a demand (URL generation) for the peripheral map data (Map2.gif,Map3.gif) (Step D4). If it is judged at the above Step D1 that there is no necessity of changing the prefetching procedure (in the case where a scroll quantity is minute, or the like), the URL is generated in the order shown by the matrix in FIG. 70(a), for example (from NO route at Step D1 to Steps D3 and D4).

The URL (http://server/Map4.gif) is supplied to the retrieving unit 75. The retrieving unit 75 checks whether corresponding peripheral map data (Map4.gif) has been accumulated in the map/town information accumulating unit 62 or not on the basis of the URL (http://server/Map4.gif) similarly in the above procedure (Steps C3 through C6) described before with reference to FIG. 66. If the peripheral map data (Map4.gif) has been accumulated in the map/town information accumulating unit 62, the peripheral map data (Map4.gif) in the map/town information accumulating unit 62 is displayed as it is on the display screen 63. If the peripheral map data (Map4.gif) is not accumulated in the map/town information accumulating unit 62, the URL (http://server/Map4.gif) is transmitted (transferred) to the terminal-side proxy 40B (Step A28 in FIG. 63).

In the terminal-side proxy 40B, the caching unit 66 judges (a cache judgement) whether the demanded peripheral map data (Map4.gif) has been accumulated in the terminal-side accumulating unit 40C or not on the basis of the received URL (http://server/Map4.gif), similarly to the procedure (Steps B1 through B8) described with reference to FIG. 65. If the peripheral map data (Map4.gif) has been accumulated in the terminal-side accumulating unit 40C, the caching unit 66 takes out the peripheral map data (Map4.gif) form the terminal-side accumulating unit 40C, and delivers it to the service program 401 (the prefetching unit 66) (from Step A28 to Step A33 in FIG. 63).

The prefetching unit 66 receives the above peripheral map data (Map4.gif) by the HTML receiving unit 77, and accumulates and stores it in the map/town information accumulating unit 62.

If the demanded map data (Map4.gif) is not accumulated in the terminal-side accumulating unit 40C, the URL transmitting unit 78 transfers the received URL (http://server/Map4.gif) as it is to the Web server 51' of the information center 5 (Step A29 in FIG. 63).

In the information center 5, the Web server 51' (CGI program 61) retrieves corresponding map data (Map4.gif) in the map information database 52a on the basis of the received URL (http://server/Map4.gif) and takes it out from the map information database 52a (Steps A30 and A31 in FIG. 63), and sends back the map data (Map4.gif) to the terminal-side proxy 40B (Step A32 in FIG. 63). The terminal-side proxy 40B accumulates the received map data (Map4.gif) in the terminal-side accumulating unit 40C by the HTML accumulating unit 82 in the caching unit 66 (Step A33 in FIG. 63).

After that, the map demand URL is successively generated according to the prefetching order (matrix) shown in FIG. 70(b) in the similar manner, whereby the mobile terminal 4 obtains data that is expected to be promptly necessary (map data of a destination of the scrolling) in prior to the others. Therefore, the user can receive necessary map data with little delay, and utilize it.

In the above example, grids (peripheral map data) in the vicinity of the region initially displayed (map data: Map1.gif) are successively transferred. It is alternatively possible to simultaneously transfer a plurality of grids in parallel (simultaneously generate a plurality of URLs in the URL generating unit 74), or decide a priority of each of the grids and transfer them in parallel.

Here, a prefetching procedure caused by map scrolling is exemplified. As having been described in the first embodiment, it is, however, alternatively possible to detect a direction or a distance of movement (movement information) of the user using a CSID of the PHS base station 6 or GPS to dynamically change the prefetching procedure.

In the mobile communication system (the mobile terminal 4) according to the second embodiment of this invention, the action detecting unit 64 and the prefetching unit 66 can automatically accumulate map data (including town information/service and the like) in the terminal-side accummulating unit 40C necessary (to be expected to be necessary) to the user to a certain degree according to an action of the user so that the user can utilize desired map data without establishing a communication with the information center 5 at all times.

Figure 72:
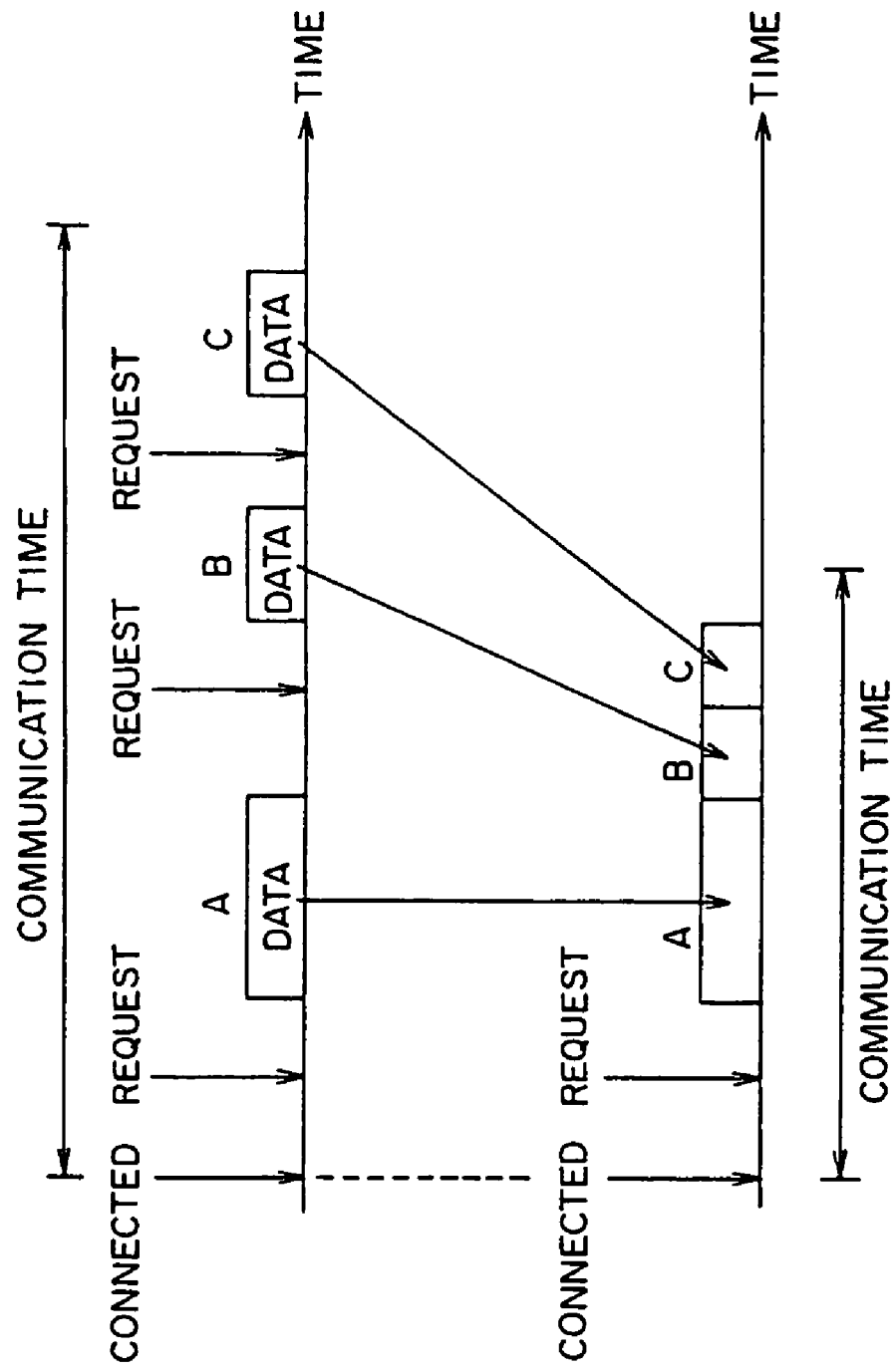
FIG. 72 is a diagram for illustrating an effect obtained by the mobile communicating system according to the second embodiment.

For instance, an access time (a communication time) to the information center 5 may be decreased as compared with a case where the mobile terminal 4 accesses (makes a demand) to the information center 5 whenever the mobile terminal 4 lacks necessary map data, as shown in FIG. 72, so that a cost of communication may be largely reduced. It is also possible to largely decrease a delay generated until necessary map data is provided so that operability and utility for the user may be largely improved.

Since map data is accumulated in a certain degree in the accumulating unit 40C, the user can certainly use a desired map service even if a communication with the information center 5 is impossible or unstable. This feature largely improves reliability of the system.

In the mobile terminal 4 according to this embodiment, the action detecting unit 64 detects an operation (scrolling operation) on the display screen 63 of the mobile terminal 4 so that the user can easily receive a necessary map service while referring to the display screen 63, without conducting any special inputting operation to demand map data, and irrespectively of the current position of the user. This feature can further improve operability and utility for the user.

If the action detecting unit 64 can detect movement information of the user utilizing an CSID of the base station 6 or GPS, necessary information or services are automatically accumulated in the terminal-side accumulating unit 40C with movement of the user so that it becomes unnecessary that the user accesses to the information center 5 in order to obtain missing map data each time the current position is changed. In which case, it is possible to not only improve utility for the user, but also further decrease a cost of communication and improve a line utilization efficiency.

In the mobile terminal 4 according to this embodiment, the caching unit 66 provides map data to the user without accessing to the information center 5 if the map data necessary (expected to be necessary) to the user has been accumulated in the terminal-side accumulating unit 40C so that a time of communication and a quantity of communication with the information center 5 can be further decreased. As a result, a cost of communication can be further decreased.

Since the caching unit 66 demands map data from the information center 5 only when the necessary map data is not accumulated in the terminal-side accumulating unit 40C, a communication with the information center 5 is established only when necessary. In consequence, it is possible to hold necessary map data (expected to be necessary) while suppressing a time of communication and a quantity of communication with the information center 5 to a minimum at any time. This feature can further decrease a communication cost and contribute to reliability of the system.

In the above mobile terminal 4, the prefetching unit 66 changes a prefetching procedure according to an action of the user to change an order of demanding map data (an order of generating URL) expected to be necessary so that map data which is promptly necessary among map data which is expected to be necessary can be obtained in prior to the others by changing the order of demanding. The user can thereby be provided necessary map data with little delay. This feature can largely improve operability and utility for the user.

According to this embodiment, when the mobile terminal 4 demands necessary map data (expected to be necessary), a part of the map data is demanded by grid according to a size of a display region of the mobile terminal 4 so that the necessary map data is not sent from the information center 5 at a time. It is therefore possible to display an initial map at a high speed, and further decrease a time of communication with the information center 5. As a result, a cost of communication can be further decreased.

According to this embodiment, the map service program (Applet) 401 is provided from the information center 5. Once receiving the above program 401 from the information center 5, the mobile terminal 4 becomes a terminal which can use a map service even if the mobile terminal 4 is an existing one. This feature largely contributes to flexibility in configuring this system and versatility of this system.

Figure 71:
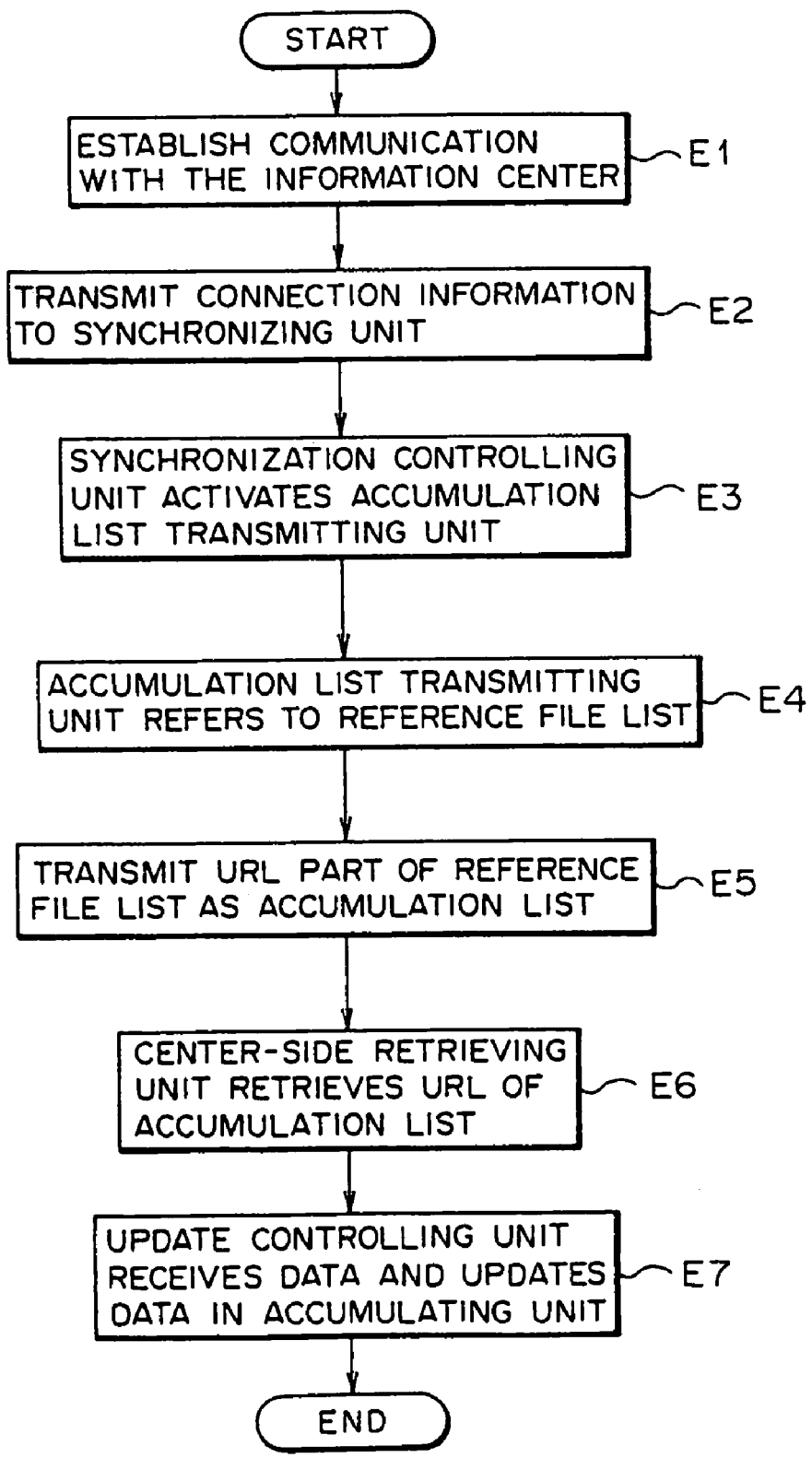
FIG. 71 is a flowchart for illustrating an operation of a synchronizing unit according to the second embodiment.

Hereinafter, description will be made of an operation of the synchronizing unit 68 of the terminal-side proxy 40B with reference to a flowchart (Steps E1 through E7) shown in FIG. 71.

When a communication line between the mobile terminal 4 and the information center 5 is established (connected) (Step E1), connection information is transmitted from the PHS radio communicating unit 45a (refer to FIG. 56) of the mobile terminal 4 to the synchronizing unit 68 (Step E2). When receiving the connection information, the synchronization controlling unit 83 activates the accumulation list transmitting unit 84 (Step E3). The accumulation list transmitting unit 84 refers to the reference file list 79 (Step E4), edits a part of URL of the reference file list 79 as an accumulation list, and transmits it to the information center 5 (Step E5).

When receiving the accumulation list, the information center 5 retrieves the databases 52a and 52b on the basis of the URL, extracts data missing from the received accumulation list, and sends back the data to the mobile terminal 4 (Step E6). The mobile terminal 4 receives the data from the information center 5 by the update controlling unit 85 of the synchronization unit 68. The update controlling unit 85 updates data in the terminal-side accumulating unit 40C on the basis of the received data (Step E7).

The mobile terminal 4 can always hold the same data as map data held in the information center 5 so as to flexibly react to update of the map data on the side of the information center 5, for example. This feature largely contributes to flexibility in operation of the system.

In the above synchronizing unit 68, the accumulation list transmitting unit 84 sends a list of map data (actually, a part of URL of the reference file list 79) accumulated in the terminal-side accumulating unit 40C to the information center 5 each time the mobile terminal 4 accesses to the information center 5, thereby notifying which map data the mobile terminal 4 holds to the information center 5. On the basis of map data sent back from the information center 5 (here, only map data missing on the side of the mobile terminal 4 is sent back) in response to the notification, the mobile terminal 4 updates map data held by itself. It is therefore possible for the mobile terminal 4 to automatically supply map data missing on the side of the mobile terminal 4 while suppressing a quantity of communication with the information center 5 so as to always hold the latest map data while suppressing a cost of communication.

In the above embodiment, only the map service program (Applet) 401 is delivered from the information center 5. It is possible that the terminal-side proxy 40B is programmed as well and delivered from the information center 5. It is also possible that the map-service program (Applet) 401 and the terminal-side proxy 40B are programmed and stored as computer programs 40' in a storage medium such as a memory card 87 or the like as shown in FIG. 73. By connecting the memory card 87 to the mobile terminal 4, the computer programs 40' are provided to the CPU 46 (refer to FIG. 56) as a computer of the mobile terminal 4 to operate the CPU 46 in the procedure described before with reference to FIGS. 63 through 71.

Once receiving the above programs 40' from the memory card 87, the mobile terminal 4 can operate as a terminal having the above map service program (Applet) 401 and terminal-side proxy 40B even if the mobile terminal 4 is an existing one, or the mobile terminal 4 cannot communicate with the information center 5. This feature largely contributes to flexibility in configuring this system and versatility of this system.

The above mobile terminal 4 is configured with an electronic pocketbook in which a PHS (the PHS radio communicating unit 45: refer to FIG. 56) is incorporated. The PHS can be, of course, connected from outside to the electronic pocketbook. This embodiment does not necessarily employ a PHS, but another radio communication means such as a portable telephone or the like is employable.

According to this embodiment, the mobile communication system is realized using Internet 8. However, this invention is not limited to this example, but it is possible to use another network to realize the system.

The invention claimed is:

1. A mobile communicating system having at least one information center and a plurality of mobile terminals each connected to said information center with a predetermined communicating method, comprising:

each of said mobile terminals comprising:
- a position information detecting unit for detecting position information of said mobile terminal;
- a position information transmitting unit for transmitting said position information detected by said position information detecting unit to said information; and
- an up-load data transmitting unit for transmitting information or a service, as up-load data, relating to transmitted information from said information center and said position information to said information center; said information center comprising:
- a receiving unit for receiving said position information and information or a service as said up-load data transmitted from said mobile terminal;
- an information center side transmitting unit for transmitting said transmitted information based on said position information received by said receiving unit to said mobile terminal; and
- an accumulation controlling unit for accumulating said information or a service as said up-load data and said transmitted information in association with each other.

2. A mobile communicating system having at least one information center and a plurality of mobile terminals each connected to said information center via a radio base station over a radio line, comprising:

each of said mobile terminals comprising:
- a position information detecting unit for detecting position information of said mobile terminal;
- a position information transmitting unit for transmitting said position information detected by said position information detecting unit to said information center;
- a map/facility information/service utilizing unit for utilizing information of a map, information of facilities on said map or a service as to said map or said facilities, transmitted from said information center; and
- an up-load data transmitting unit for transmitting information or a service, as up-load data, relating to transmitted information from said information center and said information of said map or said facilities to said information center;

said information center comprising:
- a receiving unit for receiving from said mobile terminal said position information and information or a service, as said up-load data, relating to said map or said facilities;
- an information center side transmitting unit for transmitting said transmitted information based on said position information received by said receiving unit to said mobile terminal; and
- an accumulation controlling unit for accumulating the information or a service, as said up-load data, relating to said information of said map or said facilities and said transmitted information in association with each other.

3. A mobile terminal used in a mobile communicating system having at least one information center and a plurality of said mobile terminals each connected to said information center with a predetermined communicating method, comprising:
- a position information detecting unit for detecting position information of said mobile terminal;
- a position information transmitting unit for transmitting said position information detected by said position information detecting unit to said information center;
- an up-load data transmitting unit for transmitting information or a service, as up-load data, relating to transmitted information from said information center and said position information to said information center; and
- an information/service utilizing unit for utilizing information or a service as said up-load data accumulated and associated with said transmitted information in said information center.

4. An information center used in a mobile communicating system which is formed by being connected to a plurality of mobile terminals with a predetermined communicating method, comprising:
- a receiving unit for receiving position information detected by said mobile terminal and information or a service relating to said position information from said mobile terminal;
- an information center side transmitting unit for transmitting information based on said position information received from said mobile terminal; and
- an accumulating unit for accumulating said information or said service received from said mobile terminal and information based on said position information in association with each other.

5. An information center used in a mobile communicating system having at least one said information center and a plurality of mobile terminals each connected to said information center with a predetermined communicating method, comprising:
- a receiving unit for receiving position information detected by said mobile terminal and information relating to said position information from said mobile terminal;
- an information center side transmitting unit for transmitting information based on said position information received from said mobile terminal; and
- an accumulating unit for accumulating said information relating to said position information received from said mobile terminal and information based on said position information in association with each other.

6. A mobile terminal used in a mobile communicating system having at least one information center and a plurality of said mobile terminals each connected to said information center with a predetermined communicating method, comprising:
- a position information detecting unit for detecting position information of said mobile terminal;
- a position information transmitting unit for transmitting said position information detected by said position information detecting unit to said information center;
- an information transmitting unit for transmitting information relating to transmitted information from said information center and said position information to said information center; and
- an information utilizing unit for utilizing information accumulated in association with said transmitted information in said information center.

7. A mobile communicating system having at least one information center and a plurality of mobile terminals each connected to said information center with a predetermined communicating method, comprising:

each of said mobile terminals comprising:
a position information detecting unit for detecting position information of said mobile terminal;
a position information transmitting unit for transmitting said position information detected by said position information detecting unit to said information center; and
a mobile terminal side transmitting unit for transmitting information relating to transmitted information from said information center and said position information to said information center;

said information center comprising:
a receiving unit for receiving said position information and information relating to said position information from said mobile terminal;
an information center side transmitting unit for transmitting said transmitted information based on said position information received by said receiving unit to said mobile terminal; and
an accumulating unit for accumulating information relating to said position information received by said receiving unit and said transmitted information in association with each other.

8. A mobile terminal used in a mobile communicating system having at least one information center and a plurality of mobile terminals each connected to said information center with a predetermined communicating method, comprising:

each of said mobile terminals comprising:
a position information detecting unit for detecting position information of said mobile terminal;
a position information transmitting unit for transmitting said position information detected by said position information detecting unit to said information center; and
a transmitting unit for transmitting information relating to transmitted information from said information center and said position information to said information center, whereby said information center accumulates said information from said mobile terminal and said transmitted information in association with each other.

* * * * *